United States Patent
Marzban et al.

(10) Patent No.: US 12,301,483 B2
(45) Date of Patent: May 13, 2025

(54) INTERFERENCE DISTRIBUTION COMPRESSION AND RECONSTRUCTION

(71) Applicant: QUALCOMM Incorporated, San Diego, CA (US)

(72) Inventors: Mohamed Fouad Ahmed Marzban, San Diego, CA (US); Taesang Yoo, San Diego, CA (US); Wooseok Nam, San Diego, CA (US); Tao Luo, San Diego, CA (US); Arumugam Chendamarai Kannan, San Diego, CA (US); Mahmoud Taherzadeh Boroujeni, San Diego, CA (US); Hamed Pezeshki, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 348 days.

(21) Appl. No.: 17/876,397

(22) Filed: Jul. 28, 2022

(65) Prior Publication Data
US 2023/0246753 A1 Aug. 3, 2023

Related U.S. Application Data

(60) Provisional application No. 63/305,174, filed on Jan. 31, 2022.

(51) Int. Cl.
*H04L 5/00* (2006.01)
*H04B 17/345* (2015.01)
*H04W 72/541* (2023.01)

(52) U.S. Cl.
CPC ......... *H04L 5/0023* (2013.01); *H04B 17/345* (2015.01); *H04W 72/541* (2023.01)

(58) Field of Classification Search
CPC .. H04L 5/0023; H04B 17/345; H04W 72/541; H04W 8/22; H04W 24/08; H04J 11/0023; G06N 3/0455; G06N 3/0495
See application file for complete search history.

(56) References Cited

U.S. PATENT DOCUMENTS

| | | | |
|---|---|---|---|
| 10,153,852 B1 | 12/2018 | Gresset | |
| 2012/0009959 A1* | 1/2012 | Yamada | H04L 25/0226 455/507 |

(Continued)

FOREIGN PATENT DOCUMENTS

| | | |
|---|---|---|
| EP | 3678441 B1 | 10/2021 |
| WO | WO-2021230785 A1 | 11/2021 |
| WO | WO-2021253936 A1 | 12/2021 |

OTHER PUBLICATIONS

International Search Report and Written Opinion—PCT/US2023/060224—ISA/EPO—May 4, 2023.

*Primary Examiner* — Walli Z Butt
(74) *Attorney, Agent, or Firm* — Holland & Hart LLP

(57) ABSTRACT

Methods, systems, and devices for wireless communications are described. A user equipment (UE) may transmit compressed interference information to a network entity. The UE may measure interference at the UE over a set of interference measurement resources. The UE may determine an interference distribution over the set of resources. The UE may encode the interference distribution using a compressions scheme which may reduce a payload or size of the interference distribution. The compression scheme may include compressing the distribution of the interference. Encoding the interference information may include generating a mean vector and a covariance matrix representative of the distribution of the interference measured over the given set of interference measurement resources. The UE may transmit the encoded interference information, and the network entity may decode the encoded interference information. The network entity may schedule communications with the UE based on the interference information.

80 Claims, 21 Drawing Sheets

(56) References Cited

U.S. PATENT DOCUMENTS

| | | | |
|---|---|---|---|
| 2018/0351669 A1* | 12/2018 | Gresset | H04B 17/26 |
| 2019/0238197 A1* | 8/2019 | Noam | H04B 7/0626 |
| 2019/0349945 A1 | 11/2019 | Yeh et al. | |
| 2021/0184744 A1 | 6/2021 | Pezeshki et al. | |
| 2021/0392632 A1 | 12/2021 | Venugopal et al. | |

\* cited by examiner

INTERFERENCE DISTRIBUTION COMPRESSION AND RECONSTRUCTION

CROSS REFERENCE

The present application for patent claims the benefit of U.S. Provisional Patent Application No. 63/305,174 by MARZBAN et al., entitled "INTERFERENCE DISTRIBUTION COMPRESSION AND RECONSTRUCTION," filed Jan. 31, 2022, assigned to the assignee hereof, and expressly incorporated by reference herein.

INTRODUCTION

The following relates generally to wireless communications, and more specifically to interference compression and reporting.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

A method for wireless communications at a user equipment (UE) is described. In some examples, the method may include measuring interference at the UE over a set of interference measurement resources. In some examples, the method may include encoding, in accordance with a compression scheme, interference information representative of a distribution of interference at the UE based on the interference measured over the set of interference measurement resources. In some examples, the method may further include transmitting, to a first network entity, the interference information encoded in accordance with the compression scheme.

An apparatus for wireless communications at a UE is described. The apparatus may include a processor and memory coupled with the processor. In some examples, the processor may be configured to cause the apparatus to measure interference at the UE over a set of interference measurement resources. In some examples, the processor may be configured to encode, in accordance with a compression scheme, interference information representative of a distribution of interference at the UE based on the interference measured over the set of interference measurement resources. In some examples, the processor may be configured to transmit, to a first network entity, the interference information encoded in accordance with the compression scheme.

Another apparatus for wireless communications at a UE is described. In some examples, the apparatus may include means for measuring interference at the UE over a set of interference measurement resources. In some examples, the apparatus may include means for encoding, in accordance with a compression scheme, interference information representative of a distribution of interference at the UE based on the interference measured over the set of interference measurement resources. In some examples, the apparatus may include means for transmitting, to a first network entity, the interference information encoded in accordance with the compression scheme.

A non-transitory computer-readable medium storing code for wireless communications at a UE is described. In some examples, the code may include instructions executable by a processor to measure interference at the UE over a set of interference measurement resources. In some examples, the code may include instructions executable by a processor to encode, in accordance with a compression scheme, interference information representative of a distribution of interference at the UE based on the interference measured over the set of interference measurement resources. In some examples, the code may include instructions executable by a processor to transmit, to a first network entity, the interference information encoded in accordance with the compression scheme.

In some examples of the method, apparatuses, and non-transitory computer-readable medium described herein, the interference at the UE may be interference-plus-noise, and the distribution of interference may be a distribution of interference-plus-noise over the set of interference measurement resources.

In some examples of the method, apparatuses, and non-transitory computer-readable medium described herein, the distribution of interference at the UE includes a probability mass function for a set of resources in time, frequency, and/or space.

In some examples of the method, apparatuses, and non-transitory computer-readable medium described herein, the set of resources in time, frequency, and/or space include the set of interference measurement resources.

In some examples of the method, apparatuses, and non-transitory computer-readable medium described herein, the set of resources in time, frequency, and/or space include resources prior to the set of interference measurement resources and the distribution of interference at the UE is based on the interference measured over the set of interference measurement resources.

In some examples of the method, apparatuses, and non-transitory computer-readable medium described herein, the set of resources in time, frequency, and/or space include resources later than the set of interference measurement resources, and the distribution of interference at the UE is predicted based at least in part on the interference measured over the set of interference measurement resources.

Some examples of the method, apparatuses, and non-transitory computer-readable medium described herein may further include operations, features, means, or instructions for generating a compressed estimated or predicted interference distribution over the set of interference measurement resources.

In some examples of the method, apparatuses, and non-transitory computer-readable medium described herein, the compression scheme includes a codeword-based compression scheme or an artificial neural network-based compression scheme.

Some examples of the method, apparatuses, and non-transitory computer-readable medium described herein may further include operations, features, means, or instructions for generating a mean vector and a covariance matrix of a latent random variable representative of the distribution of interference at the UE over the set of interference measurement resources, wherein the set of interference measurement resources includes a set of two or more of time, frequency, or spatial resources.

Some examples of the method, apparatuses, and non-transitory computer-readable medium described herein may further include operations, features, means, or instructions for receiving, from the first network entity or one or more second network entities associated with the first network entity, an indication of an encoding configuration for encoding the interference information.

Some examples of the method, apparatuses, and non-transitory computer-readable medium described herein may further include operations, features, means, or instructions for transmitting, to the first network entity or one or more second network entities associated with the first network entity, an indication of a capability of the UE to encode interference information; the receiving the indication of the encoding configuration for encoding the interference information including receiving, from the first network entity or one or more second network entities associated with the first network entity, in response to the transmitting the indication of the capability of the UE to encode interference information, an indication of an index associated with the encoding configuration, where a set of encoding configurations including the encoding configuration may be associated with a set of indices including the index.

In some examples of the method, apparatuses, and non-transitory computer-readable medium described herein, the encoding configuration includes a configuration for one of an autoencoder or an artificial neural network.

Some examples of the method, apparatuses, and non-transitory computer-readable medium described herein may further include operations, features, means, or instructions for selecting an encoding configuration from a set of encoding configurations for encoding the interference information, where each encoding configuration of the set of encoding configurations may be associated with a respective index of a set of indices and transmitting, to the first network entity or one or more second network entities associated with the first network entity, an indication of an index of the set of indices associated with the selected encoding configuration.

Some examples of the method, apparatuses, and non-transitory computer-readable medium described herein may further include operations, features, means, or instructions for receiving, from the first network entity or one or more second network entities associated with the first network entity, an indication of one or more parameters associated with the compression scheme.

In some examples of the method, apparatuses, and non-transitory computer-readable medium described herein, the one or more parameters associated with the compression scheme include a code size, a number of layers, a number of nodes per layer, a loss function, or a combination thereof.

Some examples of the method, apparatuses, and non-transitory computer-readable medium described herein may further include operations, features, means, or instructions for receiving, from the first network entity or one or more second network entities associated with the first network entity, an indication of the set of interference measurement resources.

Some examples of the method, apparatuses, and non-transitory computer-readable medium described herein may further include operations, features, means, or instructions for receiving, from the first network entity or one or more second network entities associated with the first network entity, an indication of one or more parameters associated with measuring the interference at the UE over the set of interference measurement resources.

In some examples of the method, apparatuses, and non-transitory computer-readable medium described herein, the one or more parameters associated with measuring the interference at the UE over the set of interference measurement resources includes a frequency granularity, a time granularity, a spatial granularity, or a combination thereof.

Some examples of the method, apparatuses, and non-transitory computer-readable medium described herein may further include operations, features, means, or instructions for receiving, from the first network entity or one or more second network entities associated with the first network entity, an indication of an input format for encoding the interference information representative of a distribution of interference at the UE.

Some examples of the method, apparatuses, and non-transitory computer-readable medium described herein may further include operations, features, means, or instructions for transmitting a channel state feedback report including the interference information encoded in accordance with the compression scheme.

Some examples of the method, apparatuses, and non-transitory computer-readable medium described herein may further include operations, features, means, or instructions for determining, using an artificial neural network associated with the compression scheme, one or more model parameters associated with the compression scheme and transmitting, to the first network entity or one or more second network entities associated with the first network entity, the one or more model parameters.

Some examples of the method, apparatuses, and non-transitory computer-readable medium described herein may further include operations, features, means, or instructions for receiving, from the first network entity or one or more second network entities associated with the first network entity, one or more parameters associated with the compression scheme based on the transmitting the one or more model parameters.

A method for wireless communications at a network entity is described. In some examples, the method may include obtaining encoded interference information representative of a distribution of interference. In some examples, the method may include decoding the encoded interference information in accordance with a compression scheme to output decoded interference information.

An apparatus for wireless communications at a network entity is described. The apparatus may include a processor and memory coupled with the processor. In some examples, the processor may be configured to cause the apparatus to obtain encoded interference information representative of a distribution of interference. In some examples, the processor may be configured to cause the apparatus to decode the encoded interference information in accordance with a compression scheme to output decoded interference information.

Another apparatus for wireless communications at a network entity is described. In some examples, the apparatus may include means for obtaining encoded interference information representative of a distribution of interference. In some examples, the apparatus may include means for decoding the encoded interference information in accordance with a compression scheme to output decoded interference information.

A non-transitory computer-readable medium storing code for wireless communications at a network entity is described. In some examples, the code may include instructions executable by a processor to obtain encoded interference information representative of a distribution of interference. In some examples, the code may include instructions executable by a processor to decode the encoded interference information in accordance with a compression scheme to output decoded interference information.

In some examples of the method, apparatuses, and non-transitory computer-readable medium described herein, the distribution of interference may be a distribution of interference-plus-noise over a set of interference measurement resources.

In some examples of the method, apparatuses, and non-transitory computer-readable medium described herein, the encoded interference information includes a mean vector and a covariance matrix of a latent random variable representative of the distribution of interference at a UE over a set of interference measurement resources. The method, apparatuses, and non-transitory computer-readable medium described herein may further include operations, features, means, or instructions for generating samples based on the mean vector and the covariance matrix; and decoding the encoded interference information based at least in part on the samples.

Some examples of the method, apparatuses, and non-transitory computer-readable medium described herein may further include operations, features, means, or instructions for outputting scheduling information for communications at a UE based on the decoded interference information.

Some examples of the method, apparatuses, and non-transitory computer-readable medium described herein may further include operations, features, means, or instructions for outputting an indication of an encoding configuration for encoding interference information at a UE.

Some examples of the method, apparatuses, and non-transitory computer-readable medium described herein may further include operations, features, means, or instructions for obtaining an indication of a capability of the UE to encode interference information; and outputting, based on the indication of the capability of the UE to encode interference information, an indication of an index associated with the encoding configuration, where a set of encoding configurations including the encoding configuration may be associated with a set of indices including the index.

In some examples of the method, apparatuses, and non-transitory computer-readable medium described herein, the encoding configuration includes a configuration for one of an autoencoder or an artificial neural network.

Some examples of the method, apparatuses, and non-transitory computer-readable medium described herein may further include operations, features, means, or instructions for obtaining an indication of an index of a set of indices associated with a selected encoding configuration, where each encoding configuration of the set of encoding configurations may be associated with a respective index of a set of indices.

Some examples of the method, apparatuses, and non-transitory computer-readable medium described herein may further include operations, features, means, or instructions for outputting an indication of one or more parameters associated with the compression scheme.

In some examples of the method, apparatuses, and non-transitory computer-readable medium described herein, the one or more parameters associated with the compression scheme include a code size, a number of layers, a number of nodes per layer, a loss function, or a combination thereof.

Some examples of the method, apparatuses, and non-transitory computer-readable medium described herein may further include operations, features, means, or instructions for outputting an indication of one or more parameters associated with measuring the interference over the set of interference measurement resources.

In some examples of the method, apparatuses, and non-transitory computer-readable medium described herein, the one or more parameters associated with measuring the interference over the set of interference measurement resources includes a frequency granularity, a time granularity, a spatial granularity, or a combination thereof.

Some examples of the method, apparatuses, and non-transitory computer-readable medium described herein may further include operations, features, means, or instructions for outputting an indication of an input format for encoding interference information representative of a distribution of interference.

Some examples of the method, apparatuses, and non-transitory computer-readable medium described herein may further include operations, features, means, or instructions for obtaining a channel state feedback report including the encoded interference information encoded in accordance with the compression scheme.

Some examples of the method, apparatuses, and non-transitory computer-readable medium described herein may further include operations, features, means, or instructions for determining, using an artificial neural network associated with the compression scheme, one or more model parameters associated with the compression scheme and outputting one or more parameters associated with the compression scheme based on the one or more model parameters.

Some examples of the method, apparatuses, and non-transitory computer-readable medium described herein may further include operations, features, means, or instructions for obtaining one or more model parameters associated with the compression scheme; and outputting one or more parameters associated with the compression scheme based on the one or more model parameters.

DETAILED DESCRIPTION

Figure 1:
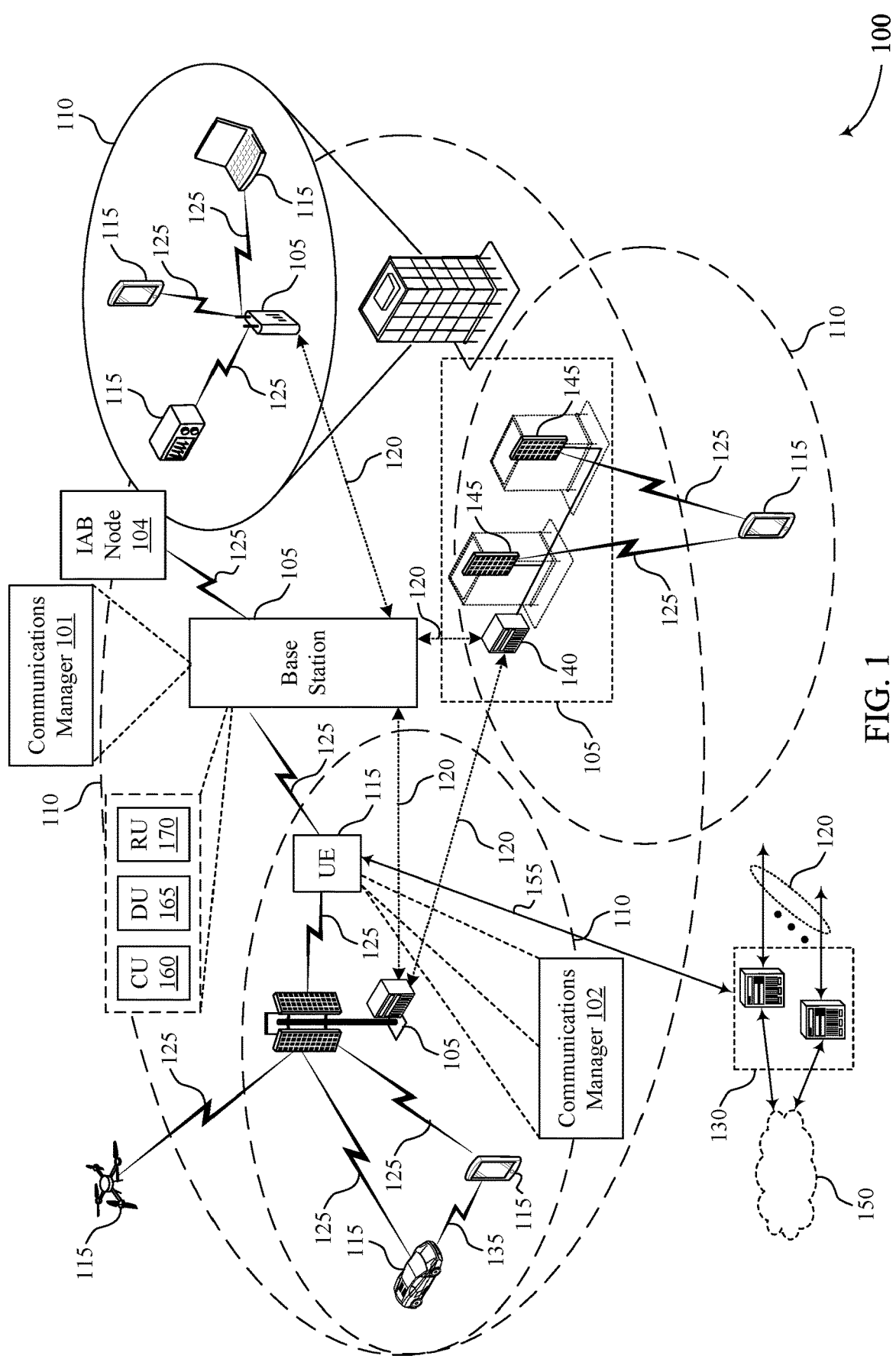
FIG. 1 illustrates an example of a wireless communications system that supports interference distribution compression and reconstruction in accordance with one or more aspects of the present disclosure.

Interference at a UE may be caused, for example, by communications at neighboring base stations or by sidelink communications between other UEs. Interference (or interference-plus-noise) experienced at a UE may vary in the time, frequency, and spatial domains. Interference-plus-noise experienced at a UE may refer to the interference power plus the noise power observed at the UE. Interference (or interference-plus-noise) experienced at a UE may also have correlations in the time, frequency, and spatial domains. For example, a change in interference (or interference-plus-noise) in the time domain at a UE may affect interference (or interference-plus-noise) in the frequency or spatial domains. A UE may predict interference (or interference-plus-noise) on future communications resources based on interference (or interference-plus-noise) measured over communications resources in the past. For example, a UE may determine correlations of past interference (or interference-plus-noise) measurements in the time, frequency, and spatial domains and predict future interference (or interference-plus-noise) based on the determined correlations.

A UE in a wireless communications system may measure interference (or interference-plus-noise) at the UE using interference measurement resources such as a channel state information (CSI) reference signal (CSI-RS), a CSI interference measurement (CSI-IM), or generally through an interference measurement resource (IMR). A CSI-RS refers to a reference signal transmitted by a serving base station or network node that a UE may use to estimate a channel and report channel quality information back to the serving base station or network node. A CSI-IM refers to a set of resource elements reserved for Interference Measurement, which may be configurable, for example via radio resource control. An IMR may be a time-frequency resource allocated by the network to the UE for the UE to measure interference at the UE. Interference (or interference-plus-noise) measured at a UE may be reported to a serving base station or network node via a channel state feedback (CSF) report. A CSF report may not report information regarding the time, frequency, or spatial correlation properties of the interference (or interference-plus-noise). Accordingly, a serving base station or network node that receives the CSF report is not informed of the time, frequency, or spatial correlation properties of the interference (or interference-plus-noise) at the UE. Accordingly, a serving base station or network node may be unable to use these interference (or interference-plus-noise) correlation properties when scheduling communications for the UE based on the CSF report. Thus, the serving base station or network node may schedule communications for the UE using resources that have relatively high interference (or interference-plus-noise), which may result in signal loss or inefficient communications. For example, a communication may have relatively high interference if the interference results in data signal loss or inefficiency in communications of data. Furthermore, because the interference (or interference-plus-noise) at the UE may have a large variation in the time, frequency, or spatial domains, explicit reporting of the interference at the UE to the serving base station or network node may be associated with a large resource overhead.

To allow a base station or network node to consider the time, frequency, or spatial correlation properties of interference (or interference-plus-noise) at a UE, a UE may report interference (or interference-plus-noise) information to the base station or network node. The reported interference (or interference-plus-noise) information may be representative of a distribution of interference (or interference-plus-noise) at the UE. A distribution of interference (or interference-plus-noise) or an interference (or interference-plus-noise) distribution may be a sequence of estimated and/or predicted interference (or interference-plus-noise) values based on multiple instances of interference (or interference-plus-noise) measurements measured over a set of multiple interference measurement resources in the time, frequency, and/or spatial domains at a UE. Estimated interference (or interference-plus-noise) values may refer to estimated past interference (or interference-plus-noise) based on the multiple instances of interference (or interference-plus-noise) measurements measured over the set of multiple interference measurement resources (e.g., as measurements themselves may be estimates). Predicted interference (or interference-plus-noise) values may refer to predicted future interference (or interference-plus-noise) values based on the multiple instances of interference (or interference-plus-noise) measurements measured over the set of multiple interference measurement resources. For example, in one aspect, a UE may transmit interference (or interference-plus-noise) information encoded in accordance with a compression scheme (e.g., compressed) to the base station to decrease the resource overhead associated with explicit interference (or interference-plus-noise) distribution reporting while enabling the base station to account for interference (or interference-plus-noise) correlations when scheduling communications at the UE. The UE may measure multiple instances of interference (or interference-plus-noise) at the UE over a set of multiple interference measurement resources in the time, frequency, and/or spatial domains. The set of interference measurement resources may include, for example, a CSI-RS, a CSI-IM, or an IMR. The UE may determine an interference (or interference-plus-noise) distribution over the set of resources. The UE may encode the interference (or interference-plus-noise) distribution using a compression scheme which may reduce a payload or size of the interference (or interference-plus-noise) distribution. The compression scheme may include compressing the distribution of interference (or interference-plus-noise) measured over a given set of interference measurement resources.

According to one or more examples, the interference (or interference-plus-noise) distribution may be a probability density function or a probability mass function with respect to the time, frequency, and spatial variable. A probability density function describes the probability of the value of a continuous random variable falling within a range. The probability that the random variable has a value in the range x and x+dx is f(x)dx. A probability mass function is a function that gives the probability that a discrete random variable is exactly equal to some value. For example, if X is a discrete random variable with range $R_X=\{x1, x2, x3 \ldots\}$, then the function $P_X(x_k)=P(X=x_k)$, for k=1, 2, 3, ..., is the probability mass function of X.

In some examples, encoding the interference (or interference-plus-noise) information in accordance with the compression scheme may include generating a mean vector and a covariance matrix of a latent random variable representative of the distribution of interference (or interference-plus-noise) measured over the given set of interference measurement resources. The term latent, as in a latent value, a latent variable, or a latent vector, refers to a value, variable, or vector that is derived or inferred through a mathematical model and is not a value, variable, or vector that is directly measured or observed. The mean vector and the covariance matrix may describe the distribution of a data matrix or sequence associated with the measured interference (or interference-plus-noise) (e.g., a probabilistic latent random vector). For example, if the data matrix consists of a set of measurements of the time, frequency, and spatial variables of the interference (or interference-plus-noise), the mean vector may be a vector of the mean of the set of measurements for each of the time, frequency, and spatial variables of the interference (or interference-plus-noise). The covariance matrix may include the variances of the time, frequency, and spatial variables along the main diagonal of the covariance matrix and the covariances between each pair of variables in the other covariance matrix positions. The UE may transmit the encoded interference (or interference-plus-noise) information, and the base station may receive and decode the encoded interference (or interference-plus-noise) information. The base station or network node may schedule communications with the UE based on the interference (or interference-plus-noise) information.

In some examples, the UE may receive control signaling configuring aspects of the interference measurement resources and the encoding. For example, the base station may configure the interference measurement resources for the UE, the compression scheme, parameters of the compression scheme, the encoder (e.g., an encoding configuration for the encoder), the input format to the encoder, and/or parameters associated with measuring the interference (or interference-plus-noise) at the UE. Example encoding configurations, for example, may include encoding configurations for an autoencoder or an artificial neural network. For example, the base station may configure the granularity of the interference (or interference-plus-noise) estimation. Granularity refers to the scale size or measurement step size. For example, the base station may configure, for frequency granularity, whether the interference (or interference-plus-noise) estimation is based on full band or sub-band (and the different granularities for different sub-bands). As another example, the base station may configure, for time granularity, whether the interference (or interference-plus-noise) estimation is based on symbol-level interference (or interference-plus-noise), slot level interference (or interference-plus-noise), or multi-slot level interference (or interference-plus-noise). As another example, for spatial granularity, the base station may configure the interference (or interference-plus-noise) estimation on specific beams. As another example, the input format to the encoder may include the estimated interference (or interference-plus-noise) distribution, a zero power or non-zero power CSI-RS for interference (or interference-plus-noise) measurement, or the estimated interference (or interference-plus-noise) on previous resources. The CSI-RS used to measure the channel may be referred to as the non-zero power CSI-RS. A zero power CSI-RS refers to a CSI-RS that occupies a configured resource element, but where the base station does not transmit any energy in the resource element.

The UE may include an artificial neural network (NN) that may update model parameters associated with the compression scheme based on past interference (or interference-plus-noise) measurements at the UE. Artificial neural networks that may support such machine learning techniques for channel compression include fully connected NNs, batch normalization NNs, dropout NNs, convolutional NNs, residual NNs, rectified linear unit (ReLU) NNs, and other types of NNs. A fully connected NN includes a series of fully connected layers that connect every neuron in one layer to every neuron in the other layer. A batch normalization NN includes a normalization step that fixes the means and variances of each layer of the neural network's inputs. A dropout NN may ignore randomly selected nodes during training of the neural network. For example, at each training stage, individual nodes are either dropped out of the dropout network with probability 1−p or kept with probability p. Convolutional NNs are also referred to as shift invariant or space invariant artificial neural networks (SIANN). A convolutional neural network includes an input layer, hidden layers and an output layer. In a feed-forward neural network, middle layers may be referred to as hidden because their inputs and outputs are masked by the activation function and final convolution. In a convolutional neural network, the hidden layers include layers that perform convolutions. The hidden layers may include a layer that performs a dot product of the convolution kernel with the layer's input matrix. This product may be the Frobenius inner product, and its activation function is commonly ReLU. As the convolution kernel slides along the input matrix for the layer, the convolution operation generates a feature map, which in turn contributes to the input of the next layer. This is followed by other layers such as pooling layers, fully connected layers, and normalization layers. An ReLu NN includes an ReLU activation function which is an activation function defined as the positive part of its argument $f(x)=x^+ =\max(0,x)$ where x is the input to a neuron. A residual NN may utilize skip connections to jump layers of the NN and may be implemented with double or triple layer skips that contain nonlinearities (e.g., ReLus) and batch normalization in between layers. The UE may report the learned or updated model parameters to the base station. The base station may receive learned or updated model parameters from multiple UEs. The base station may update parameters associated with the encoding or decoding based on the learned parameters received from the multiple UEs.

In some examples, the compression scheme may include an autoencoder. An autoencoder may refer to an NN that uses a feedforward approach to reconstitute an output from an input. An input is compressed at an encoder and then sent to a decoder to be decompressed. An autoencoder may be trained to minimize loss in the output.

Encoding interference (or interference-plus-noise) information in accordance with a compression scheme enables a UE to report measured and/or predicted interference (or interference-plus-noise) at the UE without transmitting an entire measured and/or predicted interference (or interference-plus-noise) distribution, thereby reducing resource overhead, and may enable a serving base station or network node to receive and determine correlation properties of the interference (or interference-plus-noise) at the UE, which the base station may account for when scheduling communications at the UE. For example, the base station may avoid scheduling communications for the UE in communications resources having a high estimated or predicted interference (or interference-plus-noise). The base station may schedule communications for the UE in communications resources having low estimated or predicted interference. Further, using machine learning techniques at the UE and/or the base station may enable the UE and the base station to minimize errors in the compression and reconstruction of the interference (or interference-plus-noise) information while also reducing resource overhead associated with reporting the interference (or interference-plus-noise) information.

Aspects of the disclosure are initially described in the context of wireless communications systems. Aspects of the disclosure are further illustrated by and described with reference to encoding and decoding schemes, machine learning processes, and process flows. Aspects of the disclosure are further illustrated by and described with reference to apparatus diagrams, system diagrams, and flowcharts that relate to interference distribution compression and reconstruction.

FIG. 1 illustrates an example of a wireless communications system 100 that supports interference distribution compression and reconstruction in accordance with one or more aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

In some examples, one or more components of the wireless communications system 100 may operate as or be referred to as a network node. As used herein, a network node may refer to any UE 115, base station 105, entity of a core network 130, apparatus, device, or computing system configured to perform any techniques described herein. For example, a network node may be a UE 115. As another example, a network node may be a base station 105. As another example, a first network node may be configured to communicate with a second network node or a third network node. In one aspect of this example, the first network node may be a UE 115, the second network node may be a base station 105, and the third network node may be a UE 115. In another aspect of this example, the first network node may be a UE 115, the second network node may be a base station 105, and the third network node may be a base station 105. In yet other aspects of this example, the first, second, and third network nodes may be different. Similarly, reference to a UE 115, a base station 105, an apparatus, a device, or a computing system may include disclosure of the UE 115, base station 105, apparatus, device, or computing system being a network node. For example, disclosure that a UE 115 is configured to receive information from a base station 105 also discloses that a first network node is configured to receive information from a second network node. In this example, consistent with this disclosure, the first network node may refer to a first UE 115, a first base station 105, a first apparatus, a first device, or a first computing system configured to receive the information; and the second network node may refer to a second UE 115, a second base station 105, a second apparatus, a second device, or a second computing system.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links. A UE 115 may communicate with the core network 130 through a communication link 155.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

Thus, as described herein, a base station 105 or network entity may include one or more components that are located at a single physical location or one or more components located at various physical locations. In examples in which the base station 105 includes components that are located at various physical locations, the various components may each perform various functions such that, collectively, the various components achieve functionality that is similar to a base station 105 that is located at a single physical location. As such, a base station 105 described herein may equivalently refer to a standalone base station 105 (also known as a monolithic base station) or a base station 105 including components that are located at various physical locations or virtualized locations (also known as a disaggregated base station). In some implementations, such a base station 105 including components that are located at various physical locations may be referred to as or may be associated with a disaggregated radio access network (RAN) architecture, such as an Open RAN (O-RAN) or Virtualized RAN (VRAN) architecture. In some implementations, such components of a base station 105 may include or refer to one or more of a central unit (or centralized unit CU), a distributed unit (DU), or a radio unit (RU). A network entity may obtain or output information or signals with a UE 115 directly (e.g., an RU may directly transmit and receive signals with a UE 115), or a network entity may obtain or output information of signals with a UE 115 indirectly or through an intermediary device (e.g., a DU may receive information or signals from a UE 115 via an RU).

In some examples, a base station 105 or network entity may be implemented in a disaggregated architecture (e.g., a disaggregated base station architecture, a disaggregated RAN architecture), which may be configured to utilize a protocol stack that is physically or logically distributed among two or more network entities, such as an IAB network, an O-RAN (e.g., a network configuration sponsored by the O-RAN Alliance), or a VRAN (e.g., a cloud RAN (C-RAN)). For example, a network entity may include one or more of a CU, a DU, an RU, a RAN Intelligent Controller (RIC) (e.g., a Near-Real Time RIC (Near-RT RIC), a Non-Real Time RIC (Non-RT RIC)), a Service Management and Orchestration (SMO) system, or any combination thereof. An RU may also be referred to as a radio head, a smart radio head, a remote radio head (RRH), a remote radio unit (RRU), or a transmission reception point (TRP). One or more components of the network entities in a disaggregated RAN architecture may be co-located, or one or more components of the network entities may be located in distributed locations (e.g., separate physical locations). In some examples, one or more network entities of a disaggregated RAN architecture may be implemented as virtual units (e.g., a virtual CU (VCU), a virtual DU (VDU), a virtual RU (VRU)).

The split of functionality between a CU, a DU, and an RU is flexible and may support different functionalities depending upon which functions (e.g., network layer functions, protocol layer functions, baseband functions, radio frequency (RF) functions, and any combinations thereof) are performed at a CU, a DU, or an RU. For example, a functional split of a protocol stack may be employed between a CU and a DU such that the CU may support one or more layers of the protocol stack and the DU may support one or more different layers of the protocol stack. In some examples, the CU may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU may be connected to one or more DUs or RUs, and the one or more DUs or RUs may host lower protocol layers, such as layer 1 (L1) (e.g., physical (PHY) layer) or L2 (e.g., radio link control (RLC) layer, medium access control layer) functionality and signaling, and may each be at least partially controlled by the CU. Additionally, or alternatively, a functional split of the protocol stack may be employed between a DU and an RU such that the DU may support one or more layers of the protocol stack and the RU may support one or more different layers of the protocol stack. The DU may support one or multiple different cells (e.g., via one or more RUs). In some cases, a functional split between a CU and a DU, or between a DU and an RU may be within a protocol layer (e.g., some functions for a protocol layer may be performed by one of a CU, a DU, or an RU, while other functions of the protocol layer are performed by a different one of the CU, the DU, or the RU). A CU may be functionally split further into CU control plane (CU-CP) and CU user plane (CU-UP) functions. A CU may be connected to one or more DUs via a midhaul communication link (e.g., F1, F1-c, F1-u), and a DU may be connected to one or more RUs via a fronthaul communication link (e.g., open fronthaul (FH) interface). In some examples, a midhaul communication link or a fronthaul communication link may be implemented in accordance with an interface (e.g., a channel) between layers of a protocol stack supported by respective network entities that are in communication via such communication links.

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a CSI-RS), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Techniques described herein, in addition to or as an alternative to be carried out between UEs 115 and base stations 105, may be implemented via additional or alternative wireless devices, including IAB nodes 104, DUs 165, CUs 160, RUs 170, and the like. For example, in some implementations, aspects described herein may be implemented in the context of a disaggregated RAN architecture (e.g., open RAN architecture). In a disaggregated architecture, the RAN may be split into three areas of functionality corresponding to the CU 160, the DU 165, and the RU 170. The split of functionality between the CU 160, DU 165, and RU 175 is flexible and as such gives rise to numerous permutations of different functionalities depending upon which functions (e.g., MAC functions, baseband functions, radio frequency functions, and any combinations thereof) are performed at the CU 160, DU 165, and RU 175. For example, a functional split of the protocol stack may be employed between a DU 165 and an RU 170 such that the DU 165 may support one or more layers of the protocol stack and the RU 170 may support one or more different layers of the protocol stack.

Some wireless communications systems (e.g., wireless communications system 100), infrastructure and spectral resources for NR access may additionally support wireless backhaul link capabilities in supplement to wireline backhaul connections, providing an IAB network architecture. One or more base stations 105 may include CUs 160, DUs 165, and RUs 170 and may be referred to as donor base stations 105 or IAB donors. One or more DUs 165 (e.g., and/or RUs 170) associated with a donor base station 105 may be partially controlled by CUs 160 associated with the donor base station 105. The one or more donor base stations 105 (e.g., IAB donors) may be in communication with one or more additional base stations 105 (e.g., IAB nodes 104) via supported access and backhaul links. IAB nodes 104 may support mobile terminal (MT) functionality controlled and/or scheduled by DUs 165 of a coupled IAB donor. In addition, the IAB nodes 104 may include DUs 165 that support communication links with additional entities (e.g., IAB nodes 104, UEs 115, etc.) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In some examples, the wireless communications system 100 may include a core network 130 (e.g., a next generation core network (NGC)), one or more IAB donors, IAB nodes 104, and UEs 115, where IAB nodes 104 may be partially controlled by each other and/or the IAB donor. The IAB donor and IAB nodes 104 may be examples of aspects of base stations 105. IAB donor and one or more IAB nodes 104 may be configured as (e.g., or in communication according to) some relay chain.

For instance, an access network (AN) or RAN may refer to communications between access nodes (e.g., IAB donor), IAB nodes 104, and one or more UEs 115. The IAB donor may facilitate connection between the core network 130 and the AN (e.g., via a wireline or wireless connection to the core network 130). That is, an IAB donor may refer to a RAN node with a wireline or wireless connection to core network 130. The IAB donor may include a CU 160 and at least one DU 165 (e.g., and RU 170), where the CU 160 may communicate with the core network 130 over an NG interface (e.g., some backhaul link). The CU 160 may host layer 3 (L3) (e.g., RRC, service data adaption protocol (SDAP), PDCP, etc.) functionality and signaling. The at least one DU 165 and/or RU 170 may host lower layer, such as layer 1 (L1) and layer 2 (L2) (e.g., RLC, MAC, physical (PHY), etc.). functionality and signaling, and may each be at least partially controlled by the CU 160. The DU 165 may support one or multiple different cells. IAB donor and IAB nodes 104 may communicate over an F1 interface according to some protocol that defines signaling messages (e.g., F1 AP protocol). Additionally, CU 160 may communicate with the core network over an NG interface (which may be an example of a portion of backhaul link), and may communicate with other CUs 160 (e.g., a CU 160 associated with an alternative IAB donor) over an Xn-C interface (which may be an example of a portion of a backhaul link).

IAB nodes 104 may refer to a RAN node that provides IAB functionality (e.g., access for UEs 115, wireless self-backhauling capabilities, etc.). IAB nodes 104 may include a DU 165 and an MT. A DU 165 may act as a distributed scheduling node towards child nodes associated with the IAB node 104, and the MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, an IAB node 104 may also be referred to as a parent node or a child node to other IAB nodes 104, depending on the relay chain or configuration of the AN. Therefore, the MT entity of IAB nodes 104 (e.g., MTs) may provide a Uu interface for a child node to receive signaling from a parent IAB node 104, and the DU interface (e.g., DUs 165) may provide a Uu interface for a parent node to signal to a child IAB node 104 or UE 115.

For example, IAB node 104 may be referred to a parent node associated with IAB node, and a child node associated with IAB donor. The IAB donor may include a CU 160 with a wireline (e.g., optical fiber) or wireless connection to the core network and may act as parent node to IAB nodes 104. For example, the DU 165 of IAB donor may relay transmissions to UEs 115 through IAB nodes 104, and may directly signal transmissions to a UE 115. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling over an NR Uu interface to MT of the IAB node 104. Communications with IAB node 104 may be scheduled by DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture (e.g., one or more IAB nodes 104 or components of IAB nodes 104) may be configured to support techniques for large round trip times in random access channel procedures as described herein. For example, some operations described as being performed by a UE 115 or a base station 105 may additionally or alternatively be performed by components of the disaggregated RAN architecture (e.g., IAB nodes, DUs, CUs, etc.).

A UE 115 may measure interference at the UE 115 using interference measurement resources such as a CSI-RS, a CSI-IM, or through an IMIR. Interference at a UE 115 may be caused, for example, by communications at neighboring base stations 105 or by sidelink communications between other UEs 115. In NR, slot structures may be more flexible as compared to slot structures in LTE. For example, NR may include mini-slots and URLLC slots. In some examples, short bursts of transmissions within a regular enhanced mobile broadband (eMBB) slot may begin at arbitrary symbol locations. In NR, unscheduled uplink transmissions from a UE without a grant from a base station may occur. NR may also include highly adaptive reference signal patterns (e.g., demodulation reference signal (DMRS) and CSI-RS patterns may depend on a number of antenna ports available, a delay tolerance, or doppler spread). Accordingly, interference may vary significantly from one UE 115 to another UE 115.

Interference at a UE 115 may vary in the time, frequency, and spatial domains, and interference at a UE 115 may also have correlations in the time, frequency, and spatial domains. For example, the correlation properties of the interference observed at a particular UE 115 may vary depending on the scheduling decisions at neighboring base stations 105. A UE 115 may predict interference on future communications resources based on interference correlations learned from previous communications resources. Interference measured at a UE 115 may be reported to a serving base station 105 via a CSF report. For example, a CSF report may include a rank index (RI), a channel quality index (CQI), and a PMI. The RI, CQI, and PMI may account for the interference level and the channel estimation at the UE 115. The CSF report (e.g., the included RI, CQI, and PMI) may not report information regarding the time, frequency, or spatial correlation properties of the interference. Accordingly, the serving base station 105 may not utilize the time, frequency, or spatial correlation properties of the interference at the UE 115 when scheduling communications with the UE 115 based on the CSF report. Because the variation of the interference at the UE 115 may be large (e.g., larger than the channel variations reported in the CSF reports), explicitly reporting the interference distribution to the serving base station may be associated with a large resource overhead and may be difficult to parameterize between different UEs.

In some examples, a UE 115-a may include a communications manager 102 that is configured to support one or more aspects of the techniques for interference distribution compression and reconstruction described herein. For example, a UE 115 may transmit, via the communications manager 102, compressed interference information to the base station 105 to decrease the resource overhead associated with explicit interference distribution reporting while enabling the base station 105 to account for interference correlations when scheduling communications with the UE 115. In some examples, a base station 105 may include a communications manager 101 that is configured to support one or more aspects of the techniques for interference distribution compression and reconstruction described herein. For example, the base station 105 may receive the compressed interference information via the communications manager 101.

The UE 115 may measure interference at the UE 115 over a set of interference measurement resources. The UE 115 may then determine an interference distribution over the set of resources. In some examples, the interference distribution may be one of a probability density function or a probability mass function. The UE 115 may encode the interference distribution using a compressions scheme which may reduce a payload or size of the interference distribution. The compression scheme may include compressing the distribution of interference measured over a given set of interference measurement resources. In some examples, encoding the interference information in accordance with the compression scheme may include generating a mean vector and a covariance matrix of a latent random variable representative of the distribution of interference measured over the given set of interference measurement resources. The mean vector and the covariance matrix of a latent random variable may describe the distribution of a probabilistic latent random vector associated with the measured interference. The UE 115 may transmit, via the communications manager 102, the encoded interference information, and the base station 105 may receive, via the communications manager 101, and decode the encoded interference information. The base station 105 may schedule communications with the UE 115 based on the interference information via the communications managers 101.

In some examples, the UE 115 or the base station 105 may predict a future interference distribution based on the past interference measurements at the UE 115 (e.g., predicted over a time/frequency grid for future symbols/slots). For example, the base station 105 may avoid assigning particular resources to the UE 115 if interference at those particular resources is predicted to be high. For usable resources (e.g., resources with low predicted interference), the UE 115 or the base station 105 may predict the time/frequency correlation of the interference which may be used for demodulation of communications involving the UE 115.

In some examples, the UE 115 may receive, via the communications manager 102, control signaling configuring aspects of the interference measurement resources and the encoding. For example, the base station 105 may transmit, via the communications manager 101, control signaling configuring the interference measurement resources for the UE 115, the compression scheme, parameters of the compression scheme, the encoding configuration for the encoder, and/or the input format to the encoder. In some examples, the base station 105 may adjust the interference measurement resources for the UE 115, the compression scheme, parameters of the compression scheme, the encoder, and/or the input format to the encoder based on the location of the UE 115 (e.g., a UE 115 at the edge of the cell 110 may be subject to higher interference than a cell-centered UE 115). In some examples, the base station 105 may adjust the interference measurement resources for the UE 115, the compression scheme, parameters of the compression scheme, the encoder, and/or the input format to the encoder based on knowledge of interference patters. For example, interference patterns may depend on external factors such as the number of active UEs 115, transmission configuration indications (TCIs), beams, and/or loading in a neighboring cell 110.

The UE 115 may include an artificial NN that may update model parameters associated with the compression scheme based on past interference measurements at the UE. Artificial NNs that may support such machine learning techniques for channel compression include fully connected NNs, batch normalization NNs, dropout NNs, convolutional NNs, residual NNs, ReLU NNs, and other types of NNs. The UE 115 may report the learned or updated model parameters to the base station. The base station 105 may receive learned or updated model parameters from multiple UEs 115. The base station 105 may update parameters associated with the encoding or decoding based on the learned parameters received from the multiple UEs 115.

Figure 2:
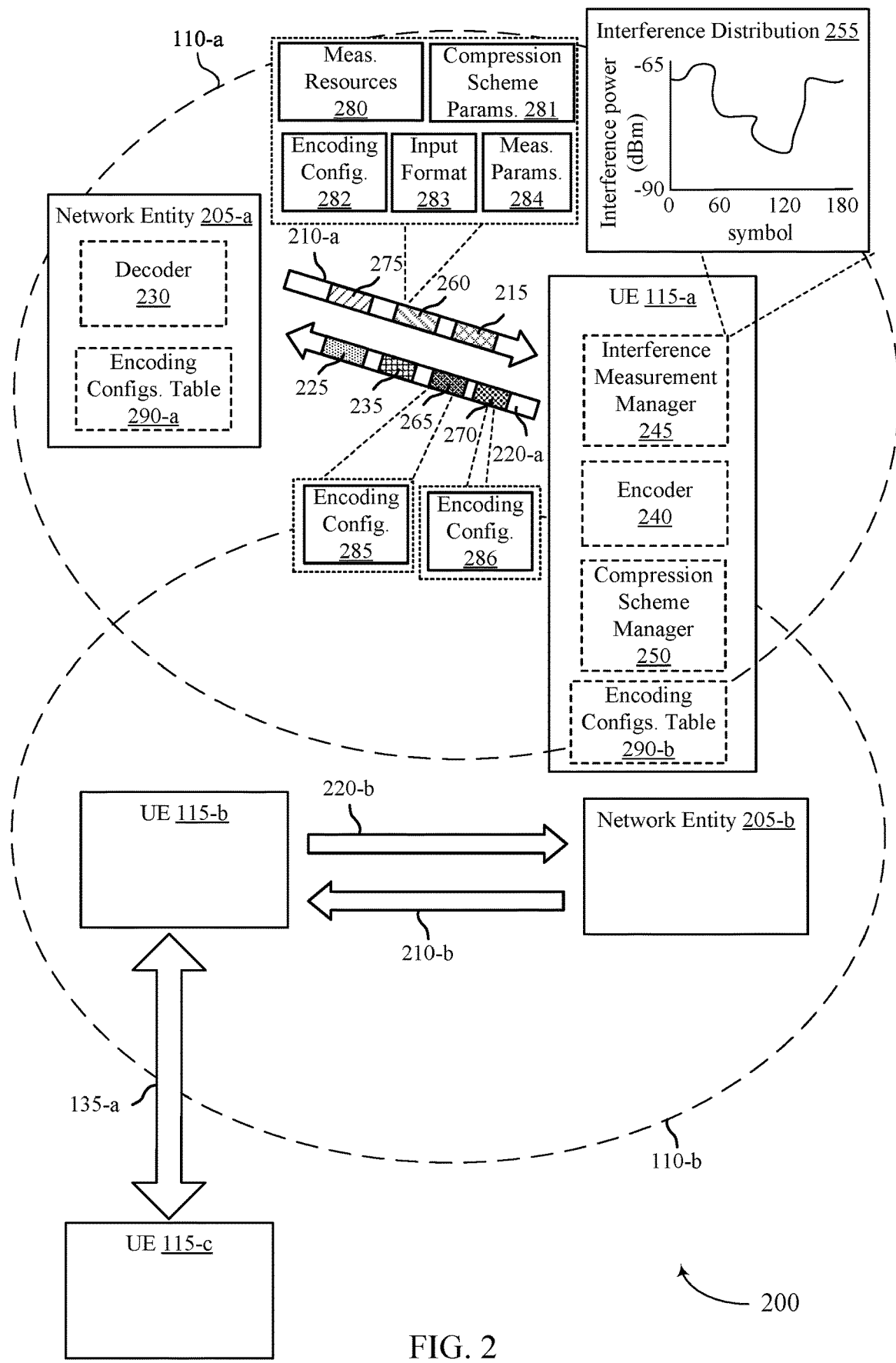
FIG. 2 illustrates an example of a wireless communications system that supports interference distribution compression and reconstruction in accordance with one or more aspects of the present disclosure.

FIG. 2 illustrates an example of a wireless communications system 200 that supports interference distribution compression and reconstruction in accordance with one or more aspects of the present disclosure. The wireless communications system 200 illustrates an example of communications between a network entity 205-a associated with a first coverage area 110-a, a network entity 205-b associated with a second coverage area 110-b, a UE 115-a, a UE 115-b, and a UE 115-c, which may be examples of corresponding devices described herein, including with reference to FIG. 1. For example, the network entity 205-a and/or the network entity 205-b may include all or some components of a base station 105 as described herein.

In the example of wireless communications system 200, the UE 115-a, one or more components of the network entity 205-a, or both may perform an estimation of signal propagation conditions between the network entity 205-a and the UE 115-a, which may be referred to as channel estimation. Signal propagation conditions may refer to path loss for a signal. For example, one or more components of the network entity 205-a may transmit downlink signaling 210-a, which may include a reference signal 215 (e.g., a CSI-RS, or a CRS, or another reference signal or combination of reference signals). The UE 115-a may monitor for such reference signals, and the UE 115-a may perform calculations based on measured or predicted characteristics (e.g., signal to noise ratio, signal to interference and noise ratio, reference signal received power) of the reference signal 215 of the downlink signaling 210-a to support various techniques for channel estimation. Based on monitoring for or receiving the reference signal 215, the UE 115-a may transmit uplink signaling 220-a (e.g., a responsive uplink transmission), which may be received by the network entity 205-a. The uplink signaling 220-a may include a CSF report 225, which may be a portion of an uplink control information (UCI) transmission by the UE 115-a (e.g., of a physical uplink control channel (PUCCH)), and may include a report of channel conditions based at least in part on a channel estimation performed by the UE 115-a, or may include measurements or indications of measurements of the reference signal 215 performed by the UE 115-a (e.g., to support a channel estimation calculation by the network entity 205-a), among other information or combinations of channel information.

As described herein, the UE 115-a may experience interference. For example, interference may be caused by communications at a neighboring network entity 205-b (e.g., downlink signaling 210-b or uplink signaling 220-b between the neighboring network entity 205-b and a UE 115-b) or sidelink communications between neighboring UEs 115 (e.g., sidelink signaling between the UE 115-b and a UE 115-c over sidelink communication link 135-a). The UE 115-a may measure interference at the UE 115-a using an interference measurement manager 245. For example, the interference measurement manager 245 may measure interference using interference measurement resources 280 assigned for measuring interference at the UE 115-a (e.g., a CSI-RS, a CSI-IM, or through an IMR). The UE 115-a may determine an interference distribution 255 based on the measured interference.

The UE 115-a may transmit a message 235 to the network entity 205-a including interference information representative of the interference distribution 255, where the interference distribution is encoded according to a compression scheme. The UE 115-a may include an encoder 240 to encode the interference information according to a compression scheme. The encoder 240 may refer to software, firmware, or hardware, or any combination thereof operable to encode interference information according to a compression scheme. Encoding the interference information according to a compression scheme may decrease the resource overhead associated with explicit interference distribution reporting while enabling the network entity 205-a to account for interference correlations when scheduling communications with the UE 115-a. The UE 115-a may measure interference at the UE 115-a over a set of interference measurement resources. The UE 115-a may determine an interference distribution 255 over the set of interference measurement resources 280 using the interference measurement manager 245. The UE 115-a may encode the interference information representative of the interference distribution 255 using a compressions scheme which may reduce a payload or size of the interference information. The compression scheme may include compressing the distribution of interference measured over a given set of interference measurement resources. In some examples, the distribution of interference may be one of a probability density function or a probability mass function. In some examples, encoding the interference information in accordance with the compression scheme may include generating a mean vector and a covariance matrix of a latent random variable representative of the distribution of interference measured over the given set of interference measurement resources. The UE 115-a may transmit the encoded interference information over a message 235, and the network entity 205-a may receive the message 235 and decode the included encoded interference information. The network entity 205-a may transmit scheduling information 275 for communications with the UE 115-a based on the interference information received in the message 235.

In some examples, the encoder 240 may be configured in accordance with various machine learning techniques (e.g., for a neural network-based interference information compression scheme, when operating as or otherwise in accordance with an autoencoder), where such techniques may be performed by one or both of the network entity 205-*a* or the UE 115-*a*.

The compression scheme may also involve a decoder 230 at the network entity 205-*a*, which may refer to software, firmware, or hardware, or any combination thereof operable to decompress the encoded interference information in the message 235 as received in the uplink signaling 220-*a* by the network entity 205-*a*. In some examples, a decoder 230 may be configured in accordance with various machine learning techniques (e.g., for a neural network-based interference information compression scheme, when operating as or otherwise in accordance with an autoencoder), where such techniques may be performed by one or both of the network entity 205-*a* or the UE 115-*a*.

In some examples, the ULE 115-*a* or the network entity 205-*a* may predict a future interference distribution based on the past interference measurements at the UE 115-*a* (e.g., predicted over a time/frequency grid for future symbols/slots). For example, the network entity 205-*a* may avoid assigning particular resources to the UE 115-*a* if interference at those particular resources is predicted to be high. For usable resources (e.g., resources with low predicted interference), the UE 115-*a* or the network entity 205-*a* may predict the time/frequency correlation of the interference which may be used for demodulation of communications involving the UE 115-*a*. For example, in the time domain, the 120th symbol of the interference distribution 255 may be associated with a low interference.

In some examples, the UE 115-*a* may receive control signaling 260 configuring aspects of the interference measurement resources and the encoding. The control signaling 260 may be transmitted through a radio resource control message, a MAC control element (MAC-CE) message, or dynamically through a downlink control information (DCI) message. For example, the network entity 205-*a* may configure the interference measurement resources 280 for the UE 115-*a*, parameters of the compression scheme 281, the encoding configuration 282 for the encoder, the input format 283 to the encoder, and/or parameters associated with measuring the interference 284. In some examples, the network entity 205-*a* may adjust the interference measurement resources 280 for the UE 115-*a*, parameters of the compression scheme 281, the encoding configuration, the input format 283 to the encoder, and/or parameters associated with measuring the interference 284 based on the location of the UE 115-*a* (e.g., a UE 115-*a* at the edge of the cell associated with the network entity 205-*a* may be subject to higher interference than a cell-centered UE 115-*a*). In some examples, the network entity 205-*a* may adjust the interference measurement resources 280 for the UE 115-*a*, parameters of the compression scheme 281, the encoding configuration 282, the input format 283 to the encoder, and/or parameters associated with measuring the interference 284 based on knowledge of interference patterns. For example, interference patterns may depend on external factors such as the number of active UEs 115, transmission configuration indications (TCIs), beams, and/or loading associated with a neighboring network entity 205-*b*.

For example, the network entity 205-*a* may configure an encoding configuration 282 (e.g., for the encoder 240) at the UE 115-*a* via control signaling 260. The network entity 205-*a* may reconstruct interference information representative of an interference distribution received as encoded interference information from the UE 115-*a* using a corresponding decoder. In some examples, the configured encoding configuration 282 (which configures the encoder 240) and the corresponding decoder 230 may be or include artificial neural networks or autoencoders. Autoencoders may be used to reduce the size of inputs into a smaller representation which then recover the original data using the compressed version and a code.

In some examples, the network entity 205-*a* may configure parameters of the compression scheme 281 at the UE 115-*a* via the control signaling 260. For example, for machine learning based encoders and decoders, the parameters of the compression scheme 281 may be code-size, a number of layers, a number of nodes per layer, and/or the loss function used at the UE 115-*a* to compress the interference information. The code-size may represent a trade-off between overhead size associated with the interference reporting and interference distribution reconstruction errors.

In some examples, the network entity 205-*a* may configure parameters associated with measuring the interference 284 at the UE 115-*a* via the control signaling 260. For example, the network entity 205-*a* may configure the time, frequency, and/or spatial, e.g., beam, resources to be used for the interference measurement, estimation, and/or prediction. In some examples, the network entity 205-*a* may configure the granularity of the interference estimation and/or prediction. For example, the network entity 205-*a* may configure, for frequency granularity, whether the interference estimation is based on full band or sub-band (and the different granularities for different sub-bands). As another example, the network entity 205-*a* may configure, for time granularity, whether the interference estimation is based on symbol-level interference or slot level interference or multi-slot level interference. As another example, for spatial granularity, the network entity 205-*a* may configure interference estimation on specific beams.

In some examples, the network entity 205-*a* may configure via the control signaling 260 an input format 283 for the encoder 240. For example, the input format 283 may include the estimated interference distribution, the zero power or non-zero power CSI-RS for interference measurement, and/or the estimated interference measured on previous interference measurement resources.

In some examples, the UE 115-*a* may transmit a capability message 265 indicating a capability of the UE 115-*a* to encode interference information. For example, the UE 115-*a* may indicate one or more types of encoders and/or encoding parameters the UE 115-*a* is capable of supporting. In some examples, the capability message 265 may include a recommendation of an encoding configuration 285. For example, the UE 115-*a* may indicate an index associated with the recommended encoder (e.g., from a set of encoders each associated with a respective index in a table 290). For example, the UE 115-*a* and the network entity 205-*a* may each be configured with a table or index storing types of encoders and/or encoding configurations. In response, in some examples, the network entity 205-*a* may transmit the control signaling 260 configuring aspects of the encoding (e.g., the encoding configuration 282, the parameters of the compression scheme 281, or the input format 283) based on the indicated capability of the UE 115-*a*.

In some examples, the output of the encoder 240 may be a compressed estimated or predicted interference distribution for a set of resources in time, frequency and space. In some examples, UE 115-*a* may report the compressed interference distribution as part of a CSF report. For example, the compressed interference distribution may be included as a quantity in a CSI report (e.g., a layer 1 interference report may be added to the CSF report in NR).

Figure 3A:
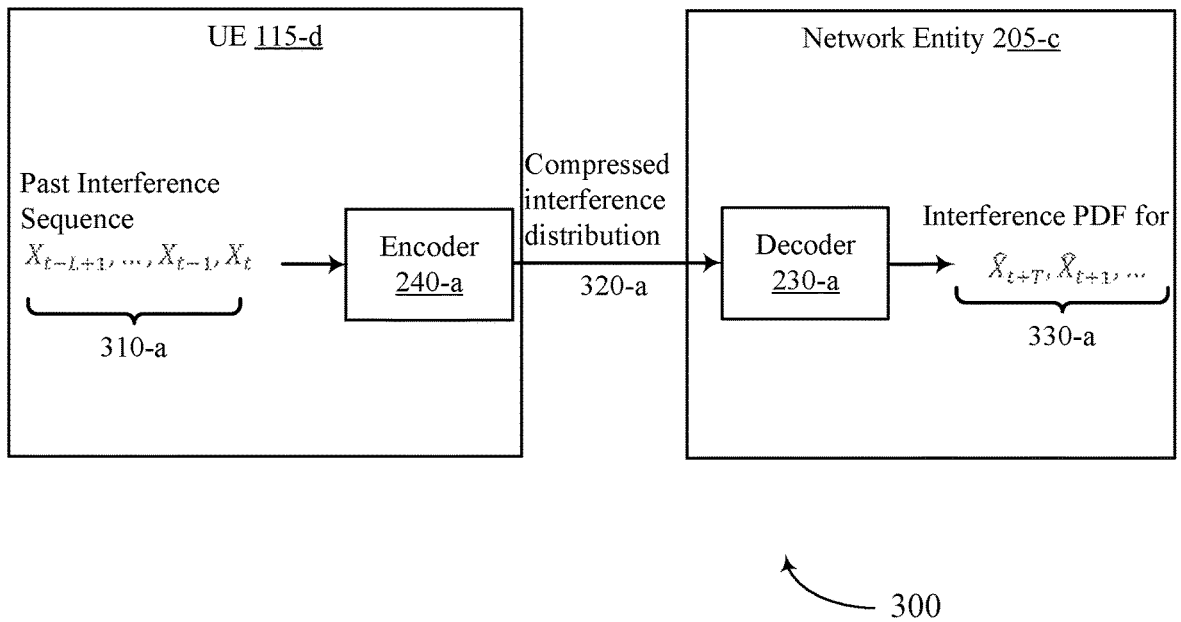
FIGS. 3a and 3b illustrate example of encoding and decoding schemes that support interference distribution compression and reconstruction in accordance with one or more aspects of the present disclosure.
Figure 3B:
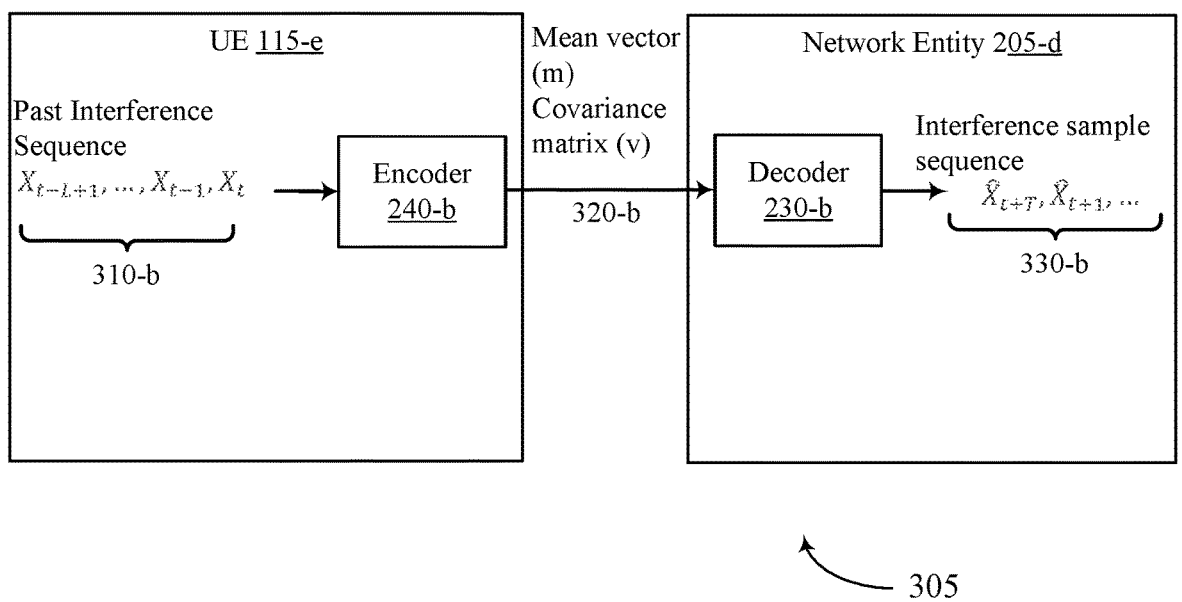

In some examples, the output of the encoder 240 may be a mean vector and a covariance matrix that describes the distribution of a latent random vector associated with the measured interference, as described herein with reference to FIG. 3b.

Machine learning techniques may be used by the wireless communications system 200 to support interference information compression schemes, which may include training an encoder (e.g., training an autoencoder, evaluating or configuring parameters to be used in the encoder 240), encoding information such as encoding interference information, training a decoder (e.g., training an autoencoder, evaluating or configuring parameters to be used in the decoder 230), decoding information such as decoding interference information, or any combination thereof. Such machine learning techniques may include one or more artificial neural networks that may be implemented by one or both of a transmitting device (e.g., the UE 115-a) or a receiving device (e.g., the network entity 205-a). Artificial neural networks that may support such machine learning techniques for channel compression include fully connected neural networks, batch normalization neural networks, dropout neural networks, convolutional neural networks, residual neural networks, ReLU neural networks, and other types of neural networks.

Although machine learning techniques may be implemented by the wireless communications system 200 for training interference information compression schemes, in some examples, there may be a mismatch of interference information used for training and interference information used for inference. For example, machine learning techniques may be trained according to a known interference distribution (e.g., lab conditions, known or predicted parameters, known or predicted hardware characteristics, a particular modeling approach), which may not match the devices (e.g., hardware characteristics or configurations of the network entity 205-a, of the UE 115-a, or both) or interference distribution statistics (e.g., interfering signals from other UEs 115 or network entities 205 affecting downlink signaling 210-a or the uplink signaling 220-a, information or payload associated with a given interference distribution) for inference, which may be more complicated or may present a risk or uncertainty regarding some machine learning techniques. In some examples, one compression scheme may be unsuitable or otherwise less favorable for conveying the interference information compared to another compression scheme.

The UE 115-a may include an artificial NN that may update model parameters associated with the compression scheme based on past interference measurements at the UE. Artificial NNs that may support such machine learning techniques for channel compression include fully connected NNs, batch normalization NNs, dropout NNs, convolutional NNs, residual NNs, ReLU NNs, and other types of NNs. The UE 115-a may report the learned or updated model parameters to the network entity 205-a in an update message 270. The network entity 205-a may receive learned or updated model parameters from multiple UEs 115. The network entity 205-a may update parameters associated with the encoding or decoding based on the learned parameters received from the multiple UEs 115.

In some examples, the UE 115-a may report learned interference compression model parameters (e.g., neural network weights) which may assist the network entity 205-a in enhancing a global model for interference distribution compression across UEs 115 served by the network entity 205-a. For example, the network entity 205-a may apply a federated learning approach for interference distribution compression.

For example, according to a federated learning approach, the UE 115-a may observe interference measurement resources (e.g., CSI-RS, CSI-IM, or IMR) and estimate the interference from the interference measurement resources. The network entity 205-a may define and configure the architecture for the encoder 240 and decoder 230. For example, the UE 115-a may store a table 290-b of encoder models in memory, and the network entity 205-a may signal to the UE 115 via the control signaling 260 the index of a selected encoding configuration 282. In some examples, the network entity 205-a may store a table 290-a of encoder models in memory, which may correspond to the table 290-b stored in memory of the UE 115-a. In some examples, the UE 115-a may signal (e.g., via uplink control information) the index of a selected or recommended encoder model (e.g., encoding configuration 286).

The UE 115-a may encode the interference information representative of the interference distribution over the interference measurement resources and transmit the encoded interference information to the network entity 205-a. The UE 115-a may update machine-learning based model parameters (e.g., model coefficients) for compressing or decompressing the interference distribution (based on sufficient interference measurements). In some examples, however, the UE 115-a continues to encode the interference distribution using the configured weights.

The network entity 205-a may transmit signaling to the UE 115-a requesting the UE 115-a to report the learned model parameters. In response, the UE 115-a may report the learned model parameters to the network entity 205-a. The network entity 205-a may update a global model for interference prediction. In some examples, the network entity 205-a may transmit control signaling 260 indicating updated parameters for the interference distribution encoder (e.g., updated coefficients for an existing encoder model defined in a table in memory of the UE 115-a).

To support transmission of an interference information report 235, the UE 115-a may include a compression scheme manager 250 operable to select between compression schemes (e.g., indicated by control signaling 260), based on various criteria. In some examples, one of the first or the second compression schemes may be configured (e.g., at the compression scheme manager 250) as a default or target interference distribution compression scheme (e.g., a neural network-based interference distribution compression scheme). In some examples, the UE 115-a (e.g., the compression scheme manager 250) may switch to a different interference distribution compression scheme (e.g., to a codebook-based interference distribution compression scheme, to a regular codebook, to a legacy codebook, to a fallback interference distribution compression scheme) or otherwise select an interference distribution compression scheme if certain conditions are met or not met.

In some examples, a condition for evaluating or selecting between a first interference distribution compression scheme and a second interference distribution compression scheme may involve a calculation or comparison of differences or errors associated with different interference distribution compression schemes (e.g., a threshold or comparison of mean-squared error (MSE) of one interference distribution compression scheme or another, such as determining to switch to a regular codebook-based interference distribution compression scheme when a neural network-based interference distribution compression scheme has a higher MSE). In some examples, an operating condition of the UE 115-a may be considered (e.g., at the compression scheme manager 250) in the evaluation or selection of interference distribution compression schemes, such as evaluating or selecting an interference distribution compression scheme based on power availability (e.g., battery status), power consumption (e.g., associated with one interference distribution compression scheme or another), processor availability (e.g., available processing cycles), processor load (e.g., associated with one interference distribution compression scheme or another), or any combination thereof.

In an example for evaluating interference distribution compression schemes relative to power consumption (e.g., associated with performing an encoding in accordance with a particular interference distribution compression scheme), a codebook-based interference distribution compression scheme may be associated with a power, P1, and a neural network-based interference distribution compression scheme may be associated with a power, P2. An evaluation between the codebook-based interference distribution compression scheme and the neural network-based compression scheme by the UE 115-a may be associated with a parameter, $\alpha$, which may be communicated using control signaling 260. If a condition of P1*$\alpha$<P2 is met, the UE 115-a may select an encoding or decoding in accordance with the codebook-based interference distribution compression scheme (e.g., configuring the encoder 240 in accordance with the codebook-based interference information compression scheme, encoding the interference information in accordance with the codebook-based interference distribution compression scheme, indicating that the decoder 230 should be configured in accordance with the codebook-based interference distribution compression scheme). If the condition of P1*$\alpha$<P2 is not met, the UE 115-a may select an encoding or decoding in accordance with the neural network-based interference information compression scheme (e.g., configuring the encoder 240 in accordance with an autoencoder, encoding the interference distribution in accordance with the neural network-based compression scheme, indicating that the decoder 230 should be configured in accordance with the neural network-based interference distribution compression scheme, indicating that the decoder 230 should be configured in accordance with an autoencoder).

Additionally, or alternatively, in an example for evaluating interference distribution compression schemes relative to processing load (e.g., associated with a processing load for performing an encoding in accordance with a particular interference distribution compression scheme), a codebook-based interference distribution compression scheme may be associated with a processing load, L1, and a neural network-based interference distribution compression scheme may be associated with a processing load, L2. An evaluation between the codebook-based interference distribution compression scheme and the neural network-based compression scheme by the UE 115-a may be associated with a parameter, $\beta$, which may be communicated using control signaling 260. If a condition of L1*$\beta$<L2 is met, the UE 115-a may select to perform an encoding in accordance with the codebook-based interference distribution compression scheme (e.g., configuring the encoder 240 in accordance with the codebook-based interference distribution compression scheme, encoding the interference distribution in accordance with the codebook-based interference distribution compression scheme, indicating that the decoder 230 should be configured in accordance with the codebook-based interference distribution compression scheme). If the condition of L1*$\beta$<L2 is not met, the UE 115-a may select an encoding or decoding in accordance with the neural network-based interference distribution compression scheme (e.g., configuring the encoder 240 in accordance with an autoencoder, encoding the interference distribution in accordance with the neural network-based compression scheme, indicating that the decoder 230 should be configured in accordance with the neural network-based interference distribution compression scheme, indicating that the decoder 230 should be configured in accordance with an autoencoder).

In some examples, a condition for selecting one interference distribution compression scheme or another may be supported by an artificial neural network or corresponding neural network configuration involved in an interference distribution compression scheme itself (e.g., an artificial neural network associated with the encoder 240, an artificial neural network associated with the decoder 230, or associated with a configuration thereof). For example, an artificial neural network used in the evaluation of interference distribution compression schemes (e.g., at the compression scheme manager 250) for transmitting an interference information report 235 may take an input of an autoencoder, an estimated channel (e.g., information related to the estimation of signal propagation between the network entity 205-a and the UE 115-a), and an output of a regular or default interference distribution compression scheme (e.g., an output of a neural network-based interference distribution compression scheme). In some examples, an artificial neural network supporting such an evaluation may output a Boolean value that indicates whether to fall back to the regular or default interference distribution compression scheme (e.g., fall back to a codebook-based interference distribution compression scheme).

In some examples, the network entity 205-a may configure the parameters for interference prediction at specific UEs 115 based on the location of the UE 115 or based on known interference patterns. For example, the network entity 205-a may transmit control signaling 260 to the UE 115-a indicating the index of an interference distribution encoder from a defined table (e.g., stored in memory of the UE 115-a).

FIG. 3a illustrates an example of an encoding and decoding scheme 300 that supports interference distribution compression and reconstruction in accordance with one or more aspects of the present disclosure. In some examples, the encoding and decoding scheme 300 may be implemented by or may implement aspects of the wireless communications system 100 or the wireless communications system 200. The encoding and decoding scheme 300 may include a UE 115-d, which may be an example of a UE 115 as described herein. The encoding and decoding scheme 300 may also include a network entity 205-c, which may include all or some components of a base station 105 as described herein.

The UE 115-d may encode, via an encoder 240-a, a past interference sequence 310-a representative of interference measured at the UE 115-d. The output 320-a of the encoder 240-a may be a compressed interference distribution. The UE 115-d may transmit the compressed interference distribution to a network entity 205-c. The network entity 205-c may include a decoder 230-a, which receives the compressed interference distribution as an input and decodes the compressed interference distribution according to the compression scheme. The output 330-a of the decoder 230-a may be an interference distribution.

In some examples, the input 310-a may be a predicted interference sequence (e.g., the UE 115 may predict future interference based on interference measurements), and the output 330-a may correspondingly be the recovered predicted interference distribution.

Utilizing the encoder 240-a and the decoder 230-a may enable the UE 115-d to report measured and/or predicted interference at the UE 115-d without transmitting an entire measured or predicted interference distribution and may enable the network entity 205-c to receive and determine correlation properties of the interference at the UE 115-d, which the network entity 205-c may account for when scheduling communications at the UE 115-d.

FIG. 3b illustrates an example of an encoding and decoding scheme 305 that supports interference distribution compression and reconstruction in accordance with one or more aspects of the present disclosure. In some examples, the encoding and decoding scheme 305 may be implemented by or may implement aspects of the wireless communications system 100 or the wireless communications system 200. The encoding and decoding scheme 305 may include a UE 115-e, which may be an example of a UE 115 as described herein. The encoding and decoding scheme 305 may also include a network entity 205-d, which may include all or some components of a base station 105 as described herein.

A UE 115-e may encode, via an encoder 240-b, a past interference sequence 310-b representative of interference measured at the UE 115 using a generative model. In some examples, the encoder 240-b may take the past interference sequence 310-b and generate a mean vector (m) and a covariance matrix (V) that describe the distribution of the latent random vector z~N(m,V), where m and V are outputs of the encoder (m,V)=$q_\psi$(x), where $q_\psi$ denotes the encoder 240-b parameterized by $\psi$, and N refers to a Gaussian (e.g., normal) distribution. The UE 115-e may transmit the output 320-b of the encoder, the mean vector (m) and the covariance matrix (V). The network entity 205-d may include a decoder 230-b. The network entity 205-d may generate a random sample according to the distribution z~N(m,V) and feed z into the decoder 230-b. The output 330-b of the decoder 230-b may be a predicted interference sample x~$q_\theta$(x|z), where $q_\theta$ denotes the decoder 230-b parameterized by $\theta$, which receives the compressed interference distribution as an input and decodes the compressed interference distribution according to the compression scheme. The output 330-b of the decoder 230-b may be an interference sample sequence. A probability density function of the predicted interference sample x may be obtained as p(x)=$\int g_\theta$(x|z)p(z)dz, which may be approximated by sampling z multiple times as $$p(x) \approx \frac{1}{N}\sum_{n=0}^{N} q_\theta(x|z_n).$$

Figure 4:
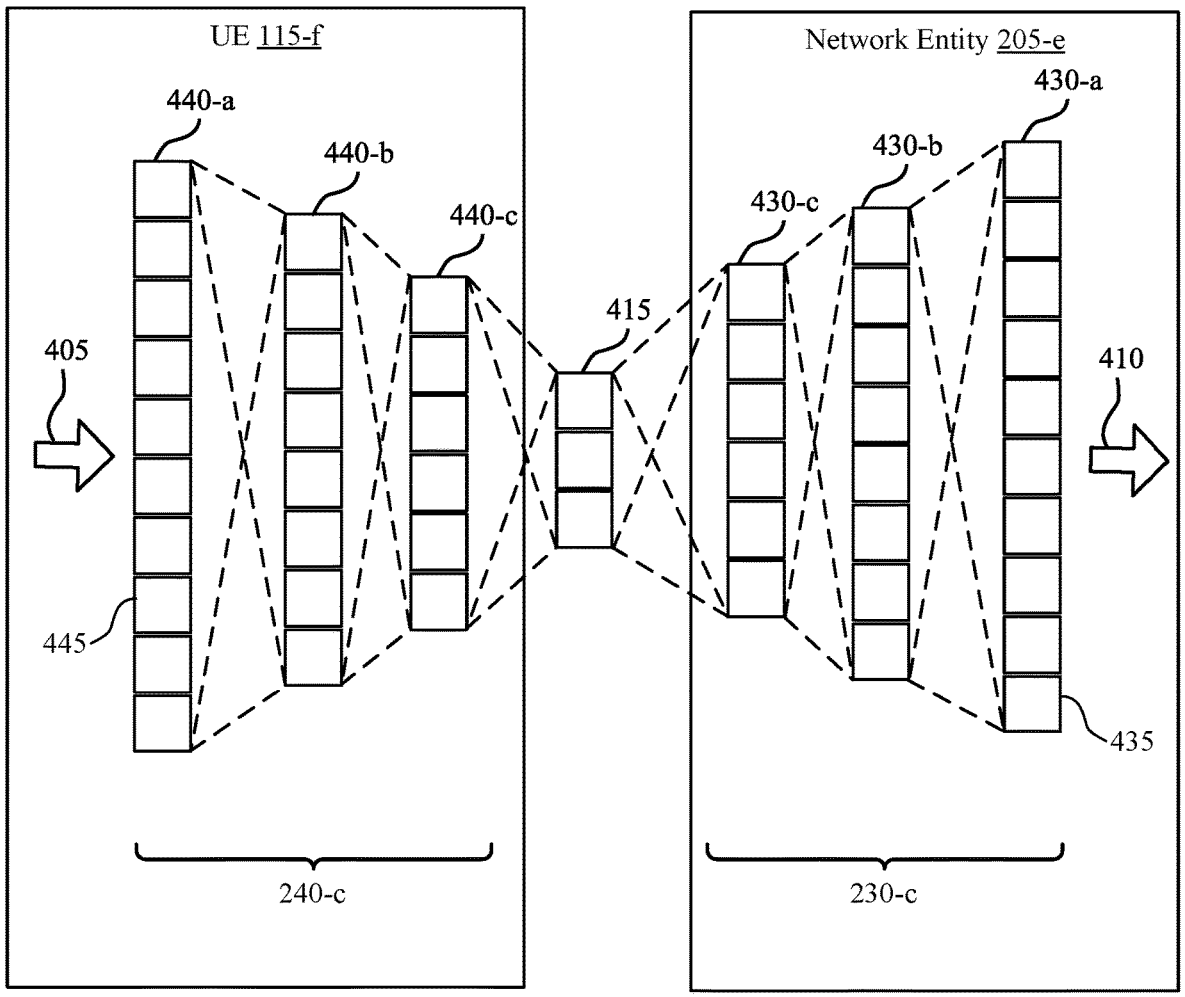
FIG. 4 illustrates an example of an autoencoder that supports interference distribution compression and reconstruction in accordance with one or more aspects of the present disclosure.

FIG. 4 illustrates an example of an autoencoder 400 that supports interference distribution compression and reconstruction in accordance with one or more aspects of the present disclosure. The autoencoder 400 may be implemented at a network entity 205-e and/or a UE 115, or both as described with reference to FIGS. 1 through 3.

The autoencoder 400 includes an encoder 240-c and a decoder 230-c which may each include multiple layers (440 and 430, respectively). The encoder 240-c may be implemented in a UE 115-f. The encoder 240-c may receive an input 405 at the first layer 440-a, and the encoder 240-c may compress the received input at each successive layer 440-b and 440-c. The input 405 may be an interference distribution. Each layer 440 of the encoder 240-c may include multiple nodes 445. The encoder 240-c may reduce the size of the interference distribution into a smaller representation at each layer 440 of the encoder. For example, each successive layer 440 of the encoder 240-c may include fewer nodes 445. The code 415 may be the output of the encoder 240-c. The code 415 may be transmitted to the decoder 230-c. The decoder 230-c may be implemented in a network entity 205-d. For example, the code 415 may be transmitted from a UE 115, which may include the encoder 240-c, to a network entity 205-e, which may include the decoder 230-c.

The decoder 230-c may receive the code 415 at a first layer 430-c and recover the original data or an estimate of the original data via passing the data through the successive layers 430-c, 430-b, and 430-a. Each layer 430 of the decoder 230-c may include multiple nodes 435. Each successive layer 430 of the decoder 230-c may include more nodes. The output 410 of the decoder 230-c may be the recovered data (e.g., the interference distribution).

The encoder 240-c and the decoder 230-c may be trained to minimize errors and resource overhead in the compression and recovery of the interference distribution. For example, the code-size may represent a trade-off between the overhead size and the interference distribution reconstruction errors. The encoder 240-c and the decoder 230-c may adjust the code size, the number of layers, the number of nodes per layer, and/or the loss function based on comparing the input 405 to the output 410. For example, the encoder 240-c and the decoder 230-c may periodically or aperiodically perform control routines (e.g., the encoder 240-c may compress and transmit a data set known to the decoder 230-c) such that the encoder 240-c and decoder 230-c may determine errors in the reconstruction and adjust parameters of the encoder 240-c and decoder 230-c. In some examples, the UE 115 may periodically or aperiodically transmit uncompressed interference distribution data to the network entity 205-e such that the encoder 240-c and decoder 230-c may determine errors in the reconstruction of the corresponding compressed interference distribution data and adjust parameters of the encoder 240-c and decoder 230-c.

Figure 5:
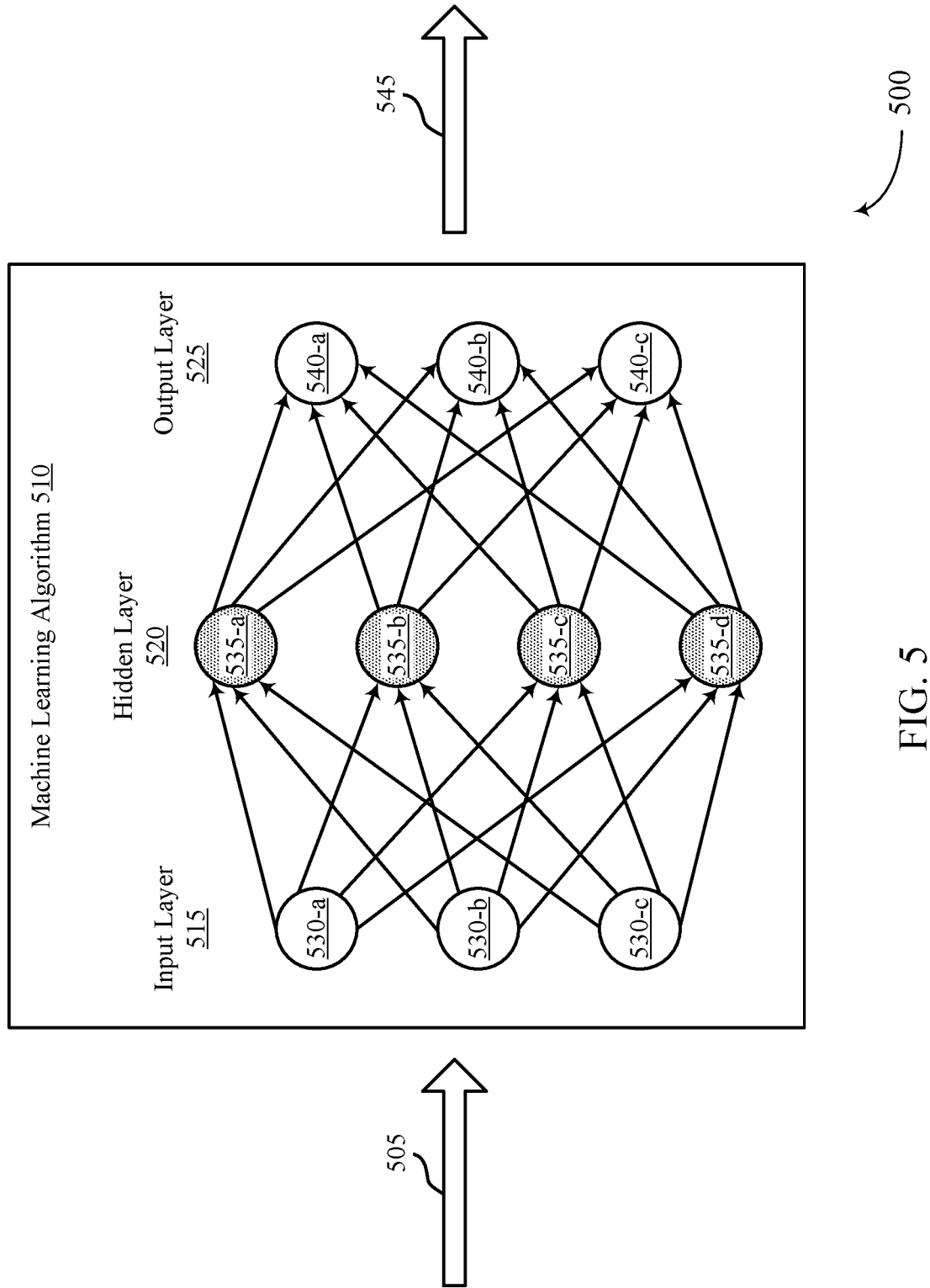
FIG. 5 illustrates an example of a machine learning process that support interference distribution compression and reconstruction in accordance with one or more aspects of the present disclosure.

FIG. 5 illustrates an example of a machine learning process 500 that supports interference distribution compression and reconstruction in accordance with one or more aspects of the present disclosure. The machine learning process 500 may be implemented at a base station 105 (e.g., at a network entity), or a UE 115, or both as described with reference to FIGS. 1 through 3.

The machine learning process 500 may include a machine learning algorithm 510. As illustrated, the machine learning algorithm 510 may be an example of an artificial neural network, such as a feed forward (FF) or deep feed forward (DFF) neural network, a recurrent neural network (RNN), a long/short term memory (LSTM) neural network, or any other type of artificial neural network. However, any other machine learning algorithms may be supported. For example, the machine learning algorithm 510 may implement a nearest neighbor algorithm, a linear regression algorithm, a Naïve Bayes algorithm, a random forest algorithm, or any other machine learning algorithm. Furthermore, the machine learning process 500 may involve supervised learning, unsupervised learning, semi-supervised learning, reinforcement learning, or any combination thereof.

The machine learning algorithm 510 may include an input layer 515, one or more hidden layers 520, and an output layer 525. In a fully connected neural network with one hidden layer 520, each hidden layer node 535 may receive a value from each input layer node 530 as input, where each input may be weighted. These neural network weights may be based on a cost function that is revised during training of the machine learning algorithm 510. Similarly, each output layer node 540 may receive a value from each hidden layer node 535 as input, where the inputs are weighted. If post-deployment training (e.g., online training) is supported, memory may be allocated to store errors and/or gradients for reverse matrix multiplication. These errors and/or gradients may support updating the machine learning algorithm 510 based on output feedback. Training the machine learning algorithm 510 may support computation of the weights (e.g., connecting the input layer nodes 530 to the hidden layer nodes 535 and the hidden layer nodes 535 to the output layer nodes 540) to map an input pattern to a desired output outcome. This training may result in a device-specific machine learning algorithm 510 based on the historic application data and data transfer for a specific base station 105 or UE 115.

In some examples, input values 505 may be sent to the machine learning algorithm 510 for processing. In some examples, preprocessing may be performed according to a sequence of operations on the input values 505 such that the input values 505 may be in a format that is compatible with the machine learning algorithm 510. The input values 505 may be converted into a set of k input layer nodes 530 at the input layer 515. In some cases, different measurements may be input at different input layer nodes 530 of the input layer 515. Some input layer nodes 530 may be assigned default values (e.g., values of 0) if the number of input layer nodes 530 exceeds the number of inputs corresponding to the input values 505. As illustrated, the input layer 515 may include three input layer nodes 530-a, 530-b, and 530-c. However, it is to be understood that the input layer 515 may include any number of input layer nodes 530 (e.g., 20 input nodes).

The machine learning algorithm 510 may convert the input layer 515 to a hidden layer 520 based on a number of input-to-hidden weights between the k input layer nodes 530 and the n hidden layer nodes 535. The machine learning algorithm 510 may include any number of hidden layers 520 as intermediate steps between the input layer 515 and the output layer 525. Additionally, or alternatively, each hidden layer 520 may include any number of nodes. For example, as illustrated, the hidden layer 520 may include four hidden layer nodes 535-a, 535-b, 535-c, and 535-d. However, it is to be understood that the hidden layer 520 may include any number of hidden layer nodes 535 (e.g., 10 input nodes). In a fully connected neural network, each node in a layer may be based on each node in the previous layer. For example, the value of hidden layer node 535-a may be based on the values of input layer nodes 530-a, 530-b, and 530-c (e.g., with different weights applied to each node value).

The machine learning algorithm 510 may determine values for the output layer nodes 540 of the output layer 525 following one or more hidden layers 520. For example, the machine learning algorithm 510 may convert the hidden layer 520 to the output layer 525 based on a number of hidden-to-output weights between the n hidden layer nodes 535 and the m output layer nodes 540. In some cases, n=m. Each output layer node 540 may correspond to a different output value 545 of the machine learning algorithm 510. As illustrated, the machine learning algorithm 510 may include three output layer nodes 540-a, 540-b, and 540-c, supporting three different threshold values. However, it is to be understood that the output layer 525 may include any number of output layer nodes 540. In some examples, post-processing may be performed on the output values 545 according to a sequence of operations such that the output values 545 may be in a format that is compatible with reporting the output values 545.

As described herein, a fully connected NN includes a series of fully connected layers that connect every neuron in one layer to every neuron in the other layer. A batch normalization NN includes a normalization step that fixes the means and variances of each layer of the neural network's inputs. A dropout NN may ignore randomly selected nodes during training of the neural network. For example, at each training stage, individual nodes are either dropped out of the net with probability 1−p or kept with probability p. Convolutional NNs are also referred to as shift invariant or space invariant artificial neural networks (SIANN). A convolutional neural network includes an input layer, hidden layers and an output layer. In a feed-forward neural network, middle layers may be referred to as hidden because their inputs and outputs are masked by the activation function and final convolution. In a convolutional neural network, the hidden layers include layers that perform convolutions. Typically, the hidden layers include a layer that performs a dot product of the convolution kernel with the layer's input matrix. This product is usually the Frobenius inner product, and its activation function is commonly ReLU. As the convolution kernel slides along the input matrix for the layer, the convolution operation generates a feature map, which in turn contributes to the input of the next layer. This is followed by other layers such as pooling layers, fully connected layers, and normalization layers. An ReLu NN includes an ReLU activation function which is an activation function defined as the positive part of its argument $f(x)=x^+=\max(0,x)$ where x is the input to a neuron. A residual NN may utilize skip connections to jump layers of the NN and may be implemented with double or triple layer skips that contain nonlinearities (e.g., ReLus) and batch normalization in between.

Figure 6:
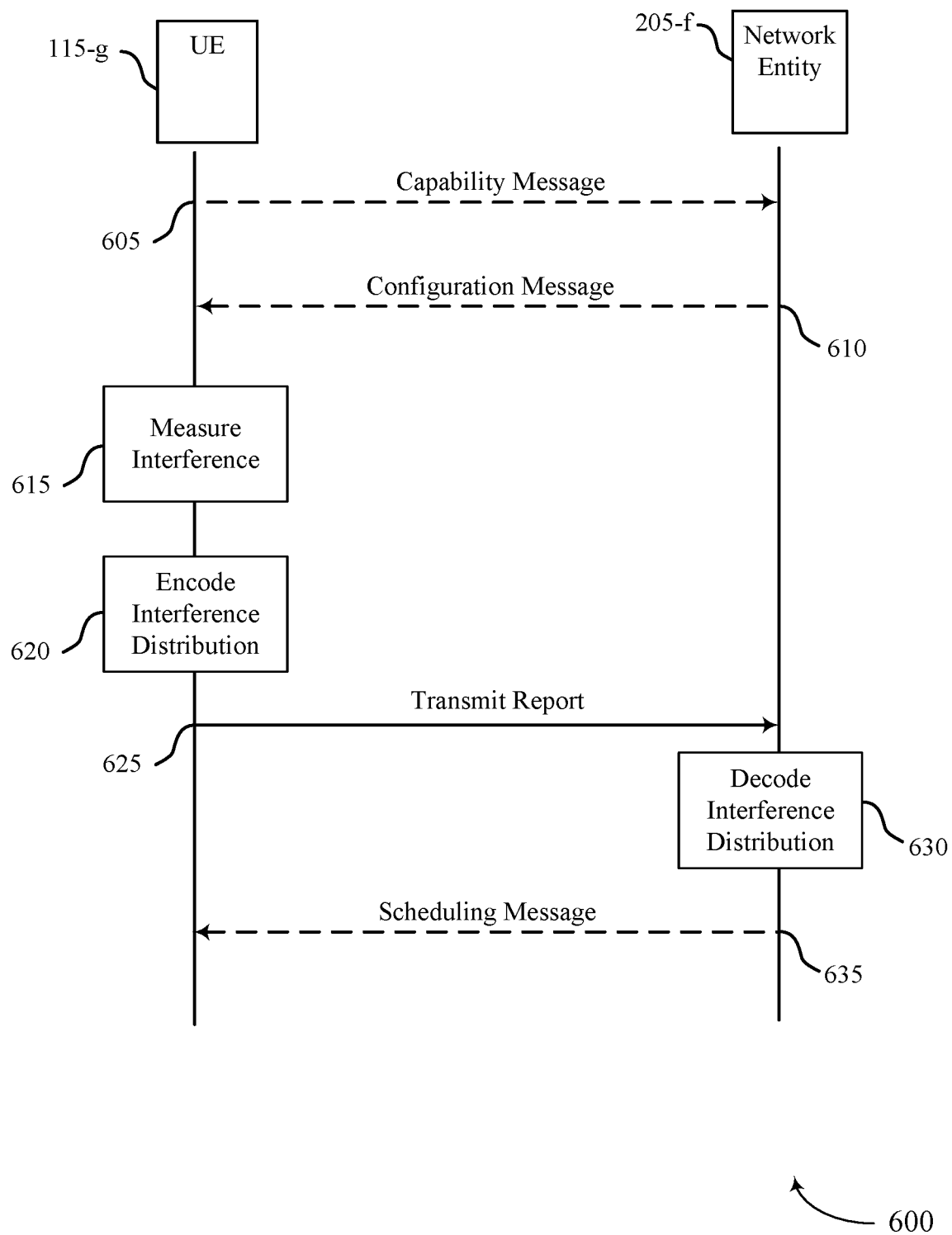
FIG. 6 illustrates an example of a process flow that supports interference distribution compression and reconstruction in accordance with one or more aspects of the present disclosure.

FIG. 6 illustrates an example of a process flow 600 that supports interference distribution compression and reconstruction in accordance with one or more aspects of the present disclosure. In some examples, the process flow 600 may be implemented by or may implement aspects of the wireless communications system 100 or the wireless communications system 200. The process flow 600 may include a UE 115-g which may be an example of a UE 115 as described herein. The process flow 600 may also include a network entity 205-f, which may include all or some components of a base station 105 as described herein. In the following description of the process flow 600, the operations between the network entity 205-f and the UE 115-g may be transmitted in a different order than the example order shown, or the operations performed by the network entity 205-f and the UE 115-g may be performed in different orders or at different times. Some operations may also be omitted from the process flow 600, and other operations may be added to the process flow 600.

At 605, the UE 115-g may transmit, to the network entity 205-f, an indication of a capability of the UE 115-g to encode interference information.

At 610, the network entity 205-f may transmit, to the UE 115-g, control signaling associated with interference information reporting. In some examples, the control signaling may indicate an encoding configuration for encoding interference information. In some examples, the control signaling may indicate an index associated with a selected encoding configuration, where each encoding configuration of a set of encoding configurations is associated with a respective index of a set of indices. In some examples, the network entity 205-f may select an encoding configuration based on the capability message. In some examples, the encoding configuration may be an autoencoder or an artificial neural network.

In some examples, the control signaling may indicate one or more parameters associated with a compression scheme used by the encoding configuration. In some examples, the one or more parameters include a code size, a number of layers, a number of nodes per layer, a loss function, or a combination thereof. In some examples, the control signaling may indicate an input format for encoding the interference information at the UE 115-g.

In some examples, the control signaling may indicate the interference measurement resources for measuring interference at the UE 115-g. In some examples, the control signaling may indicate one or more parameters associated with measuring the interference at the UE 115-g over the indicated interference measurement resources. In some examples, the one or more parameters include a frequency granularity, a time granularity, a spatial granularity, or a combination thereof.

At 615, the UE 115-g may measure interference at the UE over a set of interference measurement resources. In some cases, the UE 115-g may measure interference-plus-noise at the UE over the set of interference measurement resources.

At 620, the UE 115-g may encode, in accordance with a compression scheme, interference information representative of a distribution of interference at the UE based on the interference measured over the set of interference measurement resources. In some examples, the UE 115-g may encode the interference information via generating a mean vector and a covariance matrix of a latent random variable representative of the distribution of interference at the UE over the set of interference measurement resources, where the set of interference measurement resources includes a set of two or more of time, frequency, or spatial resources. In some cases, the distribution of interference may be a distribution of interference-plus-noise over the set of interference measurement resources.

At 625, the UE 115-g may transmit, to the network entity 205-f, the interference information encoded in accordance with the compression scheme. At 630, the network entity 205-f may decode the interference information in accordance with the compression scheme. In some examples, the UE 115-g may transmit the interference information encoded in accordance with the compression scheme in a CSF report. At 635, the network entity 205-f may transmit scheduling information for communications at the UE 115-g based on the decoded interference information.

In some examples, the UE 115-g may determine, using an artificial NN associated with the compression scheme, one or more model parameters associated with the compression scheme, and transmit the one or more model parameters to the network entity 205-f. The network entity 205-f may determine and transmit (e.g., in via a configuration message), to the UE 115-g, one or more parameters associated with the compression scheme based on the one or more model parameters.

In some examples, the network entity 205-f may determine, using an artificial NN associated with the compression scheme, one or more model parameters associated with the compression scheme. The network entity 205-f may transmit (e.g., via a configuration message), to the UE 115-g, one or more parameters associated with the compression scheme based on the one or more model parameters.

Figure 7:
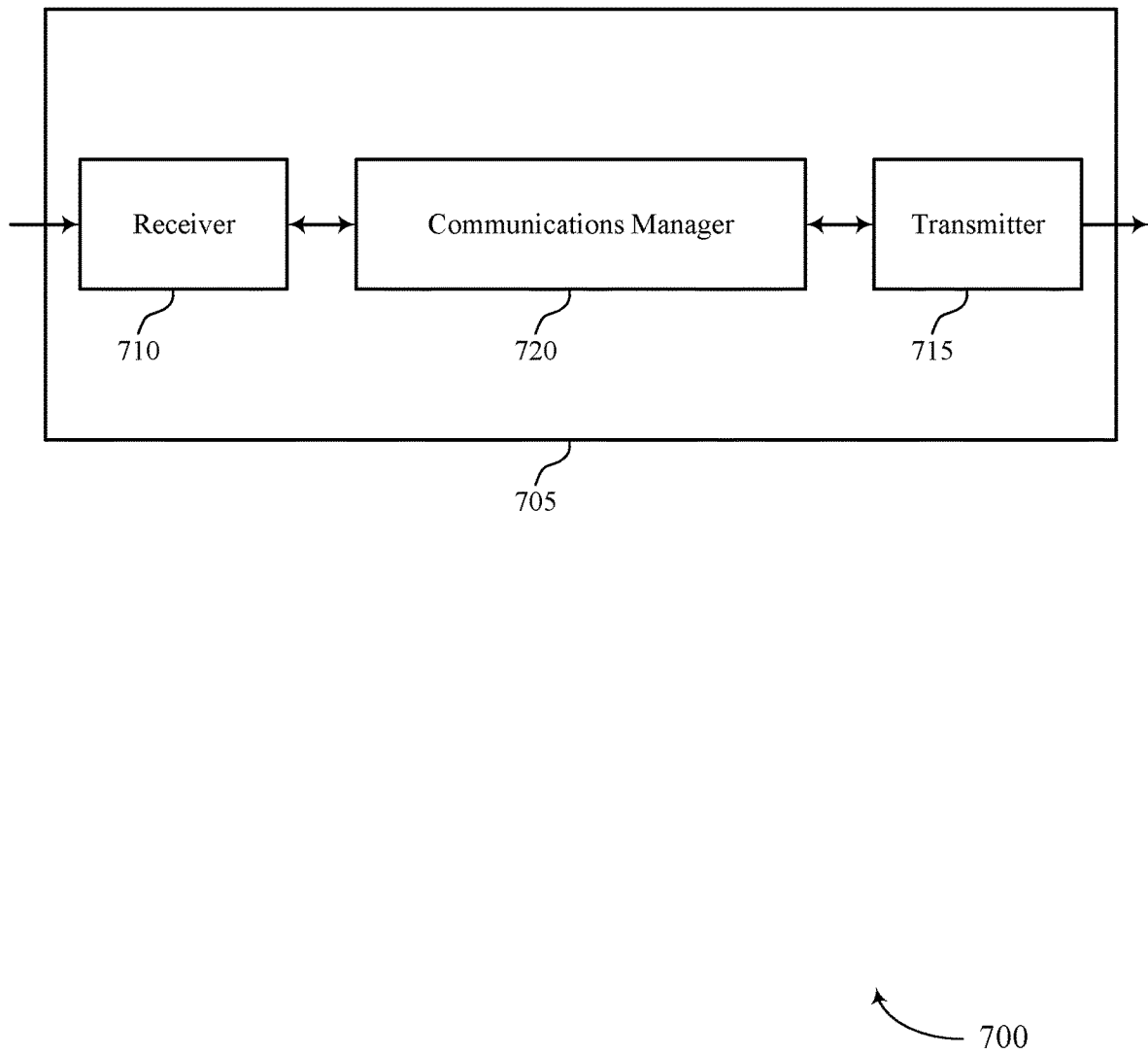
FIGS. 7 and 8 show block diagrams of devices that support interference distribution compression and reconstruction in accordance with one or more aspects of the present disclosure.

FIG. 7 shows a block diagram 700 of a device 705 that supports interference distribution compression and reconstruction in accordance with one or more aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to interference distribution compression and reconstruction). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to interference distribution compression and reconstruction). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of interference distribution compression and reconstruction as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 720 may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communications at a UE in accordance with examples as disclosed herein. For example, the communications manager 720 may be configured as or otherwise support a means for measuring interference at the UE over a set of interference measurement resources. The communications manager 720 may be configured as or otherwise support a means for encoding, in accordance with a compression scheme, interference information representative of a distribution of interference at the UE based on the interference measured over the set of interference measurement resources. The communications manager 720 may be configured as or otherwise support a means for transmitting, to a first network entity, the interference information encoded in accordance with the compression scheme.

By including or configuring the communications manager 720 in accordance with examples as described herein, the device 705 (e.g., a processor controlling or otherwise coupled to the receiver 710, the transmitter 715, the communications manager 720, or a combination thereof) may support techniques for more efficient utilization of communication resources via providing for dynamic measurement and reporting of interference information at the UE.

Figure 8:
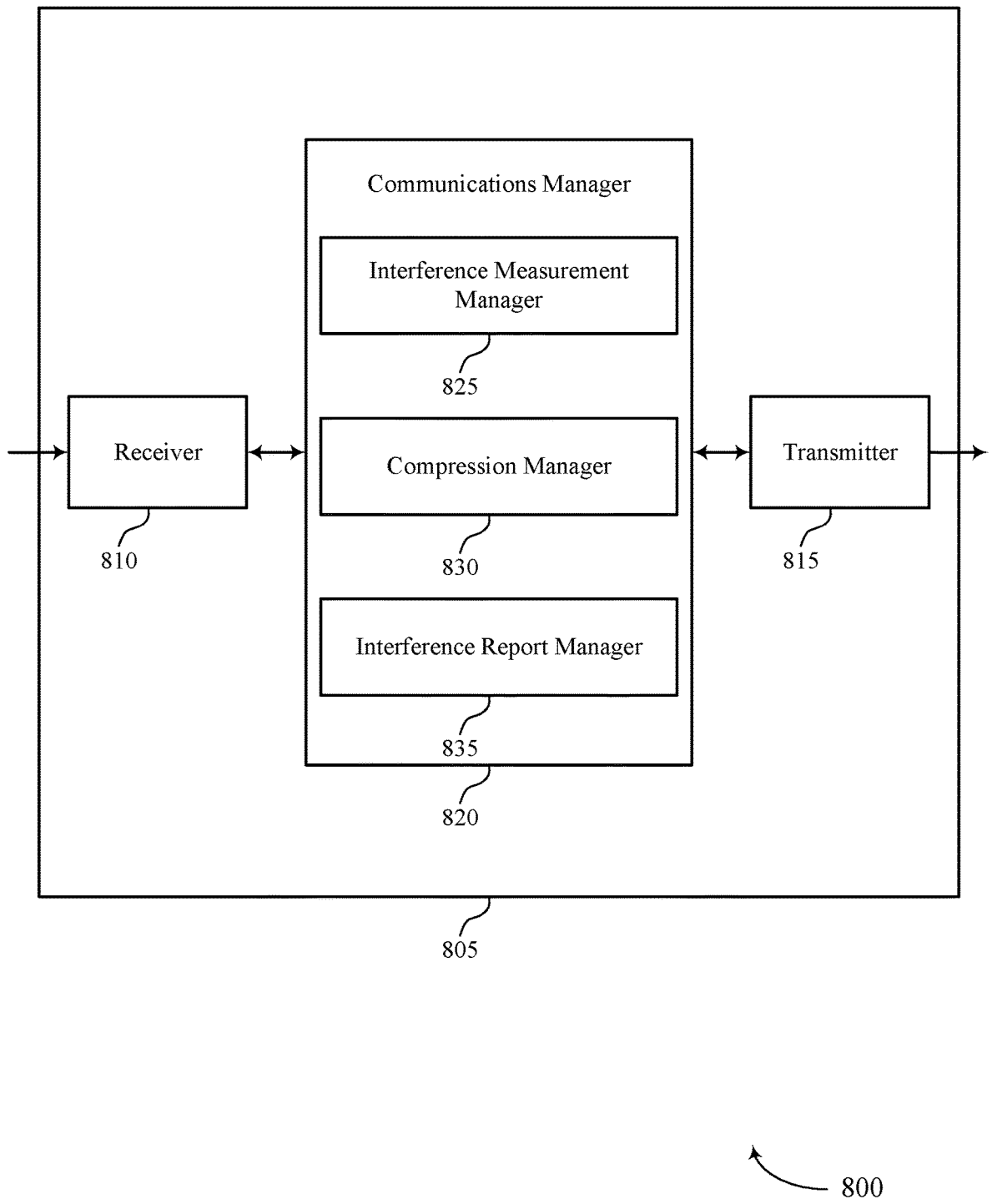

FIG. 8 shows a block diagram 800 of a device 805 that supports interference distribution compression and reconstruction in accordance with one or more aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to interference distribution compression and reconstruction). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to interference distribution compression and reconstruction). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of interference distribution compression and reconstruction as described herein. For example, the communications manager 820 may include an interference measurement manager 825, a compression manager 830, an interference report manager 835, or any combination thereof. The communications manager 820 may be an example of aspects of a communications manager 720 as described herein. In some examples, the communications manager 820, or various components thereof, may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communications at a UE in accordance with examples as disclosed herein. The interference measurement manager 825 may be configured as or otherwise support a means for measuring interference at the UE over a set of interference measurement resources. The compression manager 830 may be configured as or otherwise support a means for encoding, in accordance with a compression scheme, interference information representative of a distribution of interference at the UE based on the interference measured over the set of interference measurement resources. The interference report manager 835 may be configured as or otherwise support a means for transmitting, to a first network entity, the interference information encoded in accordance with the compression scheme.

Figure 9:
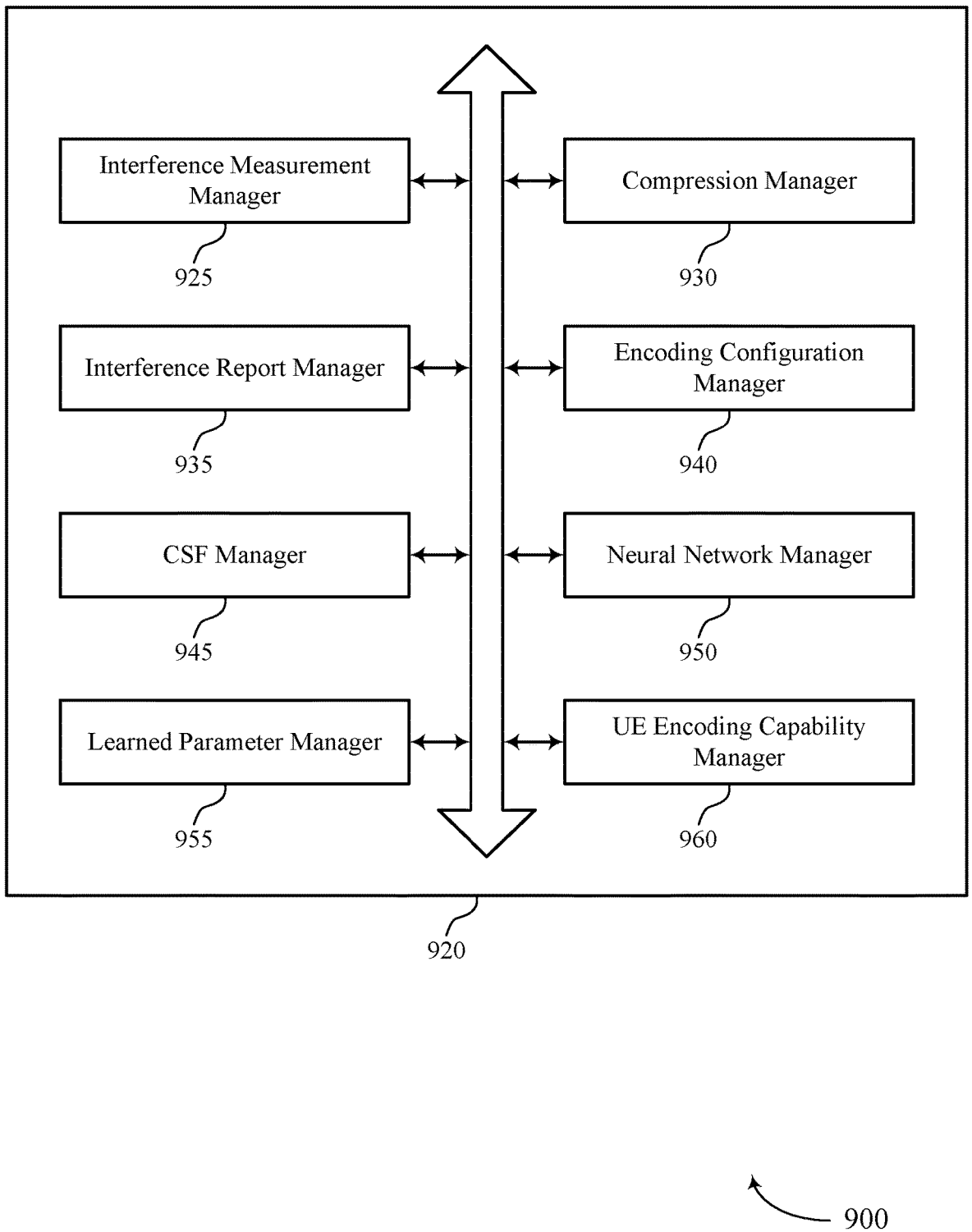
FIG. 9 shows a block diagram of a communications manager that supports interference distribution compression and reconstruction in accordance with one or more aspects of the present disclosure.

FIG. 9 shows a block diagram 900 of a communications manager 920 that supports interference distribution compression and reconstruction in accordance with one or more aspects of the present disclosure. The communications manager 920 may be an example of aspects of a communications manager 720, a communications manager 820, or both, as described herein. The communications manager 920, or various components thereof, may be an example of means for performing various aspects of interference distribution compression and reconstruction as described herein. For example, the communications manager 920 may include an interference measurement manager 925, a compression manager 930, an interference report manager 935, an encoding configuration manager 940, a CSF manager 945, a neural network manager 950, a learned parameter manager 955, a UE encoding capability manager 960, or any combination thereof. Each of these components may communicate, directly or indirectly, with one another (e.g., via one or more buses).

The communications manager 920 may support wireless communications at a UE in accordance with examples as disclosed herein. The interference measurement manager 925 may be configured as or otherwise support a means for measuring interference at the UE over a set of interference measurement resources. The compression manager 930 may be configured as or otherwise support a means for encoding, in accordance with a compression scheme, interference information representative of a distribution of interference at the UE based on the interference measured over the set of interference measurement resources. The interference report manager 935 may be configured as or otherwise support a means for transmitting, to a first network entity, the interference information encoded in accordance with the compression scheme.

In some examples, the interference at the UE may be interference-plus-noise, and the distribution of interference may be a distribution of interference-plus-noise over the set of interference measurement resources.

In some examples, the distribution of interference at the UE includes a probability mass function for a set of resources in time, frequency, and/or space.

In some examples, the set of resources in time, frequency, and/or space include the set of interference measurement resources.

In some examples, the set of resources in time, frequency, and/or space include resources prior to the set of interference measurement resources and the distribution of interference at the UE is based on the interference measured over the set of interference measurement resources.

In some examples, the set of resources in time, frequency, and/or space include resources later than the set of interference measurement resources, and the distribution of interference at the UE is predicted based at least in part on the interference measured over the set of interference measurement resources.

In some examples, to encode the interference information, the compression manager 930 may be configured as or otherwise support a means for generating a compressed estimated or predicted interference distribution over the set of interference measurement resources.

In some examples, the compression scheme includes a codeword-based compression scheme or an artificial neural network-based compression scheme.

In some examples, to encode the interference information, the compression manager 930 may be configured as or otherwise support a means for generating a mean vector and a covariance matrix of a latent random variable representative of the distribution of interference at the UE over the set of interference measurement resources, where the set of interference measurement resources includes a set of two or more of time, frequency, or spatial resources.

In some examples, the encoding configuration manager 940 may be configured as or otherwise support a means for receiving, from the first network entity or one or more second network entities associated with the first network entity, an indication of an encoding configuration for encoding the interference information.

In some examples, the UE encoding capability manager 960 may be configured as or otherwise support a means for transmitting, to the first network entity or one or more second network entities associated with the first network entity, an indication of a capability of the UE to encode interference information. In some examples, the encoding configuration manager 940 may be configured as or otherwise support a means for receiving, from the first network entity or one or more second network entities associated with the first network entity, and in response to transmitting the indication of the capability of the UE to encode interference information, an indication of an index associated with the encoding configuration, where a set of encoding configurations including the encoding configuration are associated with a set of indices including the index.

In some examples, the encoding configuration includes a configuration for one of an autoencoder or an artificial neural network.

In some examples, the encoding configuration manager 940 may be configured as or otherwise support a means for selecting an encoding configuration from a set of encoding configurations for encoding the interference information, where each encoding configuration of the set of encoding configurations is associated with a respective index of a set of indices. In some examples, the encoding configuration manager 940 may be configured as or otherwise support a means for transmitting, to the first network entity or one or more second network entities associated with the first network entity, an indication of an index of the set of indices associated with the selected encoding configuration.

In some examples, the encoding configuration manager 940 may be configured as or otherwise support a means for receiving, from the first network entity or one or more second network entities associated with the first network entity, an indication of one or more parameters associated with the compression scheme.

In some examples, the one or more parameters associated with the compression scheme include a code size, a number of layers, a number of nodes per layer, a loss function, or a combination thereof.

In some examples, the interference measurement manager 925 may be configured as or otherwise support a means for receiving, from the first network entity or one or more second network entities associated with the first network entity, an indication of the set of interference measurement resources.

In some examples, the interference measurement manager 925 may be configured as or otherwise support a means for receiving, from the first network entity or one or more second network entities associated with the first network entity, an indication of one or more parameters associated with measuring the interference at the UE over the set of interference measurement resources.

In some examples, the one or more parameters associated with measuring the interference at the UE over the set of interference measurement resources includes a frequency granularity, a time granularity, a spatial granularity, or a combination thereof.

In some examples, the interference report manager 935 may be configured as or otherwise support a means for receiving, from the first network entity or one or more second network entities associated with the first network entity, an indication of an input format for encoding the interference information representative of the distribution of interference at the UE.

In some examples, the CSF manager 945 may be configured as or otherwise support a means for transmitting a channel state feedback report including the encoded interference information encoded in accordance with the compression scheme.

In some examples, the neural network manager 950 may be configured as or otherwise support a means for determining, using an artificial neural network associated with the compression scheme, one or more model parameters associated with the compression scheme. In some examples, the learned parameter manager 955 may be configured as or otherwise support a means for transmitting, to the first network entity or one or more second network entities associated with the first network entity, the one or more model parameters.

In some examples, the encoding configuration manager 940 may be configured as or otherwise support a means for receiving, from the first network entity or one or more second network entities associated with the first network entity, one or more parameters associated with the compression scheme based on the transmitting the one or more model parameters.

Figure 10:
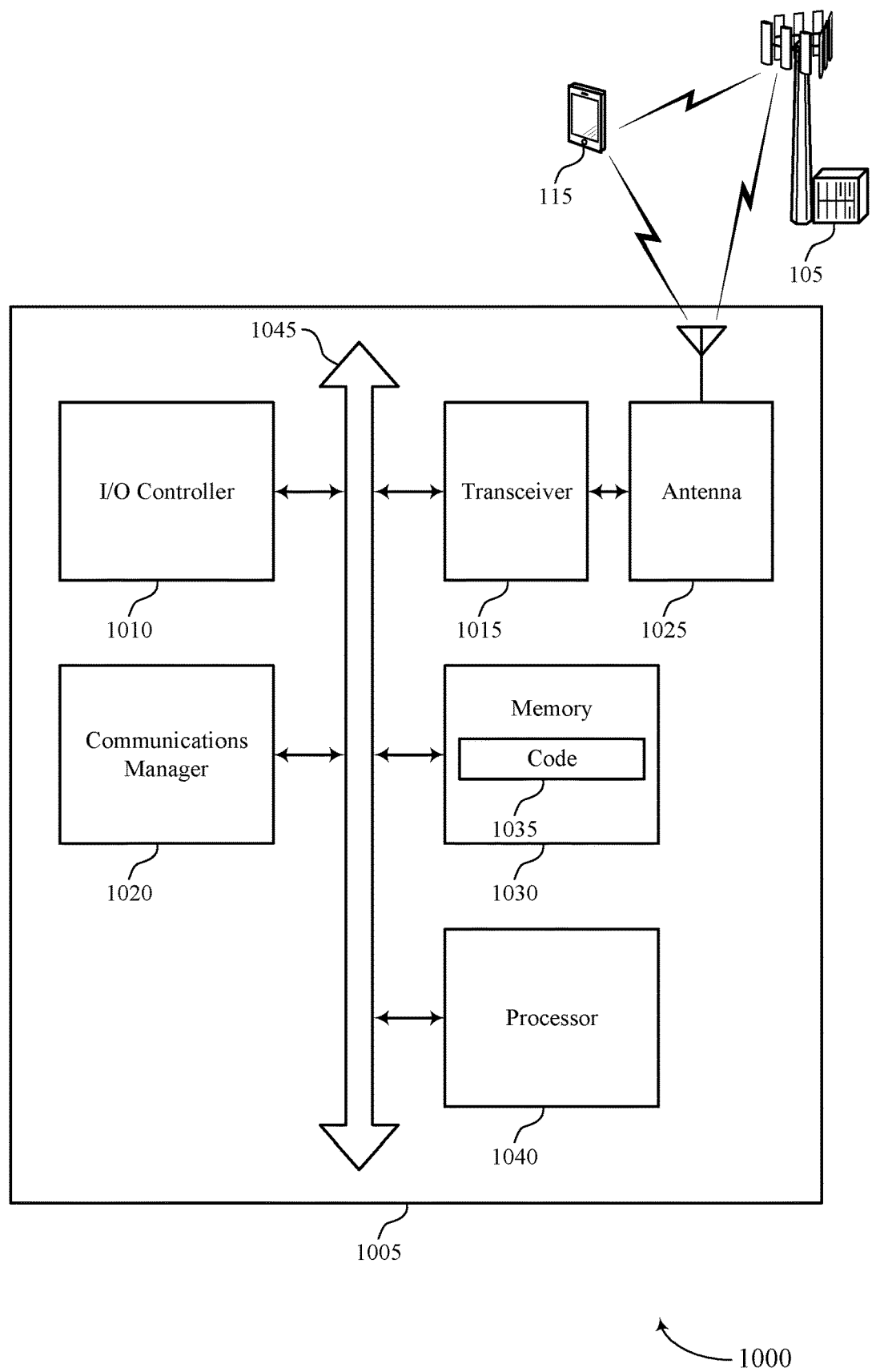
FIG. 10 shows a diagram of a system including a device that supports interference distribution compression and reconstruction in accordance with one or more aspects of the present disclosure.

FIG. 10 shows a diagram of a system 1000 including a device 1005 that supports interference distribution compression and reconstruction in accordance with one or more aspects of the present disclosure. The device 1005 may be an example of or include the components of a device 705, a device 805, or a UE 115 as described herein. The device 1005 may communicate wirelessly with one or more network entities 205, UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally, or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting interference distribution compression and reconstruction). For example, the device 1005 or a component of the device 1005 may include a processor 1040 and memory 1030 coupled with or to the processor 1040, the processor 1040 and memory 1030 configured to perform various functions described herein.

The communications manager 1020 may support wireless communications at a UE in accordance with examples as disclosed herein. For example, the communications manager 1020 may be configured as or otherwise support a means for measuring interference at the UE over a set of interference measurement resources. The communications manager 1020 may be configured as or otherwise support a means for encoding, in accordance with a compression scheme, interference information representative of a distribution of interference at the UE based on the interference measured over the set of interference measurement resources. The communications manager 1020 may be configured as or otherwise support a means for transmitting, to a first network entity, the interference information encoded in accordance with the compression scheme.

By including or configuring the communications manager 1020 in accordance with examples as described herein, the device 1005 may support techniques for improved communication reliability, more efficient utilization of communication resources, and improved coordination between devices via providing for dynamic measurement and reporting of interference information at the UE and scheduling of communications accounting for the interference information at the UE.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of interference distribution compression and reconstruction as described herein, or the processor 1040 and the memory 1030 may be otherwise configured to perform or support such operations.

Figure 11:
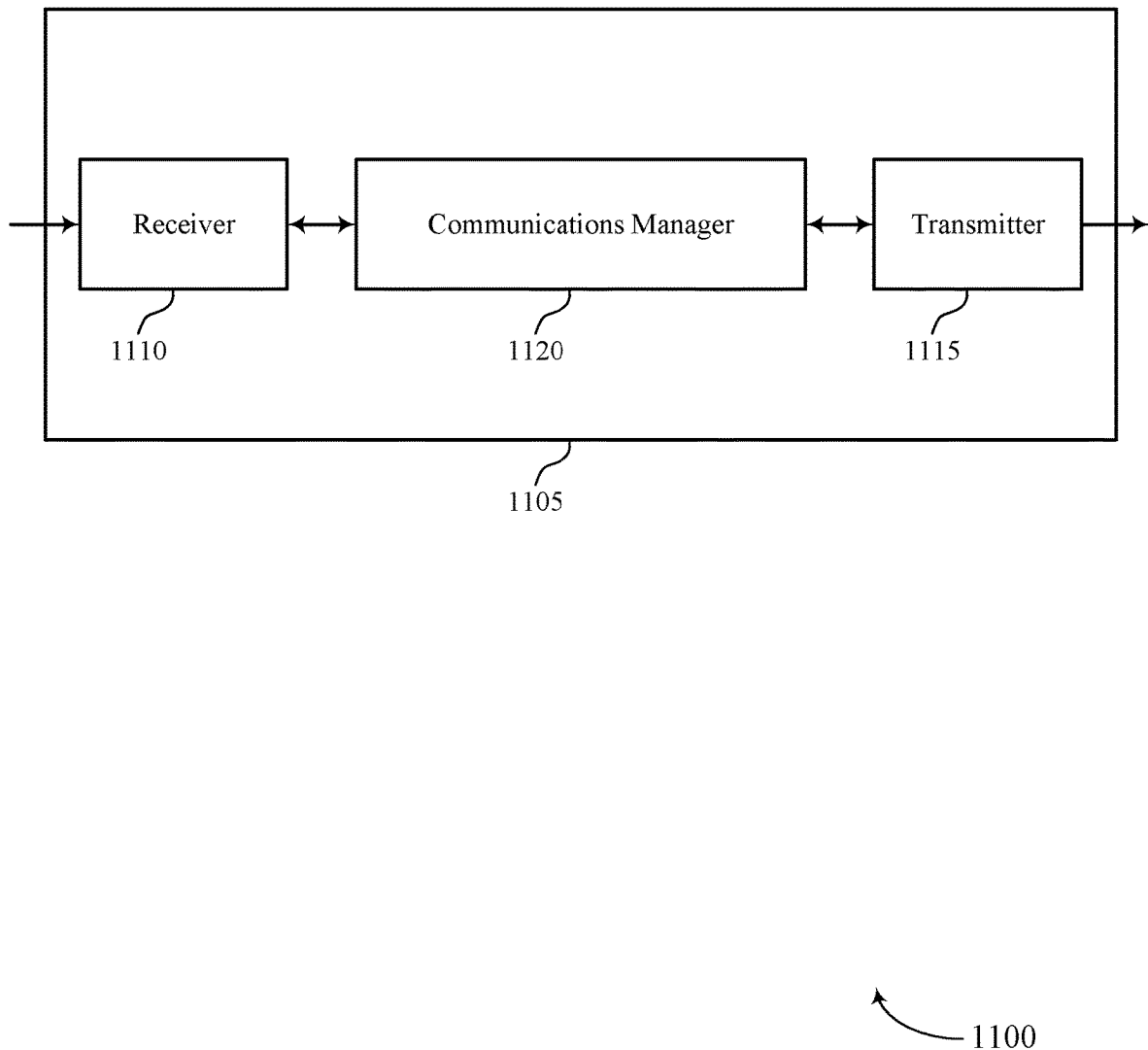
FIGS. 11 and 12 show block diagrams of devices that support interference distribution compression and reconstruction in accordance with one or more aspects of the present disclosure.

FIG. 11 shows a block diagram 1100 of a device 1105 that supports interference distribution compression and reconstruction in accordance with one or more aspects of the present disclosure. The device 1105 may be an example of aspects of a base station 105 or a network entity as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to interference distribution compression and reconstruction). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to interference distribution compression and reconstruction). In some examples, the transmitter 1115 may be co-located with a receiver 1110 in a transceiver module. The transmitter 1115 may utilize a single antenna or a set of multiple antennas.

The communications manager 1120, the receiver 1110, the transmitter 1115, or various combinations thereof or various components thereof may be examples of means for performing various aspects of interference distribution compression and reconstruction as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1120 may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communications at a base station in accordance with examples as disclosed herein. For example, the communications manager 1120 may be configured as or otherwise support a means for obtaining encoded interference information representative of a distribution of interference. The communications manager 1120 may be configured as or otherwise support a means for decoding the encoded interference information in accordance with a compression scheme to output decoded interference information.

By including or configuring the communications manager 1120 in accordance with examples as described herein, the device 1105 (e.g., a processor controlling or otherwise coupled to the receiver 1110, the transmitter 1115, the communications manager 1120, or a combination thereof) may support techniques for more efficient utilization of communication resources via providing for dynamic measurement and reporting of interference information at the UE.

Figure 12:
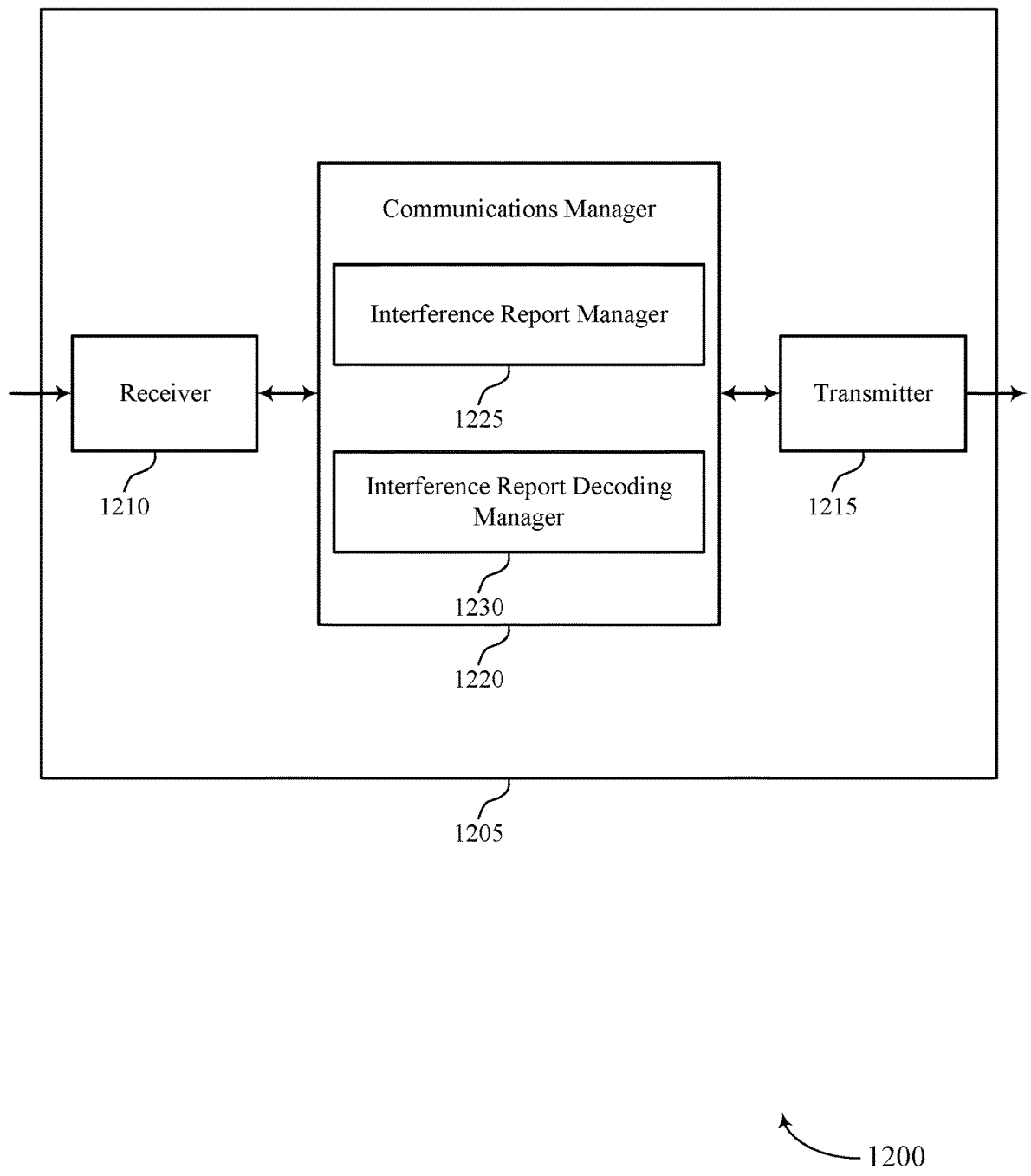

FIG. 12 shows a block diagram 1200 of a device 1205 that supports interference distribution compression and reconstruction in accordance with one or more aspects of the present disclosure. The device 1205 may be an example of aspects of a device 1105, a base station 105, or a network entity as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to interference distribution compression and reconstruction). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to interference distribution compression and reconstruction). In some examples, the transmitter 1215 may be co-located with a receiver 1210 in a transceiver module. The transmitter 1215 may utilize a single antenna or a set of multiple antennas.

The device 1205, or various components thereof, may be an example of means for performing various aspects of interference distribution compression and reconstruction as described herein. For example, the communications manager 1220 may include an interference report manager 1225 an interference report decoding manager 1230, or any combination thereof. The communications manager 1220 may be an example of aspects of a communications manager 1120 as described herein. In some examples, the communications manager 1220, or various components thereof, may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communications at a base station in accordance with examples as disclosed herein. The interference report manager 1225 may be configured as or otherwise support a means for obtaining encoded interference information representative of a distribution of interference. The interference report decoding manager 1230 may be configured as or otherwise support a means for decoding the encoded interference information in accordance with a compression scheme to output decoded interference information.

Figure 13:
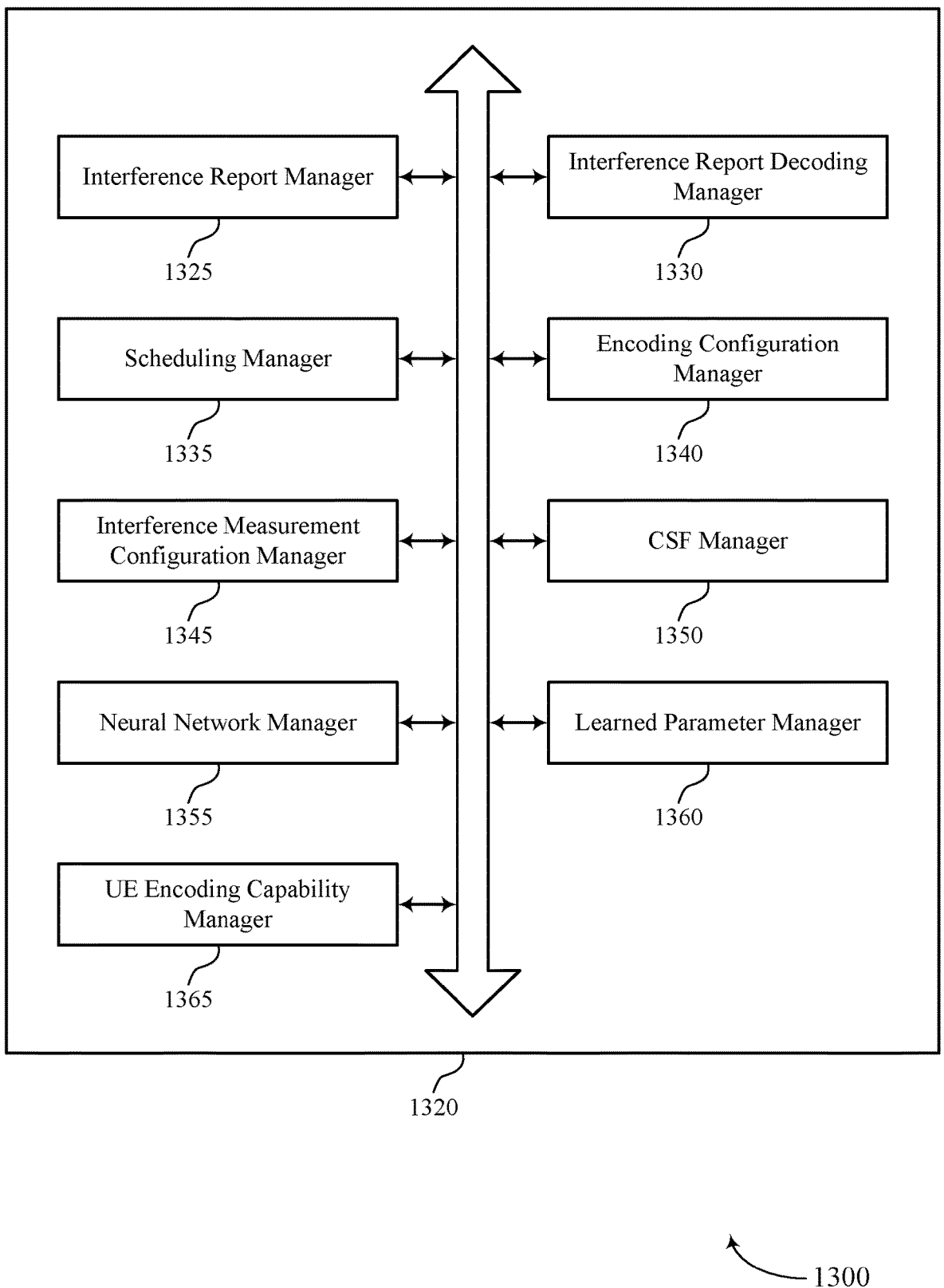
FIG. 13 shows a block diagram of a communications manager that supports interference distribution compression and reconstruction in accordance with one or more aspects of the present disclosure.

FIG. 13 shows a block diagram 1300 of a communications manager 1320 that supports interference distribution compression and reconstruction in accordance with one or more aspects of the present disclosure. The communications manager 1320 may be an example of aspects of a communications manager 1120, a communications manager 1220, or both, as described herein. The communications manager 1320, or various components thereof, may be an example of means for performing various aspects of interference distribution compression and reconstruction as described herein. For example, the communications manager 1320 may include an interference report manager 1325, an interference report decoding manager 1330, a scheduling manager 1335, an encoding configuration manager 1340, an interference measurement configuration manager 1345, a CSF manager 1350, a neural network manager 1355, a learned parameter manager 1360, a UE encoding capability manager 1365, or any combination thereof. Each of these components may communicate, directly or indirectly, with one another (e.g., via one or more buses).

The communications manager 1320 may support wireless communications at a base station in accordance with examples as disclosed herein. The interference report manager 1325 may be configured as or otherwise support a means for obtaining encoded interference information representative of a distribution of interference over a set of interference measurement resources. The interference report decoding manager 1330 may be configured as or otherwise support a means for decoding the encoded interference information in accordance with a compression scheme to output decoded interference information.

In some examples, the distribution of interference may be a distribution of interference-plus-noise over a set of interference measurement resources.

In some examples, the scheduling manager 1335 may be configured as or otherwise support a means for outputting scheduling information for communications at a UE based on the decoded interference information.

In some examples, the encoded interference information includes a mean vector and a covariance matrix of a latent random variable representative of the distribution of interference at a UE over a set of interference measurement resources. The interference report decoding manager 1330 may be configured as or otherwise support a means for generating samples based on the mean vector and the covariance matrix and decoding the encoded interference information based at least in part on the samples.

In some examples, the encoding configuration manager 1340 may be configured as or otherwise support a means for outputting an indication of an encoding configuration for encoding interference information at a UE.

In some examples, the UE encoding capability manager 1365 may be configured as or otherwise support a means for obtaining an indication of a capability of the UE to encode interference information. In some examples, the encoding configuration manager 1340 may be configured as or otherwise support a means for outputting, based on the indication of the capability of the UE to encode interference information, an indication of an index associated with the encoding configuration, where a set of encoding configurations including the encoding configuration are associated with a set of indices including the index.

In some examples, the encoding configuration includes a configuration for one of an autoencoder or an artificial neural network.

In some examples, the encoding configuration manager 1340 may be configured as or otherwise support a means for obtaining an indication of an index of a set of indices associated with a selected encoding configuration, where each encoding configuration of a set of encoding configurations is associated with a respective index of the set of indices.

In some examples, the encoding configuration manager 1340 may be configured as or otherwise support a means for outputting an indication of one or more parameters associated with the compression scheme.

In some examples, the one or more parameters associated with the compression scheme include a code size, a number of layers, a number of nodes per layer, a loss function, or a combination thereof.

In some examples, the interference measurement configuration manager 1345 may be configured as or otherwise support a means for outputting an indication of one or more parameters associated with measuring the interference over the set of interference measurement resources.

In some examples, the one or more parameters associated with measuring the interference over the set of interference measurement resources includes a frequency granularity, a time granularity, a spatial granularity, or a combination thereof.

In some examples, the encoding configuration manager 1340 may be configured as or otherwise support a means for outputting an indication of an input format for encoding the interference information representative of a distribution of interference.

In some examples, the CSF manager 1350 may be configured as or otherwise support a means for obtaining a channel state feedback report including the encoded interference information encoded in accordance with the compression scheme.

In some examples, the neural network manager 1355 may be configured as or otherwise support a means for determining, using an artificial neural network associated with the compression scheme, one or more model parameters associated with the compression scheme. In some examples, the encoding configuration manager 1340 may be configured as or otherwise support a means for outputting one or more parameters associated with the compression scheme based on the one or more model parameters.

In some examples, the learned parameter manager 1360 may be configured as or otherwise support a means for obtaining one or more model parameters associated with the compression scheme. In some examples, the encoding configuration manager 1340 may be configured as or otherwise support a means for outputting one or more parameters associated with the compression scheme based on the one or more model parameters.

Figure 14:
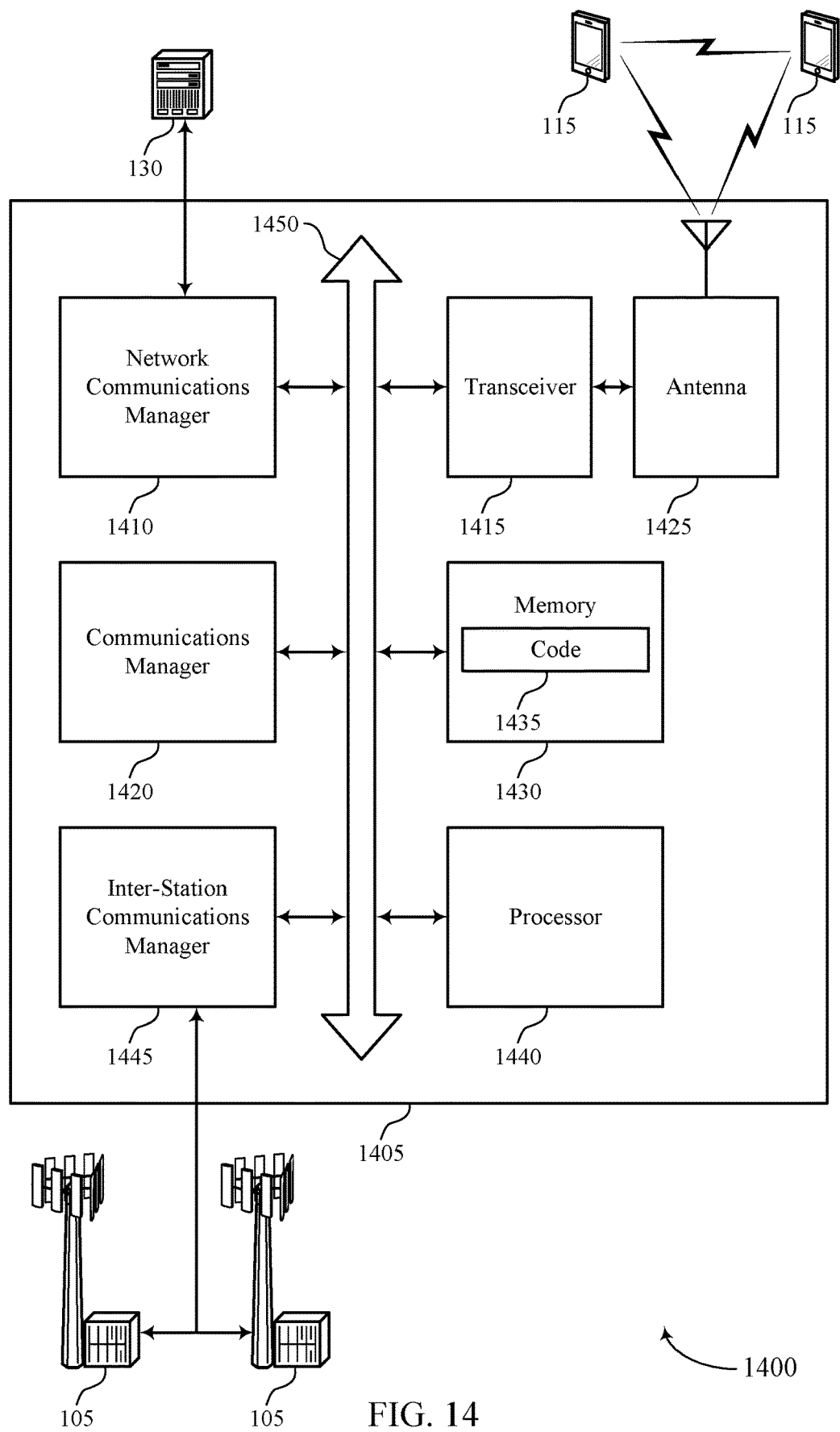
FIG. 14 shows a diagram of a system including a device that supports interference distribution compression and reconstruction in accordance with one or more aspects of the present disclosure.

FIG. 14 shows a diagram of a system 1400 including a device 1405 that supports interference distribution compression and reconstruction in accordance with one or more aspects of the present disclosure. The device 1405 may be an example of or include the components of a device 1105, a device 1205, a network entity, or a base station 105 as described herein. The device 1405 may communicate wirelessly with one or more base stations 105, UEs 115, or any combination thereof. The device 1405 may include components for bi-directional voice and data communications including components for transmitting and receiving communications, such as a communications manager 1420, a network communications manager 1410, a transceiver 1415, an antenna 1425, a memory 1430, code 1435, a processor 1440, and an inter-station communications manager 1445. These components may be in electronic communication or otherwise coupled (e.g., operatively, communicatively, functionally, electronically, electrically) via one or more buses (e.g., a bus 1450).

The network communications manager 1410 may manage communications with a core network 130 (e.g., via one or more wired backhaul links). For example, the network communications manager 1410 may manage the transfer of data communications for client devices, such as one or more UEs 115.

In some cases, the device 1405 may include a single antenna 1425. However, in some other cases the device 1405 may have more than one antenna 1425, which may be capable of concurrently transmitting or receiving multiple wireless transmissions. The transceiver 1415 may communicate bi-directionally, via the one or more antennas 1425, wired, or wireless links as described herein. For example, the transceiver 1415 may represent a wireless transceiver and may communicate bi-directionally with another wireless transceiver. The transceiver 1415 may also include a modem to modulate the packets, to provide the modulated packets to one or more antennas 1425 for transmission, and to demodulate packets received from the one or more antennas 1425. The transceiver 1415, or the transceiver 1415 and one or more antennas 1425, may be an example of a transmitter 1115, a transmitter 1215, a receiver 1110, a receiver 1210, or any combination thereof or component thereof, as described herein.

The memory 1430 may include RAM and ROM. The memory 1430 may store computer-readable, computer-executable code 1435 including instructions that, when executed by the processor 1440, cause the device 1405 to perform various functions described herein. The code 1435 may be stored in a non-transitory computer-readable medium such as system memory or another type of memory. In some cases, the code 1435 may not be directly executable by the processor 1440 but may cause a computer (e.g., when compiled and executed) to perform functions described herein. In some cases, the memory 1430 may contain, among other things, a BIOS which may control basic hardware or software operation such as the interaction with peripheral components or devices.

The processor 1440 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting interference distribution compression and reconstruction). For example, the device 1405 or a component of the device 1405 may include a processor 1440 and memory 1430 coupled with or to the processor 1440, the processor 1440 and memory 1430 configured to perform various functions described herein.

The inter-station communications manager 1445 may manage communications with other base stations 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communications network technology to provide communication between base stations 105.

The communications manager 1420 may support wireless communications at a base station in accordance with examples as disclosed herein. For example, the communications manager 1420 may be configured as or otherwise support a means for receiving, from a UE, encoded interference information representative of a distribution of interference measured at the UE over a set of interference measurement resources. The communications manager 1420 may be configured as or otherwise support a means for decoding the encoded interference information in accordance with a compression scheme to output decoded interference information.

By including or configuring the communications manager 1420 in accordance with examples as described herein, the device 1405 may support techniques for improved communication reliability, more efficient utilization of communication resources, and improved coordination between devices via providing for dynamic measurement and reporting of interference information at the UE and scheduling of communications accounting for the interference information at the UE.

In some examples, the communications manager 1420 may be configured to perform various operations (e.g., receiving, monitoring, transmitting) using or otherwise in cooperation with the transceiver 1415, the one or more antennas 1425, or any combination thereof. Although the communications manager 1420 is illustrated as a separate component, in some examples, one or more functions described with reference to the communications manager 1420 may be supported by or performed by the processor 1440, the memory 1430, the code 1435, or any combination thereof. For example, the code 1435 may include instructions executable by the processor 1440 to cause the device 1405 to perform various aspects of interference distribution compression and reconstruction as described herein, or the processor 1440 and the memory 1430 may be otherwise configured to perform or support such operations.

Figure 15:
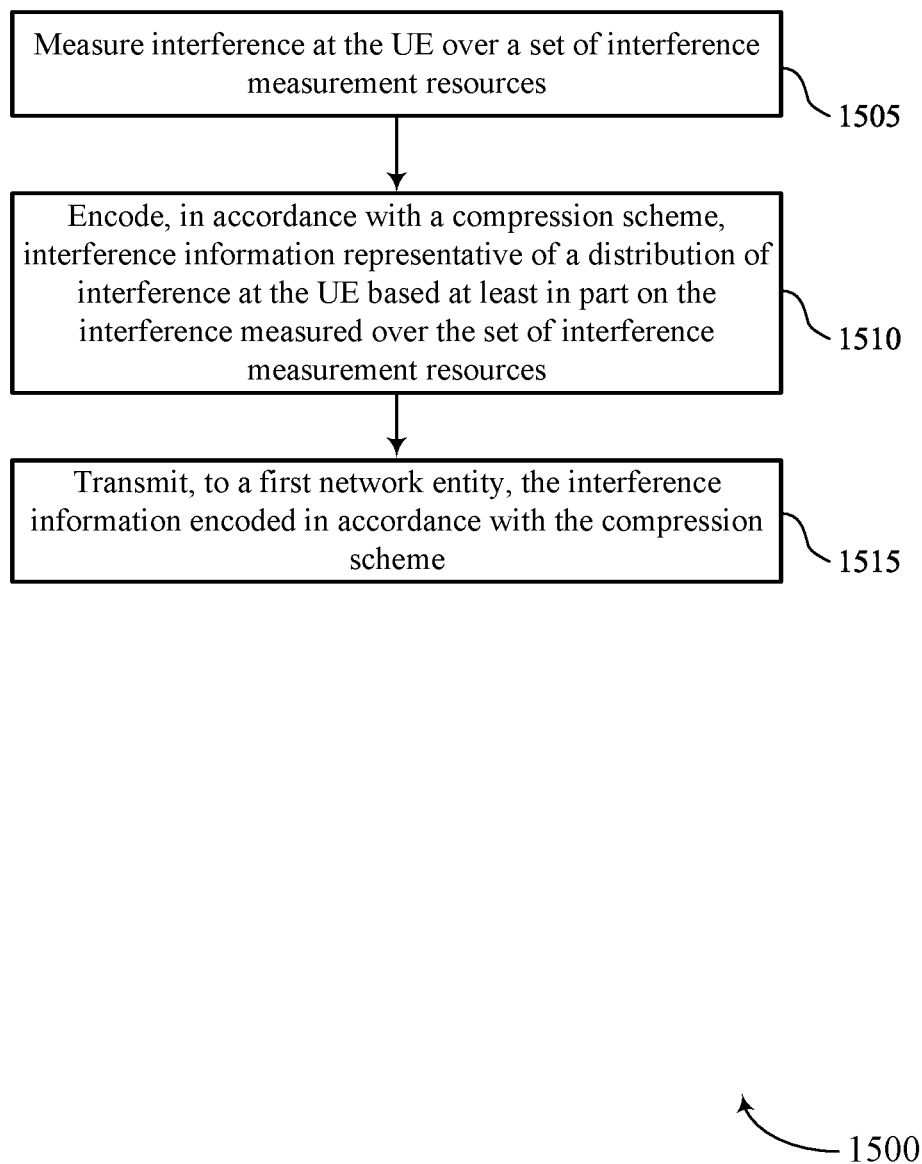
FIGS. 15 through 20 show flowcharts illustrating methods that support interference distribution compression and reconstruction in accordance with one or more aspects of the present disclosure.

FIG. 15 shows a flowchart illustrating a method 1500 that supports interference distribution compression and reconstruction in accordance with one or more aspects of the present disclosure. The operations of the method 1500 may be implemented by a UE or its components as described herein. For example, the operations of the method 1500 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1505, the method may include measuring interference at the UE over a set of interference measurement resources. The operations of 1505 may be performed in accordance with examples as disclosed herein. In some examples, aspects of the operations of 1505 may be performed by an interference measurement manager 925 as described with reference to FIG. 9.

At 1510, the method may include encoding, in accordance with a compression scheme, interference information representative of a distribution of interference at the UE based at least in part on the interference measured over the set of interference measurement resources. The operations of 1510 may be performed in accordance with examples as disclosed herein. In some examples, aspects of the operations of 1510 may be performed by a compression manager 930 as described with reference to FIG. 9.

At 1515, the method may include transmitting, to a first network entity, the interference information encoded in accordance with the compression scheme. The operations of 1515 may be performed in accordance with examples as disclosed herein. In some examples, aspects of the operations of 1515 may be performed by an interference report manager 935 as described with reference to FIG. 9.

Figure 16:
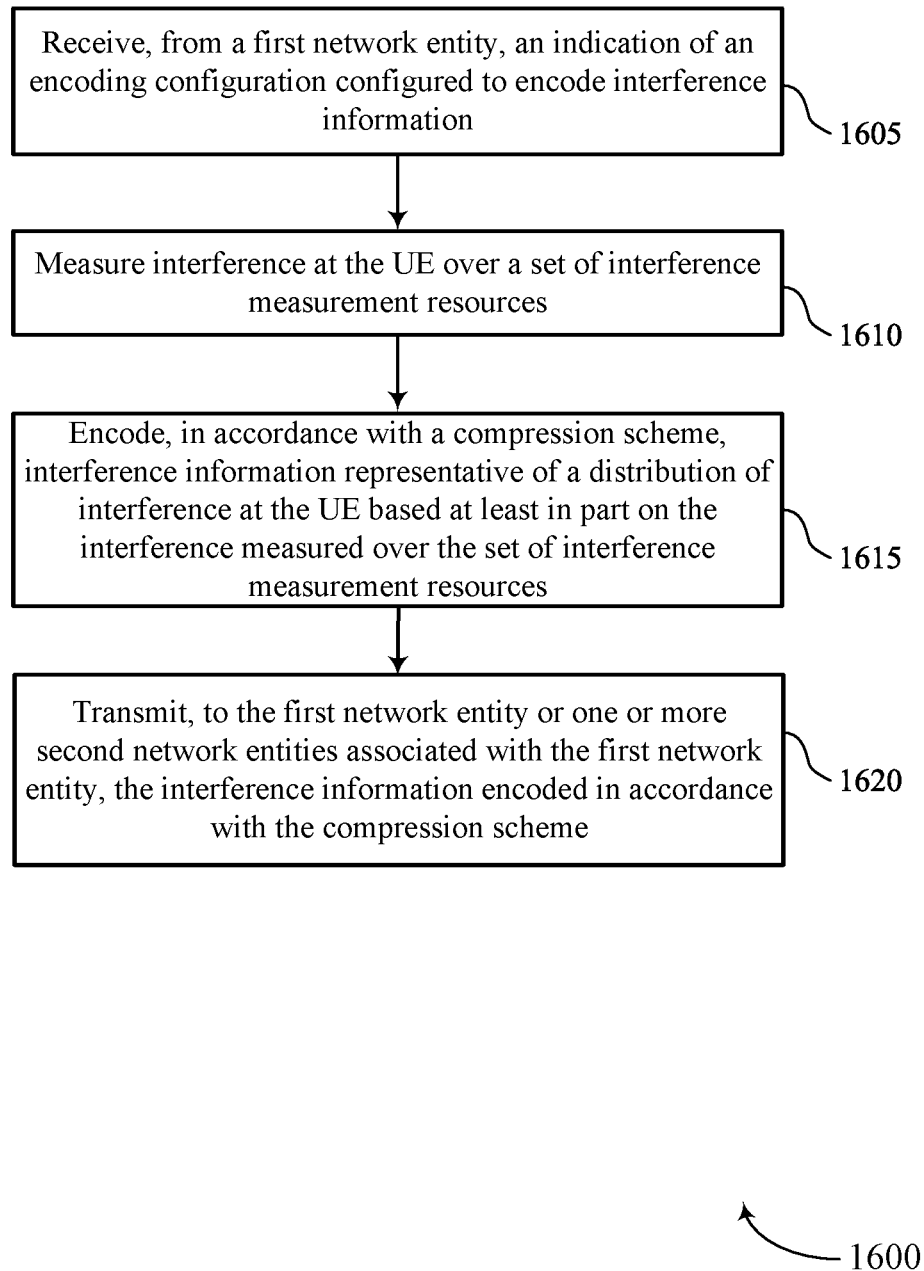

FIG. 16 shows a flowchart illustrating a method 1600 that supports interference distribution compression and reconstruction in accordance with one or more aspects of the present disclosure. The operations of the method 1600 may be implemented by a UE or its components as described herein. For example, the operations of the method 1600 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1605, the method may include receiving, from a first network entity, an indication of an encoding configuration configured to encode interference information. The operations of 1605 may be performed in accordance with examples as disclosed herein. In some examples, aspects of the operations of 1605 may be performed by an encoding configuration manager 940 as described with reference to FIG. 9.

At 1610, the method may include measuring interference at the UE over a set of interference measurement resources. The operations of 1610 may be performed in accordance with examples as disclosed herein. In some examples, aspects of the operations of 1610 may be performed by an interference measurement manager 925 as described with reference to FIG. 9.

At 1615, the method may include encoding, in accordance with a compression scheme, interference information representative of a distribution of interference at the UE based at least in part on the interference measured over the set of interference measurement resources. The operations of 1615 may be performed in accordance with examples as disclosed herein. In some examples, aspects of the operations of 1615 may be performed by a compression manager 930 as described with reference to FIG. 9.

At 1620, the method may include transmitting, to the first network entity or one or more second network entities associated with the first network entity, the interference information encoded in accordance with the compression scheme. The operations of 1620 may be performed in accordance with examples as disclosed herein. In some examples, aspects of the operations of 1620 may be performed by an interference report manager 935 as described with reference to FIG. 9.

Figure 17:
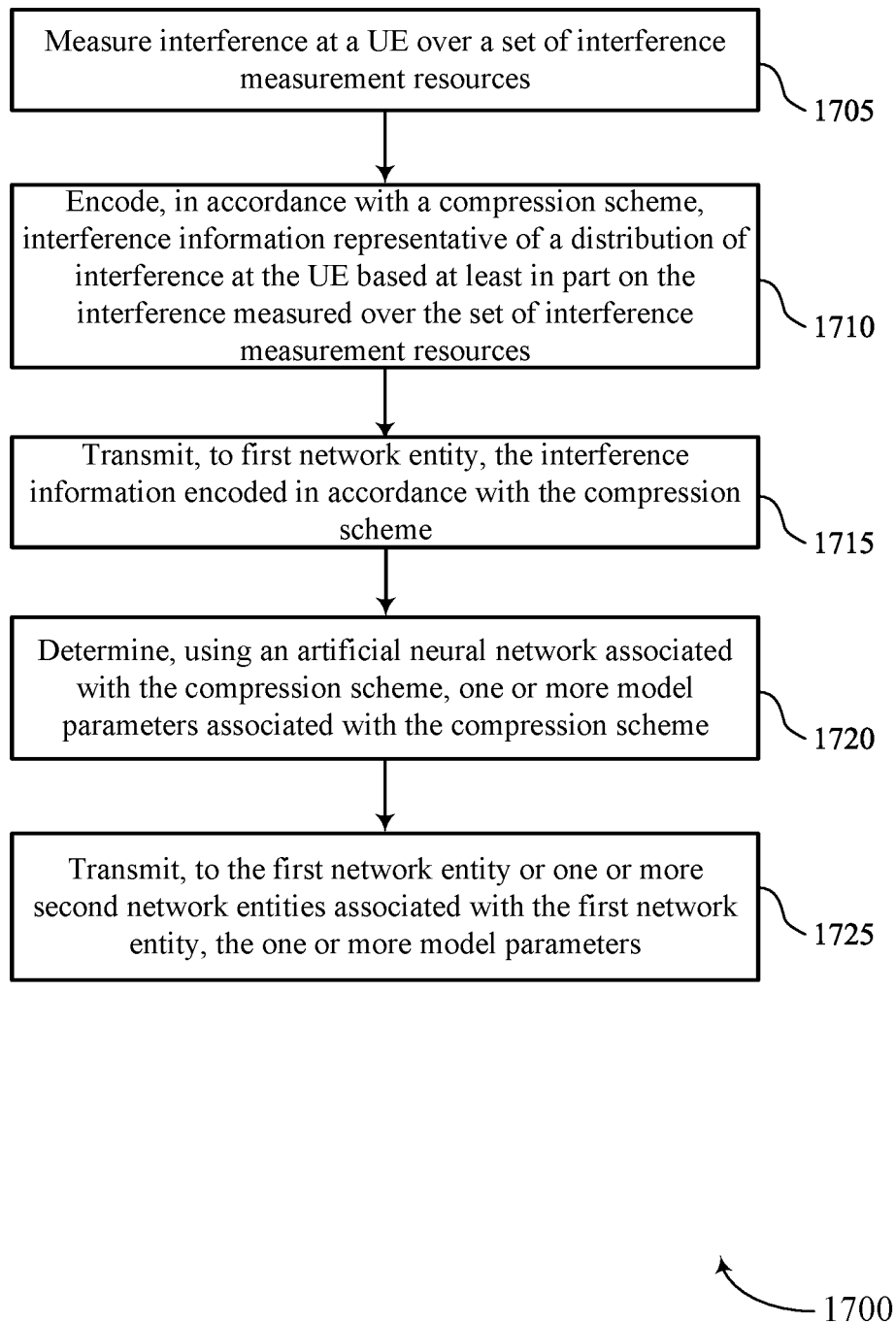

FIG. 17 shows a flowchart illustrating a method 1700 that supports interference distribution compression and reconstruction in accordance with one or more aspects of the present disclosure. The operations of the method 1700 may be implemented by a UE or its components as described herein. For example, the operations of the method 1700 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1705, the method may include measuring interference at the UE over a set of interference measurement resources. The operations of 1705 may be performed in accordance with examples as disclosed herein. In some examples, aspects of the operations of 1705 may be performed by an interference measurement manager 925 as described with reference to FIG. 9.

At 1710, the method may include encoding, in accordance with a compression scheme, interference information representative of a distribution of interference at the UE based at least in part on the interference measured over the set of interference measurement resources. The operations of 1710 may be performed in accordance with examples as disclosed herein. In some examples, aspects of the operations of 1710 may be performed by a compression manager 930 as described with reference to FIG. 9.

At 1715, the method may include transmitting, to a first network entity, the interference information encoded in accordance with the compression scheme. The operations of 1715 may be performed in accordance with examples as disclosed herein. In some examples, aspects of the operations of 1715 may be performed by an interference report manager 935 as described with reference to FIG. 9.

At 1720, the method may include determining, using an artificial neural network associated with the compression scheme, one or more model parameters associated with the compression scheme. The operations of 1720 may be performed in accordance with examples as disclosed herein. In some examples, aspects of the operations of 1720 may be performed by a neural network manager 950 as described with reference to FIG. 9.

At 1725, the method may include transmitting, to the first network entity or one or more second network entities associated with the first network entity, the one or more model parameters. The operations of 1725 may be performed in accordance with examples as disclosed herein. In some examples, aspects of the operations of 1725 may be performed by a learned parameter manager 955 as described with reference to FIG. 9.

Figure 18:
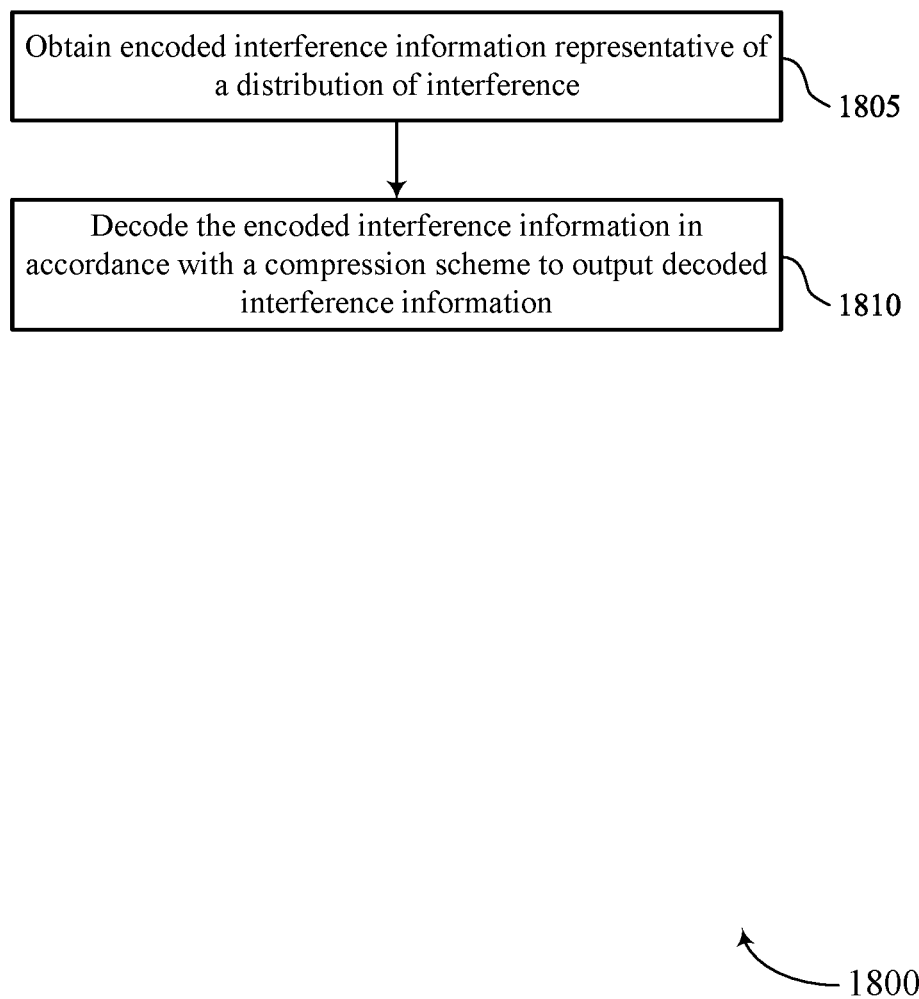

FIG. 18 shows a flowchart illustrating a method 1800 that supports interference distribution compression and reconstruction in accordance with one or more aspects of the present disclosure. The operations of the method 1800 may be implemented by a base station or its components as described herein (e.g., a network entity). For example, the operations of the method 1800 may be performed by a base station 105 or a network entity as described with reference to FIGS. 1 through 6 and 11 through 14. In some examples, a base station or network entity may execute a set of instructions to control the functional elements of the base station or network entity to perform the described functions. Additionally, or alternatively, the base station or network entity may perform aspects of the described functions using special-purpose hardware.

At 1805, the method may include obtaining encoded interference information representative of a distribution of interference. The operations of 1805 may be performed in accordance with examples as disclosed herein. In some examples, aspects of the operations of 1805 may be performed by an interference report manager 1325 as described with reference to FIG. 13.

At 1810, the method may include decoding the encoded interference information in accordance with a compression scheme to output decoded interference information. The operations of 1810 may be performed in accordance with examples as disclosed herein. In some examples, aspects of the operations of 1810 may be performed by an interference report decoding manager 1330 as described with reference to FIG. 13.

Figure 19:
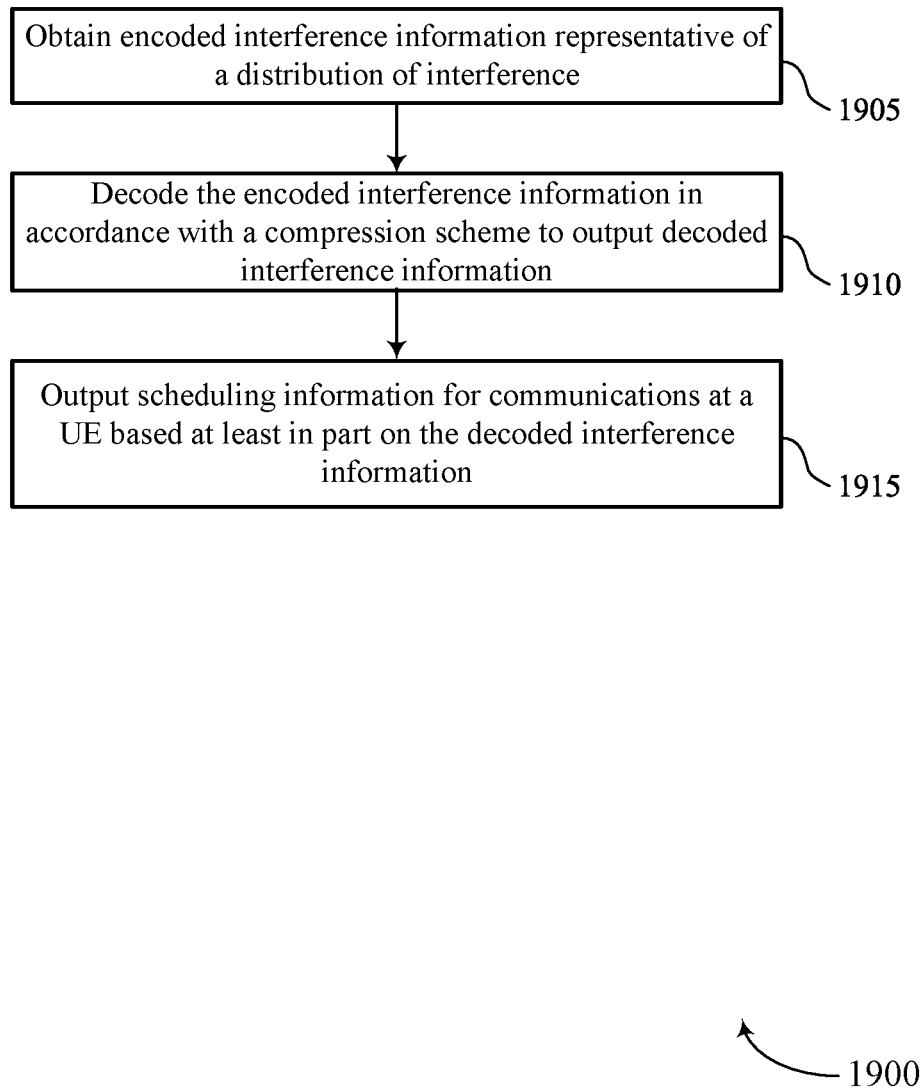

FIG. 19 shows a flowchart illustrating a method 1900 that supports interference distribution compression and reconstruction in accordance with one or more aspects of the present disclosure. The operations of the method 1900 may be implemented by a base station or its components as described herein (e.g., a network entity). For example, the operations of the method 1900 may be performed by a base station 105 or a network entity as described with reference to FIGS. 1 through 6 and 11 through 14. In some examples, a base station or a network entity may execute a set of instructions to control the functional elements of the base station or network entity to perform the described functions. Additionally, or alternatively, the base station or network entity may perform aspects of the described functions using special-purpose hardware.

At 1905, the method may include obtaining encoded interference information representative of a distribution of interference. The operations of 1905 may be performed in accordance with examples as disclosed herein. In some examples, aspects of the operations of 1905 may be performed by an interference report manager 1325 as described with reference to FIG. 13.

At 1910, the method may include decoding the encoded interference information in accordance with a compression scheme to output decoded interference information. The operations of 1910 may be performed in accordance with examples as disclosed herein. In some examples, aspects of the operations of 1910 may be performed by an interference report decoding manager 1330 as described with reference to FIG. 13.

At 1915, the method may include outputting scheduling information for communications at a UE based on the decoded interference information. The operations of 1915 may be performed in accordance with examples as disclosed herein. In some examples, aspects of the operations of 1915 may be performed by a scheduling manager 1335 as described with reference to FIG. 13.

Figure 20:
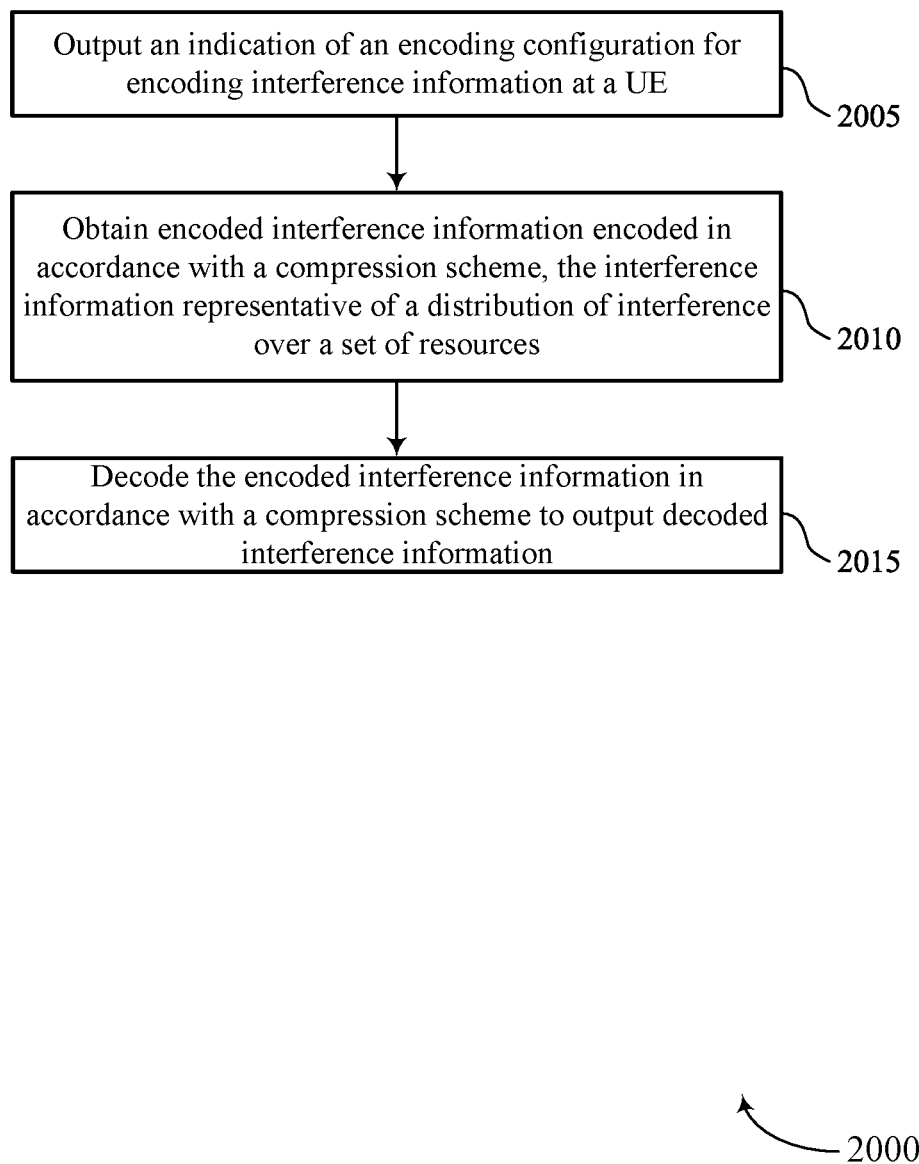

FIG. 20 shows a flowchart illustrating a method 2000 that supports interference distribution compression and reconstruction in accordance with one or more aspects of the present disclosure. The operations of the method 2000 may be implemented by a base station or its components as described herein (e.g., a network entity). For example, the operations of the method 2000 may be performed by a base station 105 or a network entity as described with reference to FIGS. 1 through 6 and 11 through 14. In some examples, a base station or a network entity may execute a set of instructions to control the functional elements of the base station or network entity to perform the described functions. Additionally, or alternatively, the base station or network entity may perform aspects of the described functions using special-purpose hardware.

At 2005, the method may include outputting an indication of an encoding configuration for encoding interference information at a UE. The operations of 2005 may be performed in accordance with examples as disclosed herein. In some examples, aspects of the operations of 2005 may be performed by an encoding configuration manager 1340 as described with reference to FIG. 13.

At 2010, the method may include obtaining encoded interference information encoded in accordance with a compression scheme, the interference information representative of a distribution of interference over a set of resources. The operations of 2010 may be performed in accordance with examples as disclosed herein. In some examples, aspects of the operations of 2010 may be performed by an interference report manager 1325 as described with reference to FIG. 13.

At 2015, the method may include decoding the encoded interference information in accordance with a compression scheme to output decoded interference information. The operations of 2015 may be performed in accordance with examples as disclosed herein. In some examples, aspects of the operations of 2015 may be performed by an interference report decoding manager 1330 as described with reference to FIG. 13.

Figure 21:
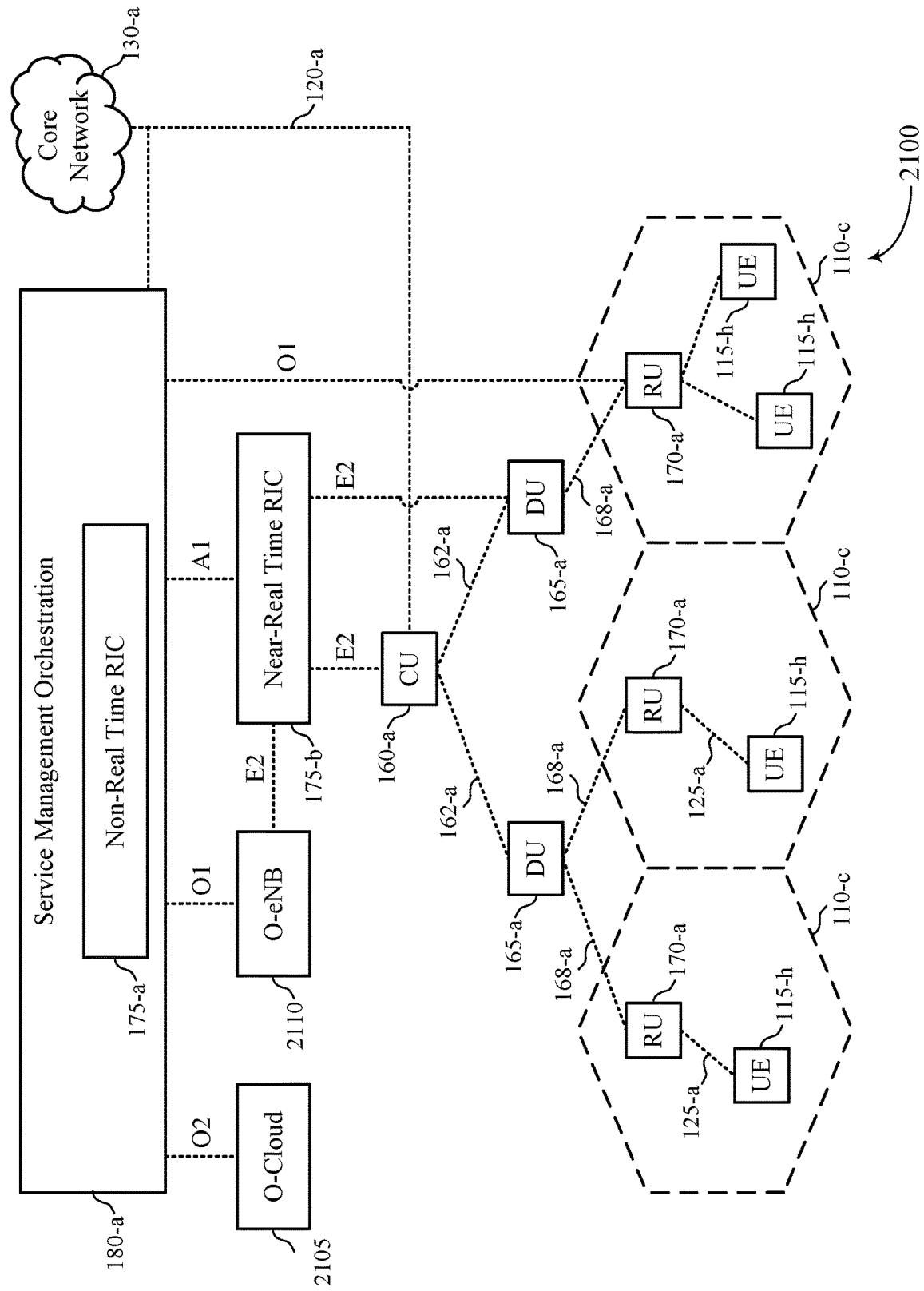
FIG. 21 illustrates an example of a network architecture that supports interference distribution compression and reconstruction in accordance with one or more aspects of the present disclosure.

FIG. 21 illustrates an example of a network architecture 2100 (e.g., a disaggregated base station architecture, a disaggregated RAN architecture) that supports interference distribution compression and reconstruction in accordance with one or more aspects of the present disclosure. The network architecture 2100 may illustrate an example for implementing one or more aspects of the wireless communications system 100. The network architecture 2100 may include one or more CUs 160-*a* that may communicate directly with a core network 130-*a* via a backhaul communication link 120-*a*, or indirectly with the core network 130-*a* through one or more disaggregated network entities (e.g., a Near-RT RIC 175-*b* via an E2 link, or a Non-RT RIC 175-*a* associated with an SMO 180-*a* (e.g., an SMO Framework), or both). A CU 160-*a* may communicate with one or more DUs 165-*a* via respective midhaul communication links 162-*a* (e.g., an F1 interface). The DUs 165-*a* may communicate with one or more RUs 170-*a* via respective fronthaul communication links 168-*a*. The RUs 170-*a* may be associated with respective coverage areas 110-*c* and may communicate with UEs 115-*h* via one or more communication links 125-*a*. In some implementations, a UE 115-*h* may be simultaneously served by multiple RUs 170-*a*.

Each of the network entities of the network architecture 2100 (e.g., CUs 160-*a*, DUs 165-*a*, RUs 170-*a*, Non-RT RICs 175-*a*, Near-RT RICs 175-*b*, SMOs 180-*a*, Open Clouds (O-Clouds) 2105, Open eNBs (O-eNBs) 2110) may include one or more interfaces or may be coupled with one or more interfaces configured to receive or transmit signals (e.g., data, information) via a wired or wireless transmission medium. Each network entity, or an associated processor (e.g., controller) providing instructions to an interface of the network entity, may be configured to communicate with one or more of the other network entities via the transmission medium. For example, the network entities may include a wired interface configured to receive or transmit signals over a wired transmission medium to one or more of the other network entities. Additionally, or alternatively, the network entities may include a wireless interface, which may include a receiver, a transmitter, or transceiver (e.g., an RF transceiver) configured to receive or transmit signals, or both, over a wireless transmission medium to one or more of the other network entities.

In some examples, a CU 160-*a* may host one or more higher layer control functions. Such control functions may include RRC, PDCP, SDAP, or the like. Each control function may be implemented with an interface configured to communicate signals with other control functions hosted by the CU 160-*a*. A CU 160-*a* may be configured to handle user plane functionality (e.g., CU-UP), control plane functionality (e.g., CU-CP), or a combination thereof. In some examples, a CU 160-*a* may be logically split into one or more CU-UP units and one or more CU-CP units. A CU-UP unit may communicate bidirectionally with the CU-CP unit via an interface, such as an E1 interface when implemented in an O-RAN configuration. A CU 160-*a* may be implemented to communicate with a DU 165-*a*, as necessary, for network control and signaling.

A DU 165-*a* may correspond to a logical unit that includes one or more functions (e.g., base station functions, RAN functions) to control the operation of one or more RUs 170-*a*. In some examples, a DU 165-*a* may host, at least partially, one or more of an RLC layer, a MAC layer, and one or more aspects of a PHY layer (e.g., a high PHY layer, such as modules for FEC encoding and decoding, scrambling, modulation and demodulation, or the like) depending, at least in part, on a functional split, such as those defined by the 3rd Generation Partnership Project (3GPP). In some examples, a DU 165-*a* may further host one or more low PHY layers. Each layer may be implemented with an interface configured to communicate signals with other layers hosted by the DU 165-*a*, or with control functions hosted by a CU 160-*a*.

In some examples, lower-layer functionality may be implemented by one or more RUs 170-*a*. For example, an RU 170-*a*, controlled by a DU 165-*a*, may correspond to a logical node that hosts RF processing functions, or low-PHY layer functions (e.g., performing fast Fourier transform (FFT), inverse FFT (iFFT), digital beamforming, physical random access channel (PRACH) extraction and filtering, or the like), or both, based at least in part on the functional split, such as a lower-layer functional split. In such an architecture, an RU 170-*a* may be implemented to handle over the air (OTA) communication with one or more UEs 115-*h*. In some implementations, real-time and non-real-time aspects of control and user plane communication with the RU(s) 170-*a* may be controlled by the corresponding DU 165-*a*. In some examples, such a configuration may enable a DU 165-*a* and a CU 160-*a* to be implemented in a cloud-based RAN architecture, such as a vRAN architecture.

The SMO 180-*a* may be configured to support RAN deployment and provisioning of non-virtualized and virtualized network entities. For non-virtualized network entities, the SMO 180-*a* may be configured to support the deployment of dedicated physical resources for RAN coverage requirements which may be managed via an operations and maintenance interface (e.g., an O1 interface). For virtualized network entities, the SMO 180-*a* may be configured to interact with a cloud computing platform (e.g., an O-Cloud 2105) to perform network entity life cycle management (e.g., to instantiate virtualized network entities) via a cloud computing platform interface (e.g., an O2 interface). Such virtualized network entities can include, but are not limited to, CUs 160-*a*, DUs 165-*a*, RUs 170-*a*, and Near-RT RICs 175-*b*. In some implementations, the SMO 180-*a* may communicate with components configured in accordance with a 4G RAN (e.g., via an O1 interface). Additionally, or alternatively, in some implementations, the SMO 180-*a* may communicate directly with one or more RUs 170-*a* via an O1 interface. The SMO 180-*a* also may include a Non-RT RIC 175-*a* configured to support functionality of the SMO 180-*a*.

The Non-RT RIC 175-*a* may be configured to include a logical function that enables non-real-time control and optimization of RAN elements and resources, Artificial Intelligence (AI) or Machine Learning (ML) workflows including model training and updates, or policy-based guidance of applications/features in the Near-RT RIC 175-*b*. The Non-RT RIC 175-*a* may be coupled to or communicate with (e.g., via an A1 interface) the Near-RT RIC 175-*b*. The Near-RT RIC 175-*b* may be configured to include a logical function that enables near-real-time control and optimization of RAN elements and resources via data collection and actions over an interface (e.g., via an E2 interface) connecting one or more CUs 160-*a*, one or more DUs 165-*a*, or both, as well as an O-eNB 2110, with the Near-RT RIC 175-*b*.

In some examples, to generate AI/ML models to be deployed in the Near-RT RIC 175-*b*, the Non-RT RIC 175-*a* may receive parameters or external enrichment information from external servers. Such information may be utilized by the Near-RT RIC 175-*b* and may be received at the SMO 180-*a* or the Non-RT RIC 175-*a* from non-network data sources or from network functions. In some examples, the Non-RT RIC 175-*a* or the Near-RT RIC 175-*b* may be configured to tune RAN behavior or performance. For example, the Non-RT RIC 175-*a* may monitor long-term trends and patterns for performance and employ AI or ML models to perform corrective actions through the SMO 180-*a* (e.g., reconfiguration via O1) or via generation of RAN management policies (e.g., A1 policies).

The following provides an overview of examples of the present disclosure:

Aspect 1: A method for wireless communications at a UE, comprising: measuring interference at the UE over a set of interference measurement resources; encoding, in accordance with a compression scheme, interference information representative of a distribution of interference at the UE based on the interference measured over the set of interference measurement resources; and transmitting, to a first network entity, the interference information encoded in accordance with the compression scheme.

Aspect 2: The method of aspect 1, wherein the distribution of interference at the UE comprises a probability mass function for a set of resources in time, frequency, and/or space.

Aspect 3: The method of aspect 2, wherein the set of resources in time, frequency, and/or space comprise the set of interference measurement resources.

Aspect 4: The method of aspect 2, wherein the set of resources in time, frequency, and/or space comprise resources prior to the set of interference measurement resources and the distribution of interference at the UE is based at least in part on the interference measured over the set of interference measurement resources.

Aspect 5: The method of aspect 2, wherein the set of resources in time, frequency, and/or space comprise resources later than the set of interference measurement resources, and wherein the distribution of interference at the UE is predicted based at least in part on the interference measured over the set of interference measurement resources.

Aspect 6: The method of any of aspects 1 through 5, the encoding in accordance with the compression scheme comprising: generating a compressed estimated or predicted interference distribution over the set of interference measurement resources.

Aspect 7: The method of any of aspects 1 through 6, wherein the compression scheme includes a codeword-based compression scheme or an artificial neural network-based compression scheme.

Aspect 8: The method of any of aspects 1 through 7, the encoding in accordance with the compression scheme comprising: generating a mean vector and a covariance matrix of a latent random variable representative of the distribution of interference over the set of interference measurement resources, wherein the set of interference measurement resources comprise a set of two or more of time, frequency, or spatial resources.

Aspect 9: The method of any of aspects 1 through 8, further comprising: receiving, from the first network entity or one or more second network entities associated with the first network entity, an indication of an encoding configuration for encoding the interference information.

Aspect 10: The method of aspect 9, further comprising: transmitting, to the first network entity or one or more second network entities associated with the first network entity, an indication of a capability of the UE to encode interference information; the receiving the indication of the encoding configuration for encoding the interference information comprising: receiving, from the first network entity or one or more second network entities associated with the first network entity, and in response to the transmitting the indication of the capability of the UE to encode interference information, an indication of an index associated with the encoding configuration, wherein a set of encoding configurations comprising the encoding configuration are associated with a set of indices including the index.

Aspect 11: The method of any of aspects 9 through 10, wherein the encoding configuration comprises a configuration for one of an autoencoder or an artificial neural network.

Aspect 12: The method of any of aspects 1 through 11, further comprising: selecting an encoding configuration from a set of encoding configurations to encode the interference information, wherein each encoding configuration of the set of encoding configurations is associated with a respective index of a set of indices; and transmitting, to the first network entity or one or more second network entities associated with the first network entity, an indication of an index of the set of indices associated with the selected encoding configuration.

Aspect 13: The method of any of aspects 1 through 12, further comprising: receiving, from the first network entity or one or more second network entities associated with the first network entity, an indication of one or more parameters associated with the compression scheme.

Aspect 14: The method of aspect 13, wherein the one or more parameters associated with the compression scheme comprise a code size, a number of layers, a number of nodes per layer, a loss function, or a combination thereof.

Aspect 15: The method of any of aspects 1 through 14, further comprising: receiving, from the first network entity or one or more second network entities associated with the first network entity, an indication of the set of interference measurement resources.

Aspect 16: The method of any of aspects 1 through 15, further comprising: receiving, from the first network entity or one or more second network entities associated with the first network entity, an indication of one or more parameters associated with measuring the interference at the UE over the set of interference measurement resources.

Aspect 17: The method of aspect 16, wherein the one or more parameters associated with measuring the interference at the UE over the set of interference measurement resources comprise a frequency granularity, a time granularity, a spatial granularity, or a combination thereof.

Aspect 18: The method of any of aspects 1 through 17, further comprising: receiving, from the first network entity or one or more second network entities associated with the first network entity, an indication of an input format for encoding the interference information representative of a distribution of interference at the UE.

Aspect 19: The method of any of aspects 1 through 18, the transmitting the interference information encoded in accordance with the compression scheme comprising: transmitting a channel state feedback report comprising the encoded interference information encoded in accordance with the compression scheme.

Aspect 20: The method of any of aspects 1 through 19, further comprising: determining, using an artificial neural network associated with the compression scheme, one or more model parameters associated with the compression scheme; and transmitting, to the first network entity or one or more second network entities associated with the first network entity, the one or more model parameters.

Aspect 21: The method of asp any of Aspects 1 through 20, further comprising: receiving, from the first network entity or one or more second network entities associated with the first network entity, one or more parameters associated with the compression scheme based at least in part on the transmitting the one or more model parameters.

Aspect 22: The method of any of Aspects 1 through 120, wherein the interference at the UE comprises interference-plus-noise, and wherein the distribution of interference comprises a distribution of interference-plus-noise over the set of interference measurement resources.

Aspect 23: A method for wireless communications at a network entity, comprising: obtaining encoded interference information representative of a distribution of interference; and decoding the encoded interference information in accordance with a compression scheme to output decoded interference information.

Aspect 24: The method of aspect 23, further comprising: outputting scheduling information for communications at a UE based at least in part on the decoded interference information.

Aspect 25: The method of aspect 23, wherein the encoded interference information comprises a mean vector and a covariance matrix of a latent random variable representative of the distribution of interference at a UE over a set of interference measurement resources, the method further comprising: generating samples based on the mean vector and the covariance matrix; and decoding the encoded interference information based at least in part on the samples.

Aspect 26: The method of any of aspects 23 through 24, further comprising: outputting an indication of an encoding configuration for encoding interference information at a UE.

Aspect 27: The method of aspect 26, further comprising: obtaining an indication of a capability of the UE to encode interference information; the outputting the indication of the encoding configuration comprising: outputting, based at least in part on receiving the indication of the capability of the UE to encode interference information, an indication of an index associated with the encoding configuration, wherein a set of encoding configurations comprising the encoding configuration are associated with a set of indices including the index.

Aspect 28: The method of aspect 26 through 27, wherein the encoding configuration comprises a configuration for one of an autoencoder or an artificial neural network.

Aspect 29: The method of any of aspects 23 through 28, further comprising: obtaining an indication of an index of a set of indices associated with a selected encoding configuration, wherein each encoding configuration of the set of encoding configurations is associated with a respective index of a set of indices.

Aspect 30: The method of any of aspects 23 through 29, further comprising: outputting an indication of one or more parameters associated with the compression scheme.

Aspect 31: The method of aspect 30, wherein the one or more parameters associated with the compression scheme comprise a code size, a number of layers, a number of nodes per layer, a loss function, or a combination thereof.

Aspect 32: The method of any of aspects 23 through 31, further comprising: outputting an indication of one or more parameters associated with measuring the interference over the set of interference measurement resources.

Aspect 33: The method of aspect 32, wherein the one or more parameters associated with measuring the interference over the set of interference measurement resources comprise a frequency granularity, a time granularity, a spatial granularity, or a combination thereof.

Aspect 34: The method of any of aspects 23 through 33, further comprising: outputting an indication of an input format of interference information representative of a distribution of interference.

Aspect 35: The method of any of aspects 23 through 34, the obtaining the encoded interference information comprising: obtaining a channel state feedback report comprising the encoded interference information encoded in accordance with the compression scheme.

Aspect 36: The method of any of aspects 23 through 35, further comprising: determining, using an artificial neural network associated with the compression scheme, one or more model parameters associated with the compression scheme; and outputting one or more parameters associated with the compression scheme based at least in part on the one or more model parameters.

Aspect 37: The method of any of aspects 23 through 36, further comprising: obtaining one or more model parameters associated with the compression scheme; and outputting one or more parameters associated with the compression scheme based at least in part on the one or more model parameters.

Aspect 38: The method of any of aspects 23 through 37, wherein the distribution of interference comprises a distribution of interference-plus-noise over a set of interference measurement resources.

Aspect 39: An apparatus for wireless communications at a UE, comprising a processor; and memory coupled with the processor, the processor configured to cause the apparatus to perform a method of any of aspects 1 through 22.

Aspect 40: An apparatus for wireless communications at a UE, comprising at least one means for performing a method of any of aspects 1 through 22.

Aspect 41: A non-transitory computer-readable medium storing code for wireless communications at a UE, the code comprising instructions executable by a processor to perform a method of any of aspects 1 through 22.

Aspect 42: An apparatus for wireless communications at a network entity, comprising a processor configured to cause the apparatus to perform a method of any of aspects 23 through 38.

Aspect 43: An apparatus for wireless communications at a network entity, comprising at least one means for performing a method of any of aspects 23 through 38.

Aspect 44: A non-transitory computer-readable medium storing code for wireless communications at a network entity, the code comprising instructions executable by a processor to perform a method of any of aspects 23 through 38.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

As used herein, including in the claims, the term "set" refers to a group of one or more.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a user equipment (UE), comprising:
    a processor; and
    memory coupled to the processor, the processor configured to:
        measure interference at the UE over a set of interference measurement resources;
        encode, in accordance with a compression scheme, interference information representative of a distribution of interference at the UE based at least in part on the interference measured over the set of interference measurement resources, wherein the set of interference measurement resources includes a channel state information (CSI) reference signal (CSI-RS), a CSI interference measurement (CSI-IM) or an interference measurement resource (IMR), the IMR comprising a time-frequency resource; and
        transmit, to a first network entity, the interference information encoded in accordance with the compression scheme.

2. The apparatus of claim 1, wherein the interference at the UE comprises interference-plus-noise, and wherein the distribution of interference comprises a distribution of interference-plus-noise over the set of interference measurement resources.

3. The apparatus of claim 1, wherein the distribution of interference at the UE comprises a probability mass function for a set of resources in time, frequency, and/or space.

4. The apparatus of claim 3, wherein the set of resources in time, frequency, and/or space comprise the set of interference measurement resources.

5. The apparatus of claim 3, wherein the set of resources in time, frequency, and/or space comprise resources prior to the set of interference measurement resources and the distribution of interference at the UE is based at least in part on the interference measured over the set of interference measurement resources.

6. The apparatus of claim 3, wherein the set of resources in time, frequency, and/or space comprise resources later than the set of interference measurement resources, and wherein the distribution of interference at the UE is predicted based at least in part on the interference measured over the set of interference measurement resources.

7. The apparatus of claim 1, wherein, to encode the interference information, the processor is further configured to:
    generate a compressed estimated or predicted interference distribution over the set of interference measurement resources.

8. The apparatus of claim 1, wherein the compression scheme includes a codeword-based compression scheme or an artificial neural network-based compression scheme.

9. The apparatus of claim 1, wherein, to encode the interference information, the processor is further configured to:
    generate a mean vector and a covariance matrix of a latent random variable representative of the distribution of interference at the UE over the set of interference measurement resources,
    wherein the set of interference measurement resources comprise a set of two or more of time, frequency, or spatial resources.

10. The apparatus of claim 1, further comprising:
    an antenna operable to receive, from the first network entity or one or more second network entities associated with the first network entity, an indication of an encoding configuration configured to encode the interference information.

11. The apparatus of claim 10, wherein the processor is further configured to:
    transmit, to the first network entity or one or more second network entities associated with the first network entity, an indication of a capability of the UE to encode interference information; and wherein to receive the indication of the encoding configuration configured to encode the interference information, the antenna is further operable to:
receive, from the first network entity or one or more second network entities associated with the first network entity, and in response to transmission of the indication of the capability of the UE to encode interference information, an indication of an index associated with the encoding configuration, wherein a set of encoding configurations comprising the encoding configuration are associated with a set of indices comprising the index.

12. The apparatus of claim 10, wherein the encoding configuration comprises a configuration for one of an autoencoder or an artificial neural network.

13. The apparatus of claim 1, wherein the processor is further configured to:
select an encoding configuration from a set of encoding configurations to encode the interference information, wherein each encoding configuration of the set of encoding configurations is associated with a respective index of a set of indices; and
transmit, to the first network entity or one or more second network entities associated with the first network entity, an indication of an index of the set of indices associated with the selected encoding configuration.

14. The apparatus of claim 1, wherein the processor is further configured to:
receive, from the first network entity or one or more second network entities associated with the first network entity, an indication of one or more parameters associated with the compression scheme.

15. The apparatus of claim 14, wherein the one or more parameters associated with the compression scheme comprise a code size, a number of layers, a number of nodes per layer, a loss function, or a combination thereof.

16. The apparatus of claim 1, wherein the processor is further configured to:
receive, from the first network entity or one or more second network entities associated with the first network entity, an indication of the set of interference measurement resources.

17. The apparatus of claim 1, wherein the processor is further configured to:
receive, from the first network entity or one or more second network entities associated with the first network entity, an indication of one or more parameters associated with measuring the interference at the UE over the set of interference measurement resources.

18. The apparatus of claim 17, wherein the one or more parameters associated with measuring the interference at the UE over the set of interference measurement resources comprise a frequency granularity, a time granularity, a spatial granularity, or a combination thereof.

19. The apparatus of claim 1, wherein the processor is further configured to:
receive, from the first network entity or one or more second network entities associated with the first network entity, an indication of an input format for encoding the interference information representative of the distribution of interference at the UE.

20. The apparatus of claim 1, wherein the processor is further configured to:
transmit a channel state feedback report comprising the encoded interference information encoded in accordance with the compression scheme.

21. The apparatus of claim 1, wherein the processor is further configured to:
determine, using an artificial neural network associated with the compression scheme, one or more model parameters associated with the compression scheme; and
transmit, to the first network entity or one or more second network entities associated with the first network entity, the one or more model parameters.

22. The apparatus of claim 21, wherein the processor is further configured to:
receive, from the first network entity or the one or more second network entities associated with the first network entity, one or more parameters associated with the compression scheme based at least in part on transmission of the one or more model parameters.

23. An apparatus for wireless communications at a network entity, comprising:
a processor; and
memory coupled to the processor, the processor configured to:
obtain encoded interference information representative of a distribution of interference, the distribution of interference comprising a distribution over a set of interference measurement resources, the set of interference measurement resources including a channel state information (CSI) reference signal (CSI-RS), a CSI interference measurement (CSI-IM) or an interference measurement resource (IMR), the IMR comprising a time-frequency resource; and
decode the encoded interference information in accordance with a compression scheme to output decoded interference information.

24. The apparatus of claim 23, wherein the distribution of interference comprises a distribution of interference-plus-noise over the set of interference measurement resources.

25. The apparatus of claim 23, further comprising:
an antenna operable to transmit, to a user equipment (UE), scheduling information for communications at the UE based at least in part on the decoded interference information.

26. The apparatus of claim 23, wherein the encoded interference information comprises a mean vector and a covariance matrix of a latent random variable representative of the distribution of interference at a user equipment (UE) over the set of interference measurement resources, and wherein the processor is further configured to:
generate samples based on the mean vector and the covariance matrix; and
decode the encoded interference information based at least in part on the samples.

27. The apparatus of claim 23, wherein the processor is further configured to:
output an indication of an encoding configuration for encoding interference information at a user equipment (UE).

28. The apparatus of claim 27, wherein the processor is further configured to:
obtain an indication of a capability of the UE to encode interference information; and
output based at least in part on the indication of the capability of the UE to encode interference information, an indication of an index associated with the encoding configuration, wherein a set of encoding configurations comprising the encoding configuration are associated with a set of indices comprising the index.

29. The apparatus of claim 27, wherein the encoding configuration comprises a configuration for one of an auto-encoder or an artificial neural network.

30. The apparatus of claim 23, wherein the processor is further configured to:
obtain an indication of an index of a set of indices associated with a selected encoding configuration, wherein each encoding configuration of a set of encoding configurations is associated with a respective index of the set of indices.

31. The apparatus of claim 23, wherein the processor is further configured to:
output an indication of one or more parameters associated with the compression scheme.

32. The apparatus of claim 31, wherein the one or more parameters associated with the compression scheme comprise a code size, a number of layers, a number of nodes per layer, a loss function, or a combination thereof.

33. The apparatus of claim 23, wherein the processor is further configured to:
output an indication of one or more parameters associated with measuring interference over the set of interference measurement resources.

34. The apparatus of claim 33, wherein the one or more parameters associated with measuring interference over the set of interference measurement resources comprise a frequency granularity, a time granularity, a spatial granularity, or a combination thereof.

35. The apparatus of claim 23, wherein the processor is further configured to:
output an indication of an input format for encoding interference information representative of the distribution of interference.

36. The apparatus of claim 23, wherein the processor is further configured to:
obtain a channel state feedback report comprising the encoded interference information.

37. The apparatus of claim 23, wherein the processor is further configured to:
determine, using an artificial neural network associated with the compression scheme, one or more model parameters associated with the compression scheme; and
output one or more parameters associated with the compression scheme based at least in part on the one or more model parameters.

38. The apparatus of claim 23, wherein the processor is further configured to:
obtain one or more model parameters associated with the compression scheme; and
output one or more parameters associated with the compression scheme based at least in part on the one or more model parameters.

39. A method for wireless communications at a user equipment (UE), comprising:
measuring interference at the UE over a set of interference measurement resources;
encoding, in accordance with a compression scheme, interference information representative of a distribution of interference at the UE based at least in part on the interference measured over the set of interference measurement resources, wherein the set of interference measurement resources includes a channel state information (CSI) reference signal (CSI-RS), a CSI interference measurement (CSI-IM) or an interference measurement resource (IMR), the IMR comprising a time-frequency resource; and
transmitting, to a first network entity, the interference information encoded in accordance with the compression scheme.

40. The method of claim 39, wherein the interference at the UE comprises interference-plus-noise, and wherein the distribution of interference comprises a distribution of interference-plus-noise over the set of interference measurement resources.

41. The method of claim 39, wherein the distribution of interference at the UE comprises a probability mass function for a set of resources in time, frequency, and/or space.

42. The method of claim 41, wherein the set of resources in time, frequency, and/or space comprise the set of interference measurement resources.

43. The method of claim 41, wherein the set of resources in time, frequency, and/or space comprise resources prior to the set of interference measurement resources and the distribution of interference at the UE is based at least in part on the interference measured over the set of interference measurement resources.

44. The method of claim 41, wherein the set of resources in time, frequency, and/or space comprise resources later than the set of interference measurement resources, and wherein the distribution of interference at the UE is predicted based at least in part on the interference measured over the set of interference measurement resources.

45. The method of claim 39, the encoding in accordance with the compression scheme comprising:
generating a compressed estimated or predicted interference distribution over the set of interference measurement resources.

46. The method of claim 39, wherein the compression scheme includes a codeword-based compression scheme or a neural network-based compression scheme.

47. The method of claim 39, the encoding in accordance with the compression scheme comprising:
generating a mean vector and a covariance matrix representative of the distribution of interference at the UE over the set of interference measurement resources, wherein the set of interference measurement resources comprises a set of two or more of time, frequency, or spatial resources.

48. The method of claim 39, further comprising:
receiving, from the first network entity or one or more second network entities associated with the first network entity, an indication of an encoding configuration for encoding the interference information.

49. The method of claim 48, further comprising:
transmitting, to the first network entity or one or more second network entities associated with the first network entity, an indication of a capability of the UE to encode interference information; the receiving the indication of the encoding configuration for encoding the interference information comprising:
receiving, from the first network entity or one or more second network entities associated with the first network entity, and in response to the transmitting the indication of the capability of the UE to encode interference information, an indication of an index associated with the encoding configuration, wherein a set of encoding configurations comprising the encoding configuration are associated with a set of indices including the index.

50. The method of claim 48, wherein the encoding configuration comprises a configuration for one of an autoencoder or an artificial neural network.

51. The method of claim 39, further comprising:
selecting an encoding configuration from a set of encoding configurations for encoding the interference information, wherein each encoding configuration of the set of encoding configurations is associated with a respective index of a set of indices; and
transmitting, to the first network entity or one or more second network entities associated with the first network entity, an indication of an index of the set of indices associated with the selected encoding configuration.

52. The method of claim 39, further comprising:
receiving, from the first network entity or one or more second network entities associated with the first network entity, an indication of one or more parameters associated with the compression scheme.

53. The method of claim 52, wherein the one or more parameters associated with the compression scheme comprise a code size, a number of layers, a number of nodes per layer, a loss function, or a combination thereof.

54. The method of claim 39, further comprising:
receiving, from the first network entity or one or more second network entities associated with the first network entity, an indication of the set of interference measurement resources.

55. The method of claim 39, further comprising:
receiving, from the first network entity or one or more second network entities associated with the first network entity, an indication of one or more parameters associated with measuring the interference at the UE over the set of interference measurement resources.

56. The method of claim 55, wherein the one or more parameters associated with measuring the interference at the UE over the set of interference measurement resources comprise a frequency granularity, a time granularity, a spatial granularity, or a combination thereof.

57. The method of claim 39, further comprising:
receiving, from the first network entity or one or more second network entities associated with the first network entity, an indication of an input format for encoding the interference information representative of the distribution of interference at the UE.

58. The method of claim 39, the transmitting the interference information encoded in accordance with the compression scheme comprising:
transmitting a channel state feedback report comprising the interference information encoded in accordance with the compression scheme.

59. The method of claim 39, further comprising:
determining, using an artificial neural network associated with the compression scheme, one or more model parameters associated with the compression scheme; and
transmitting, to the first network entity or one or more second network entities associated with the first network entity, the one or more model parameters.

60. The method of claim 59, further comprising:
receiving, from the first network entity or the one or more second network entities associated with the first network entity, one or more parameters associated with the compression scheme based at least in part on the transmitting the one or more model parameters.

61. A method for wireless communications at a network entity, comprising:
obtaining encoded interference information representative of a distribution of interference, the distribution of interference comprising a distribution over a set of interference measurement resources, the set of interference measurement resources including a channel state information (CSI) reference signal (CSI-RS), a CSI interference measurement (CSI-IM) or an interference measurement resource (IMR), the IMR comprising a time-frequency resource; and
decoding the encoded interference information in accordance with a compression scheme to output decoded interference information.

62. The method of claim 61, wherein the distribution of interference comprises a distribution of interference-plus-noise over the set of interference measurement resources.

63. The method of claim 61, further comprising:
outputting, to a user equipment (UE), scheduling information for communications at the UE based at least in part on the decoded interference information.

64. The method of claim 61, wherein the encoded interference information comprises a mean vector and a covariance matrix of a latent random variable representative of the distribution of interference at a user equipment (UE) over the set of interference measurement resources, the method further comprising:
generating samples based on the mean vector and the covariance matrix; and
decoding the encoded interference information based at least in part on the samples.

65. The method of claim 61, further comprising:
outputting an indication of an encoding configuration for encoding interference information at a user equipment (UE).

66. The method of claim 65, further comprising:
obtaining an indication of a capability of the UE to encode interference information; the outputting the indication of the encoding configuration comprising:
outputting, based at least in part on the indication of the capability of the UE to encode interference information, an indication of an index associated with the encoding configuration, wherein a set of encoding configurations comprising the encoding configuration are associated with a set of indices including the index.

67. The method of claim 65, wherein the encoding configuration comprises a configuration for one of an autoencoder or an artificial neural network.

68. The method of claim 61, further comprising:
obtaining an indication of an index of a set of indices associated with a selected encoding configuration, wherein each encoding configuration of a set of encoding configurations is associated with a respective index of the set of indices.

69. The method of claim 61, further comprising:
outputting an indication of one or more parameters associated with the compression scheme.

70. The method of claim 69, wherein the one or more parameters associated with the compression scheme comprise a code size, a number of layers, a number of nodes per layer, a loss function, or a combination thereof.

71. The method of claim 61, further comprising:
outputting an indication of one or more parameters associated with measuring interference over the set of interference measurement resources.

72. The method of claim 71, wherein the one or more parameters associated with measuring interference over the set of interference measurement resources comprise a frequency granularity, a time granularity, a spatial granularity, or a combination thereof.

73. The method of claim 71, further comprising:
outputting an indication of an input format for encoding interference information representative of the distribution of interference.

74. The method of claim 61, the obtaining the encoded interference information encoded in accordance with the compression scheme comprising:
obtaining a channel state feedback report comprising the encoded interference information.

75. The method of claim 61, further comprising:
determining, using an artificial neural network associated with the compression scheme, one or more model parameters associated with the compression scheme; and
outputting one or more parameters associated with the compression scheme based at least in part on the one or more model parameters.

76. The method of claim 61, further comprising:
obtaining one or more model parameters associated with the compression scheme; and
outputting one or more parameters associated with the compression scheme based at least in part on the one or more model parameters.

77. An apparatus for wireless communications at a user equipment (UE), comprising:
means for measuring interference at the UE over a set of interference measurement resources;
means for encoding, in accordance with a compression scheme, interference information representative of a distribution of interference at the UE based at least in part on the interference measured over the set of interference measurement resources, wherein the set of interference measurement resources includes a channel state information (CSI) reference signal (CSI-RS), a CSI interference measurement (CSI-IM) or an interference measurement resource (IMR), the IMR comprising a time-frequency resource; and
means for transmitting, to a first network entity, the interference information encoded in accordance with the compression scheme.

78. An apparatus for wireless communications at a network entity, comprising:
means for obtaining encoded interference information representative of a distribution of interference, the distribution of interference comprising a distribution over a set of interference measurement resources, the set of interference measurement resources including a channel state information (CSI) reference signal (CSI-RS), a CSI interference measurement (CSI-IM) or an interference measurement resource (IMR), the IMR comprising a time-frequency resource; and
means for decoding the encoded interference information in accordance with a compression scheme to output decoded interference information.

79. A non-transitory computer-readable medium storing code for wireless communications at a user equipment (UE), the code comprising instructions executable by a processor to:
measure interference at the UE over a set of interference measurement resources;
encode, in accordance with a compression scheme, interference information representative of a distribution of interference at the UE based at least in part on the interference measured over the set of interference measurement resources, wherein the set of interference measurement resources includes a channel state information (CSI) reference signal (CSI-RS), a CSI interference measurement (CSI-IM) or an interference measurement resource (IMR), the IMR comprising a time-frequency resource; and
transmit, to a first network entity, the interference information encoded in accordance with the compression scheme.

80. A non-transitory computer-readable medium storing code for wireless communications at a network entity, the code comprising instructions executable by a processor to:
obtain encoded interference information representative of a distribution of interference, the distribution of interference comprising a distribution over a set of interference measurement resources, the set of interference measurement resources including a channel state information (CSI) reference signal (CSI-RS), a CSI interference measurement (CSI-IM) or an interference measurement resource (IMR), the IMR comprising a time-frequency resource; and
decode the encoded interference information in accordance with a compression scheme to output decoded interference information.

* * * * *